(12) United States Patent
Kataoka et al.

(10) Patent No.: US 11,646,914 B2
(45) Date of Patent: May 9, 2023

(54) RECORDING MEDIUM AND METHOD

(71) Applicant: OMRON Corporation, Kyoto (JP)

(72) Inventors: Nobuo Kataoka, Kyoto (JP); Seiji Mizutani, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 17/618,877

(22) PCT Filed: Feb. 27, 2020

(86) PCT No.: PCT/JP2020/007944
§ 371 (c)(1),
(2) Date: Dec. 13, 2021

(87) PCT Pub. No.: WO2021/005825
PCT Pub. Date: Jan. 14, 2021

(65) Prior Publication Data
US 2022/0263689 A1 Aug. 18, 2022

(30) Foreign Application Priority Data
Jul. 8, 2019 (JP) .............................. JP2019-127093

(51) Int. Cl.
*H04L 25/02* (2006.01)
*H04L 25/49* (2006.01)

(52) U.S. Cl.
CPC .......... *H04L 25/0262* (2013.01); *H04L 25/49* (2013.01); *H04L 25/4902* (2013.01)

(58) Field of Classification Search
CPC .. H04L 25/0262; H04L 25/49; H04L 25/4902
See application file for complete search history.

(56) References Cited

U.S. PATENT DOCUMENTS

| 4,701,938 A | * | 10/1987 | Bell | ...................... H04L 7/0083 |
| | | | | 327/131 |
| 6,548,967 B1 | * | 4/2003 | Dowling | ................. H04W 4/02 |
| | | | | 315/318 |

(Continued)

FOREIGN PATENT DOCUMENTS

| JP | H05266392 | 10/1993 |
| JP | 2003185493 | 7/2003 |

(Continued)

OTHER PUBLICATIONS

"International Search Report (Form PCT/ISA/210) of PCT/JP2020/007944," dated Apr. 7, 2020, with English translation thereof, pp. 1-4.

(Continued)

*Primary Examiner* — James M Perez
(74) *Attorney, Agent, or Firm* — JCIPRNET

(57) ABSTRACT

The present invention enables an apparatus or the like, which does not respond to a communication using a superposed signal, to be used in a system using the superposed signal. This control program, which is for a terminal device connectable to a signal processing device through a communication cable, includes: first identification information acquisition steps for acquiring, from the signal processing device, first identification information for identifying the signal processing device in the terminal device; second identification information acquisition steps for acquiring, through an input part of the terminal device, second identification information for identifying an electric apparatus that is electrically connected to the signal processing device and operates an operation element; generation steps for generating association information for associating the first identification information with the second identification information; and output steps for outputting the association (Continued)

information so that the association information is received by the information processing device.

13 Claims, 29 Drawing Sheets

(56) References Cited

U.S. PATENT DOCUMENTS

| | | | | |
|---|---|---|---|---|
| 7,069,025 | B2* | 6/2006 | Goren | H04L 65/1043 340/8.1 |
| 7,342,548 | B2* | 3/2008 | Taniguchi | H01Q 1/2216 343/742 |
| 7,724,140 | B2* | 5/2010 | Saito | G01S 7/40 340/572.1 |
| 8,595,400 | B2* | 11/2013 | Mizutani | H04L 12/40013 700/8 |
| 9,398,080 | B2* | 7/2016 | Mizutani | G05B 19/05 |
| 9,639,077 | B2* | 5/2017 | Mizutani | G05B 19/05 |
| 9,836,038 | B2* | 12/2017 | Mizutani | G05B 15/02 |
| 10,119,920 | B2* | 11/2018 | Mizutani | G02B 21/0004 |
| 10,270,489 | B2* | 4/2019 | Kearney | H05B 47/185 |
| 10,277,417 | B2* | 4/2019 | Mizutani | H04L 12/423 |
| 10,409,244 | B2* | 9/2019 | Mizutani | G05B 19/05 |
| 10,536,244 | B2* | 1/2020 | Mizutani | G05B 19/0425 |
| 10,572,408 | B2* | 2/2020 | Kataoka | H04B 3/548 |
| 10,677,840 | B2* | 6/2020 | Harada | G01R 31/2829 |
| 2002/0098852 | A1* | 7/2002 | Goren | H04L 47/745 455/403 |
| 2003/0069713 | A1* | 4/2003 | Friedl | G01D 3/022 702/127 |
| 2004/0199352 | A1* | 10/2004 | Kojima | H04L 12/403 702/111 |
| 2007/0213958 | A1* | 9/2007 | Friedl | G01D 3/022 702/189 |
| 2009/0013335 | A1* | 1/2009 | Hung | H04L 67/303 719/321 |
| 2009/0077455 | A1* | 3/2009 | Mizutani | H04L 1/0061 714/807 |
| 2012/0179849 | A1* | 7/2012 | Mizutani | H04L 12/40013 710/110 |
| 2014/0185931 | A1* | 7/2014 | Aoki | H04N 1/62 382/167 |
| 2014/0200684 | A1* | 7/2014 | Mizutani | G05B 19/4185 700/23 |
| 2015/0039099 | A1* | 2/2015 | Mizutani | G05B 19/05 700/3 |
| 2015/0043358 | A1* | 2/2015 | Wiley | H04L 1/0014 370/242 |
| 2015/0058432 | A1* | 2/2015 | Mizutani | H04L 67/10 709/208 |
| 2016/0266563 | A1* | 9/2016 | Mizutani | G05B 19/0421 |
| 2016/0349840 | A1* | 12/2016 | Fujiwara | G06V 40/171 |
| 2017/0099158 | A1* | 4/2017 | Mizutani | H04L 12/403 |
| 2018/0080763 | A1* | 3/2018 | Kasahara | G06T 7/0002 |
| 2018/0138945 | A1* | 5/2018 | Kearney | G05B 15/02 |
| 2018/0195952 | A1* | 7/2018 | Mizutani | G01N 21/23 |
| 2018/0210407 | A1* | 7/2018 | Namie | G05B 13/041 |
| 2018/0224841 | A1* | 8/2018 | Tani | G05B 23/0259 |
| 2018/0255373 | A1* | 9/2018 | Koezuka | H04Q 9/00 |
| 2018/0267912 | A1* | 9/2018 | Kataoka | H04B 3/548 |
| 2018/0343092 | A1* | 11/2018 | Mizutani | G05B 19/4184 |
| 2019/0004106 | A1* | 1/2019 | Harada | G01R 31/2829 |
| 2019/0072945 | A1* | 3/2019 | Matsuyama | G06N 20/00 |
| 2019/0102583 | A1* | 4/2019 | Nakano | H04B 17/318 |
| 2019/0139212 | A1* | 5/2019 | Hanzawa | G06V 10/774 |
| 2019/0238183 | A1* | 8/2019 | Kearney | H04L 12/66 |
| 2020/0278658 | A1* | 9/2020 | Tanaka | H02P 29/024 |
| 2021/0213606 | A1* | 7/2021 | Suzumura | B25J 13/089 |
| 2021/0281713 | A1* | 9/2021 | Kato | G06T 7/90 |
| 2021/0350695 | A1* | 11/2021 | Kataoka | G08C 15/00 |
| 2022/0050622 | A1* | 2/2022 | Kataoka | G06F 13/4282 |
| 2022/0224574 | A1* | 7/2022 | Kataoka | H04L 25/4917 |
| 2022/0245872 | A1* | 8/2022 | Fujimoto | G06Q 50/04 |
| 2022/0262234 | A1* | 8/2022 | Kataoka | H04L 25/4917 |
| 2022/0263689 | A1* | 8/2022 | Kataoka | H04L 25/0262 |

FOREIGN PATENT DOCUMENTS

| | | |
|---|---|---|
| JP | 2018151915 | 9/2018 |
| JP | 2019012906 | 1/2019 |

OTHER PUBLICATIONS

"Written Opinion of the International Searching Authority (Form PCT/ISA/237) of PCT/JP2020/007944," dated Apr. 7, 2020, with English translation thereof, pp. 1-6.

"IO-Link Interface and System Specification," version 1.1. 2, Jul. 2013, IO-Link Community, Order No. 10. 002, 4 Overview of SDCI, pp. 1-262.

* cited by examiner (a)

| cable mode | cable ID |
|---|---|
| XSIDnn-n | 181012-02 |

(b)

| apparatus model | apparatus ID | maintenance date |
|---|---|---|
| WLCA-N | 12344 | 2019/1/31 |

(c)

| cable information | | apparatus information | | |
|---|---|---|---|---|
| cable model | cable ID | apparatus model | apparatus ID | maintenance date |
| XSIDnn-n | 181012-02 | WLCA-N | 12344 | 2019/1/31 |

(d)

| unit ID | bit value | association information |
|---|---|---|
| IO-001 | 01 | |

(e)

| address information | | | | association information |
|---|---|---|---|---|
| controller ID | network ID | node ID | bit value | |
| PLC-1 | Net1 | Node1 | 01 | |

FIG. 25

| controller ID | address information | | bit value | cable information | | apparatus information | | maintenance date |
|---|---|---|---|---|---|---|---|---|
| | network ID | node ID | | cable model | cable ID | apparatus model | apparatus ID | |
| PLC-1 | Net 1 | Node 1 | 00 | XSIDnn-n | 181012-01 | Wxxx | 0001 | 2019/1/10 |
| PLC-1 | Net 1 | Node 1 | 01 | XSIDnn-n | 181012-02 | WLCA-N | 12344 | 2019/1/31 |
| PLC-1 | Net 1 | Node 2 | 00 | XSIDnn-n | 181012-03 | WLCAN | 0101 | 2019/1/10 |
| PLC-1 | Net 1 | Node 2 | 01 | XSIDnn-n | 181012-04 | Wxxx | 0101 | 2019/1/9 |
| PLC-1 | Net 2 | Node 1 | 00 | *** | * | * | * | //** |
| PLC-1 | Net 2 | Node 1 | 01 | *** | * | * | * | //** |
| PLC-1 | .. | .. | .. | .. | .. | .. | .. | .. |
| PLC-2 | Net 1 | Node 1 | 00 | *** | * | * | * | //** |
| PLC-2 | Net 1 | Node 1 | 01 | *** | * | * | * | //** |
| .. | | | | | | | | |

| unit ID | bit value | cable information |
|---|---|---|
| IO-001 | 01 | |

(b)

| address information | | | | cable information |
|---|---|---|---|---|
| controller ID | network ID | node ID | bit value | |
| PLC-1 | Net1 | Node1 | 01 | |

FIG. 28

RECORDING MEDIUM AND METHOD

CROSS-REFERENCE TO RELATED APPLICATION

This application is a 371 application of the International PCT application serial no. PCT/JP2020/007944, filed on Feb. 27, 2020, which claims the priority benefits of Japan Patent Application No. 2019-127093, filed on Jul. 8, 2019. The entirety of each of the above-mentioned patent applications is hereby incorporated by reference herein and made a part of this specification.

TECHNICAL FIELD

The present invention relates to a control program for a terminal device that is connectable with a signal processing device or the like that processes an electrical signal and a method of managing information regarding the signal processing device or the like.

BACKGROUND ART

In the related art, there are three-line electric apparatuses (sensors and the like) that perform transmission and reception of communication data in addition to detection information. Such an electric apparatus requires at least two power source lines and one signal line in order to supply power and input and output signals. One three-line communication method is IO-LINK (registered trademark). Non-Patent Literature 1 is a specification of IO-Link.

CITATION LIST

Patent Literature

Patent Literature 1

Japanese Patent Laid-Open No. 2019-12906 (published on Jan. 24, 2019)

Non-Patent Literature

Non-Patent Literature 1

"IO-Link Interface and System Specification," version 1.1.2, July 2013, IO-Link Community, Order No: 10.002, 4 Overview of SDCI, p. 32 to p. 37

SUMMARY OF INVENTION

Technical Problem

However, the technique in Non-Patent Literature 1 has a problem that the number of wires increases. Also, according to the technique in Non-Patent Literature 1, a sensor converts a detection signal of the sensor into communication data and transmits the communication data to the outside. Therefore, there is a problem that the time required by the external apparatus to recognize the detection signal increases or the circuit configurations of the sensor and the external apparatus become complicated for the conversion processing.

On the other hand, using a superposed signal obtained by superposing a signal regarding an operation element with a data signal for communication to thereby reduce the number of wires can be conceived as an example of a technique for reducing the number of wires (Patent Literature 1, for example).

Incidentally, from the viewpoint of enhancing a degree of freedom in system construction and improving convenience for introducing a series of systems using superposed signals, there is progress to be made in developing systems such that apparatuses, devices, or the like that are not compatible with communication using superposed signals can also be incorporated and used in the aforementioned series of systems.

An objective of an aspect of the present disclosure is to provide a control program, a method, and the like that enables apparatuses and the like that are not compatible with communication using superposed signals to be used in a system using superposed signals.

Solution to Problem

The present invention employs the following configurations in order to solve the aforementioned problem as an example of the present disclosure.

In other words, a control program according to an aspect of the present disclosure is a control program, which is for a terminal device connectable to a signal processing device through a communication cable, the signal processing device including a superposed signal transmission part that transmits an operation signal in accordance with a state of an operation element to a different device or that receives an operation signal for controlling the operation element from the different device and transmits, to the different device, a superposed signal obtained by superposing a data signal indicating prescribed information with the operation signal, and an information storage part that stores the prescribed information, the control program causing the terminal device to execute: a first identification information acquisition step for acquiring, from the signal processing device via the communication cable, first identification information for identifying the signal processing device as the prescribed information; a second identification information acquisition step for acquiring, through an input part of the terminal device operated by a user, second identification information for identifying an electric apparatus that is electrically connected to the signal processing device and operates the operation element by transmitting and receiving the operation signal to and from the signal processing device; a generation step for generating association information for associating the first identification information with the second identification information; and an output step for outputting the association information so that the association information is received by an information processing device that controls or monitors a plurality of the electric apparatuses through the signal processing device.

A method according to an aspect of the present disclosure is a method of managing information regarding a signal processing device and an electric apparatus using a terminal device that is connectable with the signal processing device through a communication cable, the signal processing device including a superposed signal transmission part that transmits an operation signal in accordance with a state of an operation element to a different device or that receives an operation signal for controlling the operation element from the different device and transmits a superposed signal obtained by superposing a data signal indicating prescribed information with the operation signal to the different device, and an information storage part that stores the prescribed information, the electric apparatus being electrically connected to the signal processing device and operating the operation element by transmitting and receiving the operation signal to and from the signal processing device, the method including: a first identification information acquisition step in which the terminal device acquires, from the signal processing device via the communication cable, first identification information for identifying the signal processing device as the prescribed information; a second identification information acquisition step in which the terminal device is electrically connected to the signal processing device and acquires, through an input part of the terminal device operated by a user, second identification information for identifying the electric apparatus; a generation step in which the terminal device generates association information for associating the first identification information with the second identification information; and an output step in which the terminal device outputs the association information so that the association information is received by an information processing device that controls or monitors a plurality of the electric apparatuses through the signal processing device.

Advantageous Effects of Invention

According to an aspect of the present disclosure, it is possible to provide a control program, a method, and the like that enables apparatuses, devices, or the like that are not compatible with communication using superposed signals to be used in a system using superposed signals.

Figure 23:
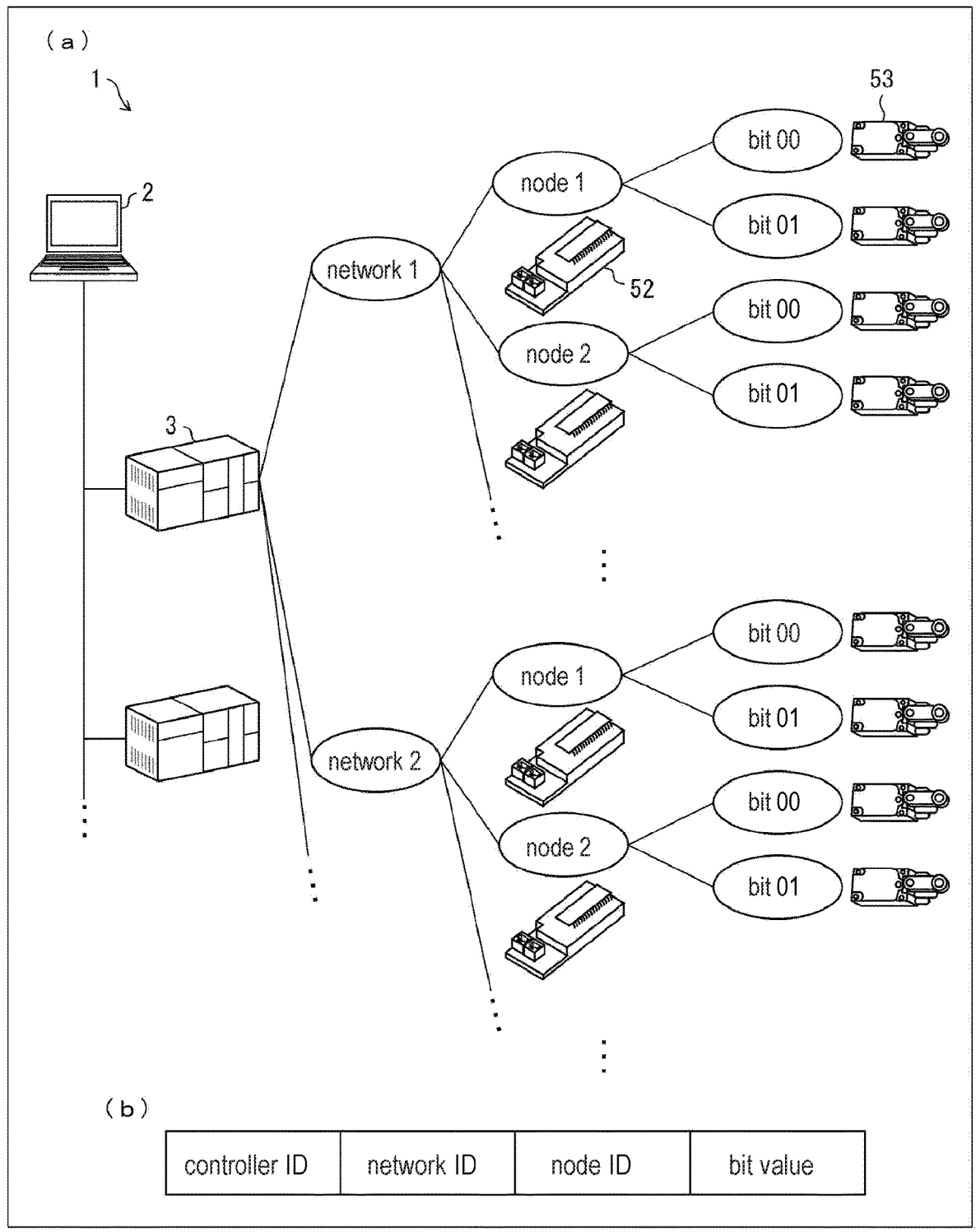

(a) of FIG. 23 is a diagram for explaining an example of a network configuration constructed in a communication system according to an aspect of the present disclosure, and (b) is a diagram illustrating an example of a data structure of address information managed by the network in the communication system.

Figure 24:
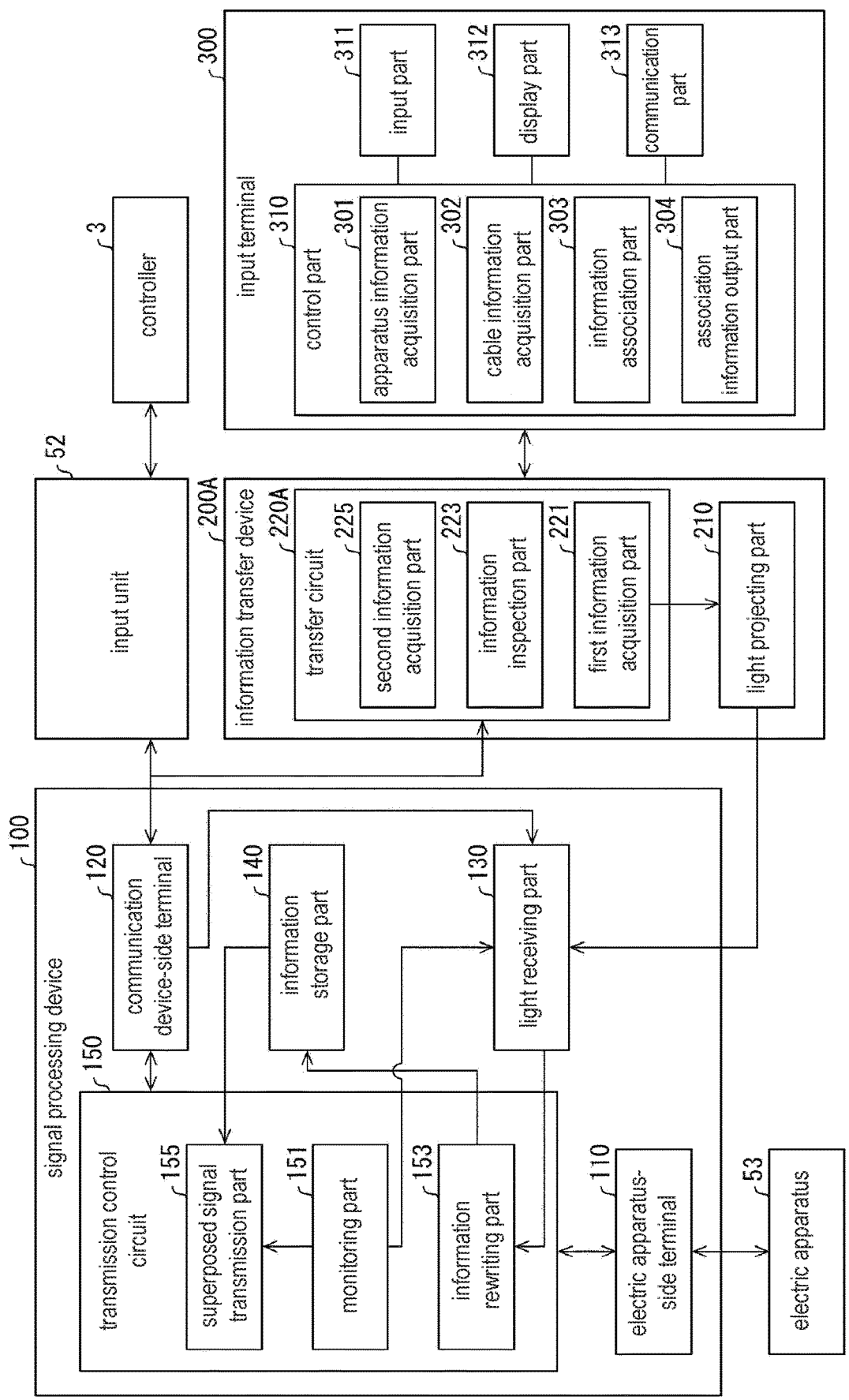

FIG. 24 is a block diagram illustrating configurations of the signal processing device, the information transfer device, and the input terminal according to an aspect of the present disclosure.

(a) of FIG. 25 is a diagram illustrating an example of a data structure of cable information, (b) is a diagram illustrating an example of a data structure of apparatus information, (c) is a diagram illustrating an example of a data structure of association information, (d) is a diagram illustrating an example of a data structure of first relay information, and (e) is a diagram illustrating an example of a data structure of second relay information.

FIG. 26 is a diagram illustrating an example of a data structure of a configuration table.

Figure 27:
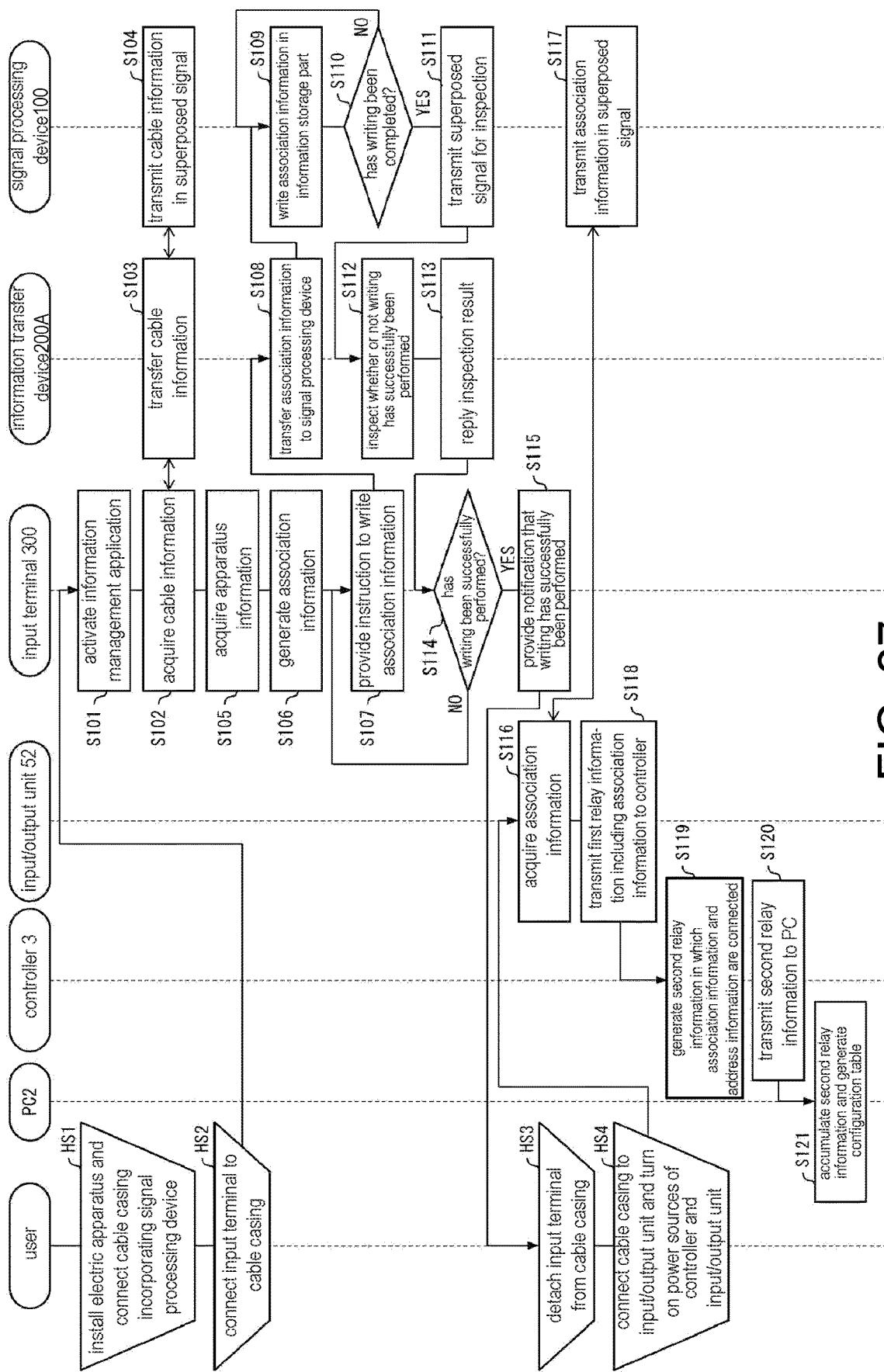

FIG. 27 is a flowchart illustrating a processing flow of each apparatus belonging to the communication system according to an aspect of the present disclosure.

(a) of FIG. 28 is a diagram illustrating an example of a data structure of the first relay information, and (b) is a diagram illustrating an example of a data structure of the second relay information.

Figure 29:
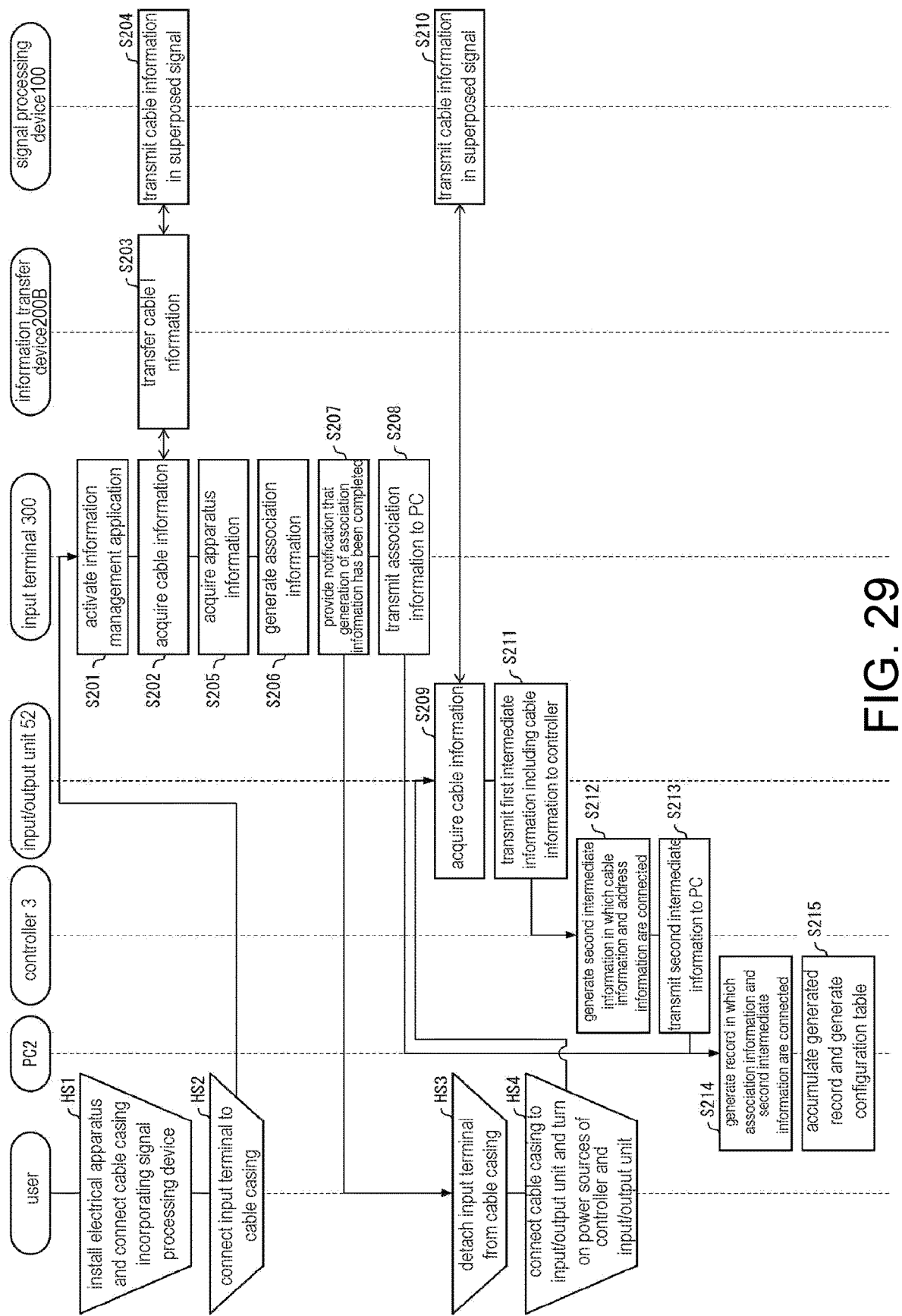

FIG. 29 is a flowchart illustrating a processing flow of each apparatus belonging to the communication system according to an aspect of the present disclosure.

DESCRIPTION OF EMBODIMENTS

First Embodiment

§ 1 Configuration Example Serving as Premise (Configurations of Electric Apparatus and Communication Device that are Compatible with Superposed Signals)

Figure 2:
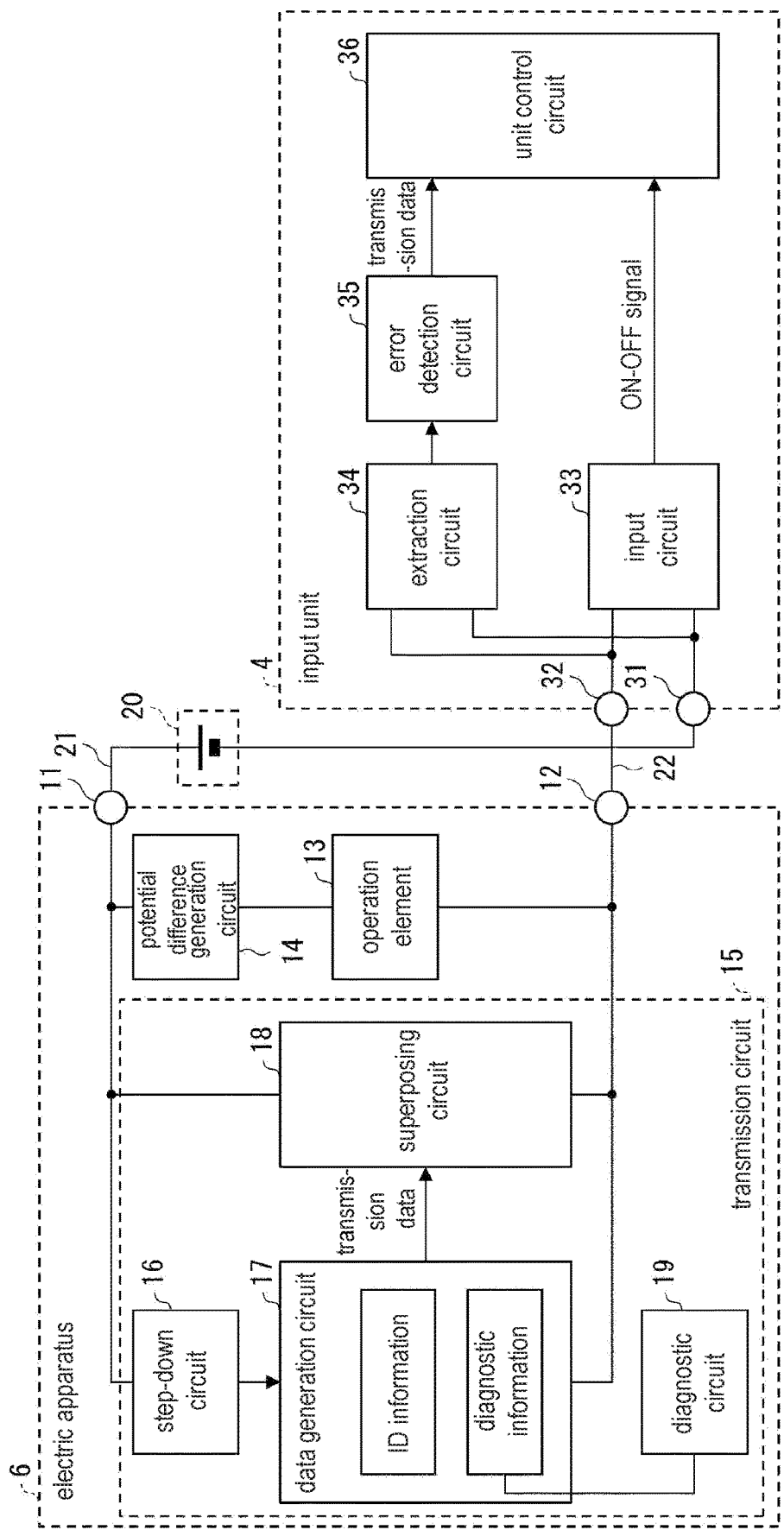
FIG. 2 is a block diagram illustrating circuit configurations of an electric apparatus that is compatible with a superposed signal and an input unit that serves as a communication device.

Before describing an electric apparatus and the like according to an aspect of the present disclosure, configurations of electric apparatuses and the like that are compatible with communication using superposed signals obtained by superposing signals regarding an operation element with data signals will be described using FIG. 2 first. FIG. 2 is a block diagram illustrating an example of circuit configurations of an electric apparatus and an input unit that is a communication device, which are compatible with superposed signals. Here, description will be given by exemplifying an electric apparatus 6 (limit switch) and an input unit 4. The electric apparatus 6 and the input unit 4 are connected to each other with a pair of signal lines 21 and 22. The signal line 21 is connected to a first input terminal 31 of the input unit 4 and a first terminal 11 of the electric apparatus 6. The signal line 22 is connected to a second input terminal 32 of the input unit 4 and a second terminal 12 of the electric apparatus 6. A power source 20 is provided in the path of the signal line 21. The power source 20 is a DC power source that generates a prescribed voltage (24 V in this case).

The electric apparatus 6 includes the first terminal 11, the second terminal 12, an operation element 13, a potential difference generation circuit 14, and a transmission circuit 15. The transmission circuit 15 includes a step-down circuit 16, a data generation circuit 17, a superposing circuit 18, and a diagnostic circuit 19. The operation element 13 is connected between the first terminal 11 and the second terminal 12. The potential difference generation circuit 14 is connected to the operation element 13 in series in a power distribution path between the first terminal 11 and the second terminal 12. The potential of the second terminal 12 changes in accordance with a state of the operation element 13. In other words, the second terminal 12 outputs an output signal (operation signal) in accordance with the state of the operation element 13 to the outside (signal line 22).

The transmission circuit 15 is connected between the first terminal 11 and the second terminal 12. The transmission circuit 15 operates using a voltage between the first terminal 11 and the second terminal 12 as a power source. The step-down circuit 16 steps down the voltage between the first terminal 11 and the second terminal 12 to a prescribed voltage and outputs the prescribed voltage to the data generation circuit 17. The data generation circuit 17 operates using a voltage applied from the step-down circuit 16 and generates transmission data to be transmitted to the input unit 4. The transmission data includes, for example, an identifier (ID information) unique to the electric apparatus 6. The data generation circuit 17 outputs transmission data to the superposing circuit 18. The superposing circuit 18 superposes received transmission data as a data signal with the output signal. In this manner, the transmission circuit 15 outputs the superposed signal obtained by superposing the data signal with the output signal from the second terminal 12 to the signal line 22.

The diagnostic circuit 19 operates using a voltage applied from the step-down circuit 16 and generates diagnostic data representing diagnostic information of the electric apparatus 6. The diagnostic circuit 19 includes a check circuit regarding an element (for example, the operation element 13) of the electric apparatus 6 and generates diagnostic data indicating whether or not the electric apparatus 6 operates normally in accordance with whether or not the check circuit performs output normally. The diagnostic circuit 19 outputs the diagnostic data (diagnostic information) to the data generation circuit 17. The data generation circuit 17 may include the diagnostic data in transmission data.

Figure 3:
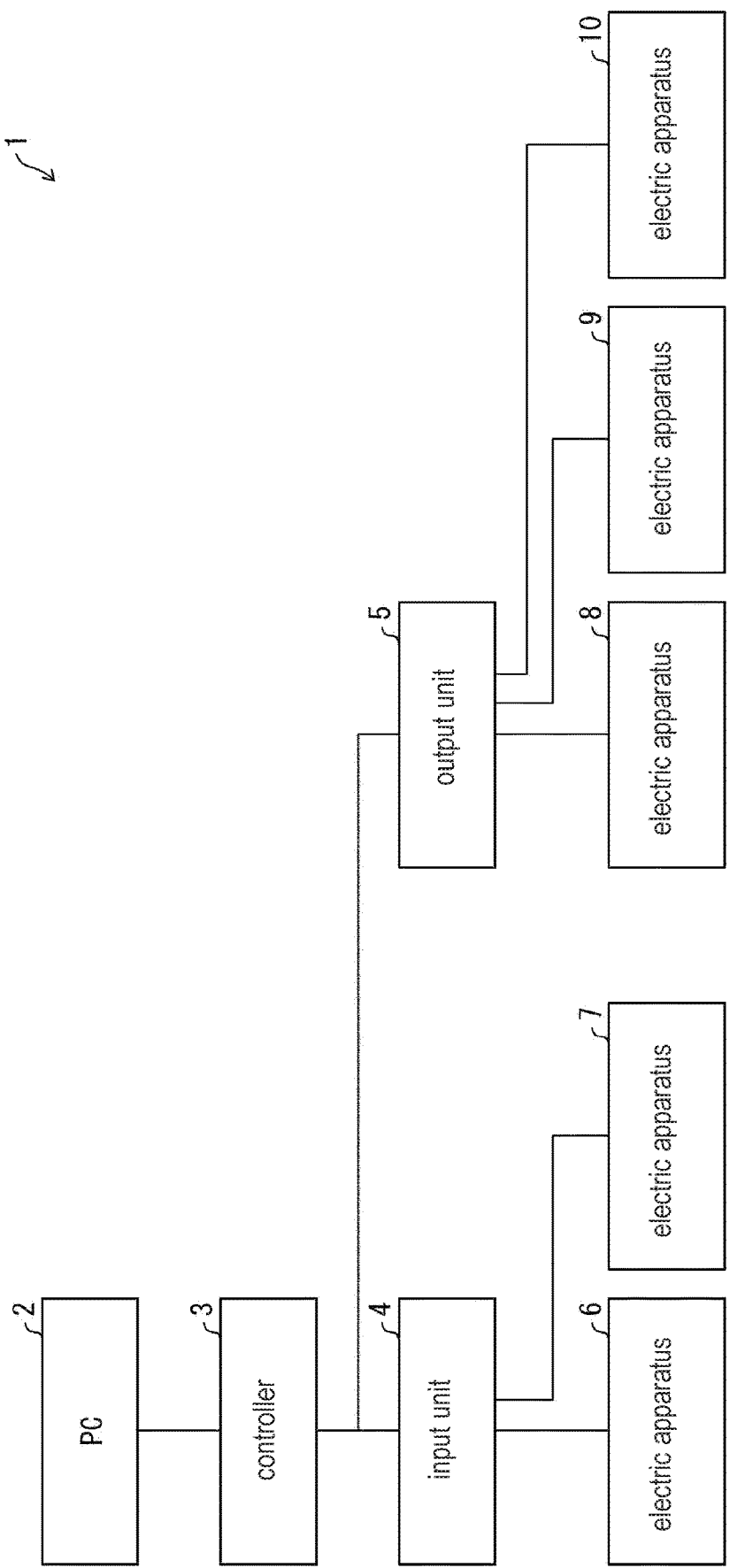
FIG. 3 is a block diagram illustrating a configuration of a control system according to an aspect of the present disclosure.

The input unit 4 includes a first input terminal 31, a second input terminal 32, an input circuit 33, an extraction circuit 34, an error detection circuit 35, and a unit control circuit 36. In FIG. 2, illustration of the configuration of a part that performs transmission to a controller 3 illustrated in FIG. 3 is omitted. The potential of the first input terminal 31 is maintained constant (at GND, for example). A superposed signal is input from the signal line 22 to the second input terminal 32.

The input circuit 33 extracts an output signal from the superposed signal and outputs the output signal to the unit control circuit 36. The extraction circuit 34 extracts a data signal from the superposed signal and outputs the data signal to the error detection circuit 35. The error detection circuit 35 performs error detection on the data signal using an arbitrary data checking method such as a CRC check (cyclic redundancy check) or Manchester code check. The error detection circuit 35 outputs the data signal and the error detection result to the unit control circuit 36. Also, the error detection circuit 35 may not output the data signal to the unit control circuit 36 in a case in which an error is detected in the data signal. The unit control circuit 36 outputs the output signal and the data signal to the controller 3. The error detection circuit 35 and the unit control circuit 36 can be configured with, for example, a single integrated circuit or a plurality of integrated circuits.

(Configuration of Communication System 1)

FIG. 3 is a block diagram illustrating a configuration of a communication system including the electric apparatus 6 that is compatible with superposed signals. A communication system 1 includes a personal computer 2 (a PC or an information processing device), the controller 3, the input unit 4, the output unit 5, and electric apparatuses 6 to 10. The PC 2 is connected to the controller 3. The PC 2 receives information regarding the electric apparatuses 6 to 10 from the controller 3 and transmits a control command to the controller 3. The controller 3 is connected to the input unit 4 and the output unit 5. The controller 3 transmits a signal for operating or controlling the electric apparatuses 6 to 10 to the input unit 4 and the output unit 5 in accordance with the control command. The controller 3 transmits signals from the electric apparatuses 6 to 10 received via the input unit 4 or the output unit 5 to the PC 2.

The input unit 4 is a receiver (communication device), is mutually communicably connected to the plurality of electric apparatuses, and can receive a superposed signal from each electric apparatus. In the illustrated example, each of the electric apparatuses 6 and 7 is connected to the input unit 4. In other words, the input unit 4 can receive superposed signals from the electric apparatuses 6 and 7. In this configuration example, the input unit 4 periodically receives data signals included in the superposed signals from the electric apparatuses 6 and 7. Also, the data signals may not be received periodically. The connection between the input unit and the electric apparatuses 6 and 7 is established by, for example, a pair of signal lines. In addition, the input unit 4 can extract data signals from the received superposed signals, determine communication states between the electric apparatuses that are transmission sources of the superposed signals and the input unit 4 itself, and output the result to the controller 3. The input unit 4 can constitute the communication system 1 as illustrated in FIG. 3 along with a plurality of apparatuses such as the electric apparatuses 6 and 7 and the controller 3.

The input unit 4 can detect whether or not it is possible to consider a communication error as having occurred in a transition period of values of the operation signals in the electric apparatuses 6 and 7 when the communication error is detected in communication with the electric apparatuses 6 and 7 in regard to the communication states with the electric apparatuses 6 and 7. Communication errors detected in periods other than the transition period include, for example, a communication error caused by repetition of instantaneous disconnection when a contact point of a switch is in an unstable state, a communication error caused by disturbance noise, and wire disconnection.

The electric apparatuses 6 and 7 operate using power supplied from the input unit 4 and transmit signals in accordance with the states of the operation elements included in the electric apparatuses 6 and 7 to the input unit 4. Here, the electric apparatus 6 is a limit switch including a switch as the operation element. The electric apparatus 7 is a sensor including a sensing element as the operation element. When the electric apparatus 6 is a limit switch and the electric apparatus 7 is a sensor, the operation element 13 can output an ON/OFF signal as an output signal (operation signal). Although the case in which the electric apparatus 6 is a limit switch will be described below, it is also possible to similarly apply the present invention to the case in which the electric apparatus 7 is a sensor.

The output unit 5 (communication device) is connected to the electric apparatuses 8 to 10. Each of the electric apparatuses 8 to 10 is connected to the output unit 5 with a pair of signal lines. The output unit 5 operates the electric apparatuses 8 to 10 and controls the electric apparatuses 8 to 10 on the basis of instructions from the PC 2 and the controller 3. Also, the output unit 5 transmits data signals received from the electric apparatuses 8 to 10 to the controller 3. The output unit 5 can receive superposed signals from the electric apparatuses 8 to 10 and extract the data signals from the received superposed signals. Moreover, the output unit 5 can determine communication states between the output unit 5 and the electric apparatuses. Then, the output unit 5 can output the determination result to the controller 3.

The electric apparatuses 8 to 10 operate using power supplied from the output unit 5 and are controlled using control signals received from the output unit 5. Here, the electric apparatus 8 is a relay apparatus including a coil as an operation element. The electric apparatus 9 is an electromagnetic valve including a coil as an operation element. The electric apparatus 10 is an electric actuator including a coil as an operation element.

(Operations of Electric Apparatus 6 and Input Unit 4 in Communication Using Superposed Signals)

Figure 4:
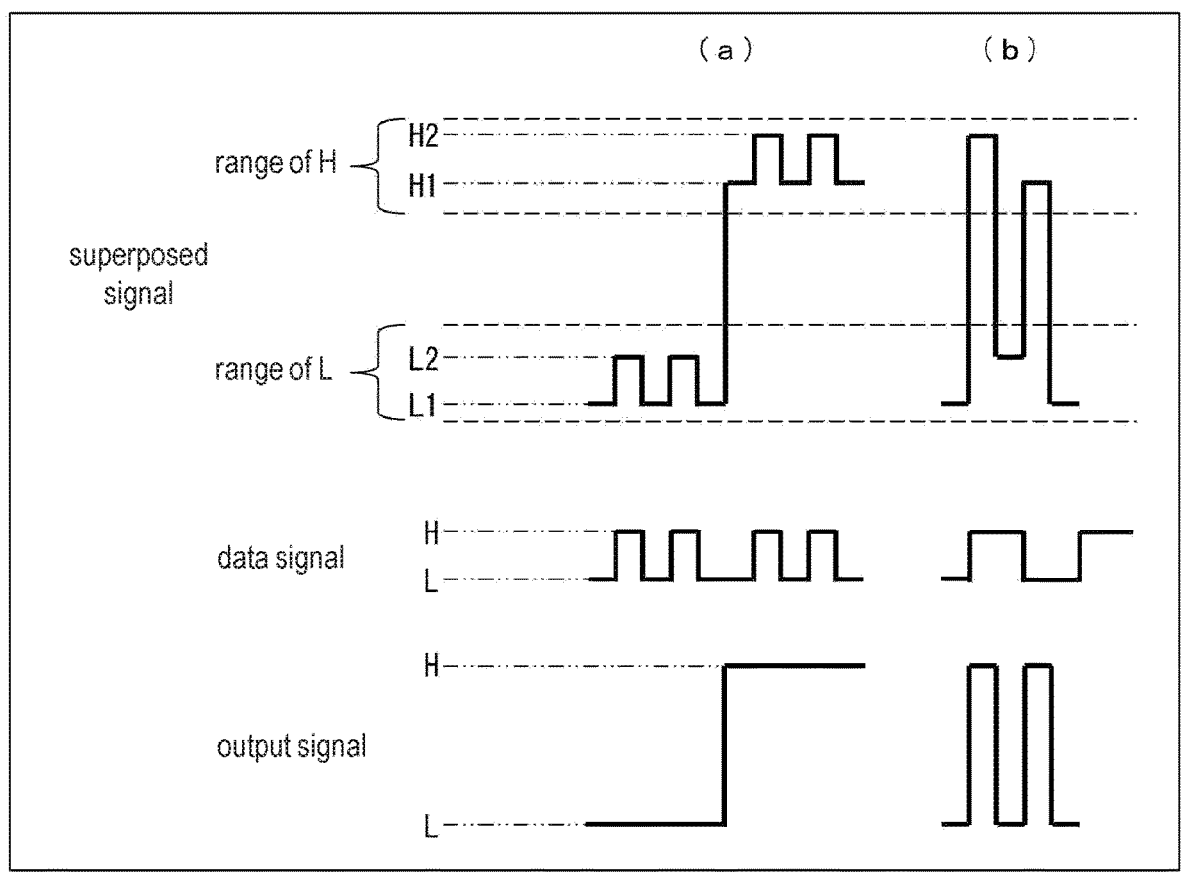
FIG. 4 is a diagram schematically illustrating an example of a signal waveform.

In regard to operations of an electric apparatus and a communication device in communication using superposed signals, an example of operations of the electric apparatus 6 and the input unit 4 will be described using FIG. 4. FIG. 4 can be similarly described for the combination of the electric apparatus 7 and the input unit 4 and also a combination of any of the electric apparatuses 8 to 10 and the output unit 5. FIG. 4 is a diagram schematically illustrating an example of a signal waveform. In FIG. 4, (a) illustrates a case in which a cycle of an output signal (operation signal) is longer than a cycle of a data signal, and (b) illustrates a case in which the cycle of the output signal is shorter than the cycle of the data signal. A signal obtained by superposing the output signal and the data signal is the superposed signal. The waveform of the superposed signal is a waveform obtained by superposing the waveform of the output signal and the waveform of the data signal. The amplitude of the output signal is larger than the amplitude of the data signal. It is thus possible to know the value of the original output signal and the value of the original data signal from the superposed signal. Here, the output signal is H in a case in which the switch of the electric apparatus 6 is ON, while the output signal is L in a case in which the switch of the electric apparatus 6 is OFF.

Values of the superposed signal are divided into L1, L2, H1, and H2 in ascending order. The output signal is L when the superposed signal falls within a range of L. The range of L includes L1 and L2. The output signal is H when the superposed signal falls within a range of H that is higher than the range of L. The range of H includes H1 and H2. The data signal is L in a case in which the superposed signal is L1 or H1. The data signal is H in a case in which the superposed signal is L2 or H2.

The input unit 4 receives the superposed signal from the electric apparatus 6 and then determines which of H and L the output signal is from the superposed signal (which of ON and OFF the switch of the electric apparatus 6 is). Then, the input unit 4 can extract the data signal from the superposed signal and output information in accordance with the data signal to the outside.

The input unit 4 can thus determine which of ON and OFF the switch of the electric apparatus 6 is on the basis of the superposed signal and further execute processing in accordance with the data signal.

Also, the input unit 4 can output an identifier and position information of the electric apparatus 6 along with information indicating wire disconnection and the like to the outside. The PC 2 can notify a user of a communication state between the input unit 4 and the electric apparatus 6 using three categories, for example, normal, warning, and failure, in accordance with information received from the input unit 4 via the controller 3. The user can determine whether or not to perform maintenance on the electric apparatus 6 by acquiring the information regarding the communication state between the input unit 4 and the electric apparatus 6 using the PC 2.

§ 2 Configuration Example

Since a data signal is superposed with an output signal and is then transmitted in communication using superposed signals, the electric apparatus 6, which is an apparatus that is not compatible with the communication using superposed signals (hereinafter, superposed-signal-communication-incompatible apparatus) does not transmit a data signal to the input unit 4 in a case in which the electric apparatus 6 is connected to the input unit 4 that is compatible with superposed signals, for example. In this case, since the input unit 4 cannot extract the data signal from the superposed signal, it is possible to execute only processing equivalent to that of the input unit 4 that is not compatible with superposed signals. Thus, the signal processing device according to an aspect of the present disclosure creates a superposed signal obtained by superposing prescribed information regarding the electric apparatus 6 stored in advance as a data signal with an operation signal of the electric apparatus 6 and transmits the superposed signal to the input unit 4.

(Configurations of Signal Processing Device and Information Rewriting Device)

Figure 1:
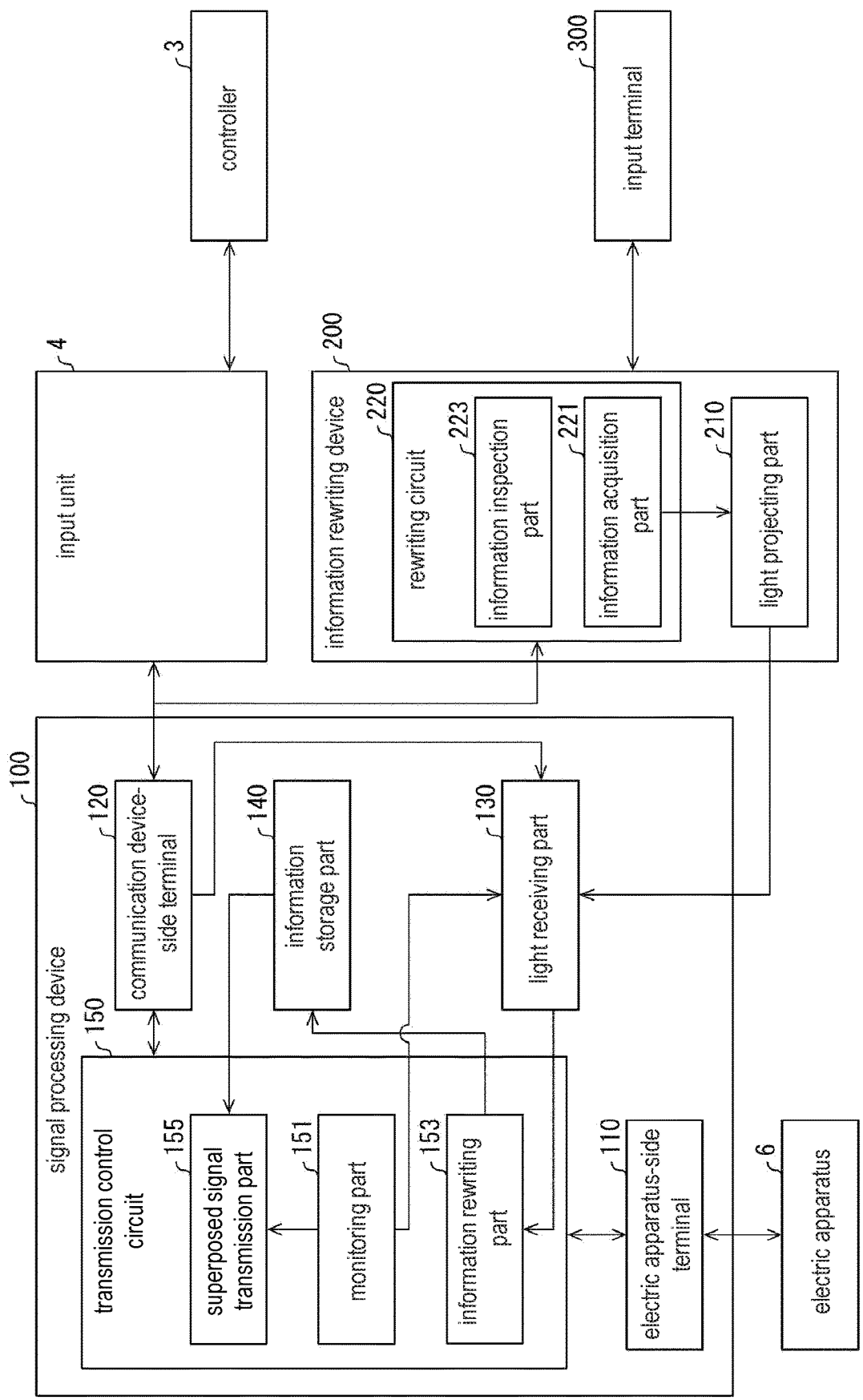
FIG. 1 is a block diagram illustrating configurations of a signal processing device and an information rewriting device according to an aspect of the present disclosure.

FIG. 1 is a block diagram illustrating configurations of a signal processing device 100 and an information rewriting device 200 according to an aspect of the present disclosure. In the following description, the input unit 4 is assumed to be compatible with communication using superposed signals. Also, the input unit 4 that is compatible with communication using superposed signals will be described below as a unit electrically connected to the electric apparatuses 6 and 7 via the signal processing device 100. However, the following description can also be applied to the output unit 5 as a unit electrically connected to the electric apparatuses 8, 9, and 10 via the signal processing device 100 on the basis of a similar technical idea. In other words, it is possible to electrically connect the output unit 5 that is compatible with communication using superposed signals to the electric apparatuses 8, 9, and 10 via the signal processing device 100. Here, each of the electric apparatuses 6 to 10 may be a superposed-signal-communication-incompatible apparatus.

The signal processing device 100 can receive prescribed information regarding the electric apparatus 6 from the information rewriting device 200 and store the prescribed information. The signal processing device 100 can generate a superposed signal by superposing the prescribed information as a data signal with an operation signal of the electric apparatus 6 and transmit the superposed signal to the input unit 4. The signal processing device 100 may have any configuration that can be disposed between the electric apparatus 6 and the input unit 4 and may have an outer shape like a communication cable, for example. The signal processing device 100 includes an electric-apparatus-side terminal 110, a communication-device-side terminal 120, a light receiving part 130, an information storage part 140, and a transmission control circuit 150. The transmission control circuit 150 includes a monitoring part 151, an information rewriting part 153, and a superposed signal transmission part 155.

The electric-apparatus-side terminal 110 is a terminal for the signal processing device 100 to transmit or receive an output signal to and from the external electric apparatus 6. The electric-apparatus-side terminal 110 and the electric apparatus 6 are connected with a communication cable or the like. The communication-device-side terminal 120 is a terminal for the signal processing device 100 to transmit or receive an output signal to or from the input unit 4. The communication-device-side terminal 120 is also a terminal for the signal processing device 100 to transmit a superposed signal to the information rewriting device 200. Although two components, that is, the input unit 4 and the information rewriting device 200, are connected to the single communication-device-side terminal 120 in the illustrated example, the communication-device-side terminal 120 can be selectively connected to either of them.

The light receiving part 130 can receive an optical signal from the outside. Specifically, the light receiving part 130 can receive prescribed information regarding the electric apparatus 6 as an optical signal from the information rewriting device 200. The light receiving part 130 may be a photo transistor (PhotoTR in FIG. 5) that generates a current when it receives light, for example, and the optical signal received by the light receiving part 130 is transmitted to the information rewriting part 153. Also, the signal processing device 100 may be provided with a window part that transmits light therethrough such that the light receiving part 130 can efficiently receive the optical signal.

The information storage part 140 can store the prescribed information regarding the electric apparatus 6. The information rewriting part 153 writes the prescribed information in the information storage part 140, and the superposed signal transmission part 155 reads the prescribed information from the information storage part 140.

The transmission control circuit 150 includes a part of the configuration of the transmission circuit 15 in FIG. 2 in addition to the monitoring part 151, the information rewriting part 153, and the superposed signal transmission part 155. In other words, the transmission control circuit 150 further includes a data generation circuit 17, a superposing circuit 18, a diagnostic circuit 19, and the like, which are not illustrated in FIG. 1. The data generation circuit 17, the diagnostic circuit 19, the monitoring part 151, and the information rewriting part 153 may be realized by a micro processing unit (MPU), for example, executing commands of a program that is software for realizing each component using information stored in a memory.

The monitoring part 151 can monitor reception of an optical signal performed by the light receiving part 130. The monitoring part 151 may perform the monitoring only during a preset monitoring time or may continue the monitoring until the light receiving part 130 receives an optical signal. The monitoring part 151 can transmit the monitoring result to the superposed signal transmission part 155.

The information rewriting part 153 can rewrite the information stored in the information storage part 140 on the basis of an instruction input from the outside. In other words, the information rewriting part 153 can acquire prescribed information from the optical signal received by the light receiving part 130 and cause the information storage part 140 to store the prescribed information. The information rewriting part 153 may overwrite the prescribed information in the information storage part 140 or may accumulate the prescribed information as history information in the information storage part 140, in accordance with the type of the information.

The superposed signal transmission part 155 can generate a superposed signal by superposing the operation signal output from the operation element 13 of the electric apparatus 6 with transmission data (a data signal) generated by the data generation circuit 17 using the superposing circuit 18 and transmit the superposed signal to the input unit 4. Specifically, the superposed signal transmission part 155 can create the superposed signal by superposing the operation signal received from the electric apparatus 6 through the electric-apparatus-side terminal 110 with the data signal generated from the prescribed information stored in the information storage part 140. The superposed signal transmission part 155 can transmit the generated superposed signal to the input unit 4 via the communication-device-side terminal 120.

The information rewriting device 200 can be communicably connected to the signal processing device 100 and an input terminal 300, which will be described later. The information rewriting device 200 can acquire prescribed information regarding the electric apparatus 6 from the input terminal 300. The information rewriting device 200 can project light for the acquired prescribed information as an optical signal to the signal processing device 100. The information rewriting device 200 can receive the superposed signal from the signal processing device 100 through the communication-device-side terminal 120 and inspect whether or not the prescribed information indicated by the data signal included in the superposed signal conforms to the content projected as the optical signal by the information rewriting device itself. Also, the information rewriting device 200 may output the inspection result to a display part, which is not illustrated, or may output the inspection result to an external apparatus including the input terminal 300. The information rewriting device 200 includes a light projecting part 210 and a rewriting circuit 220, and the rewriting circuit 220 includes an information acquisition part 221 and an information inspection part 223.

The light projecting part 210 can project prescribed information input from the information acquisition part 221 as an optical signal. The light projecting part 210 may be, for example, a light emitting diode (LED) (the LED in FIG. 5) and may project the optical signal toward the light receiving part 130 of the signal processing device 100 using an optical cable or the like. The optical signal may represent the prescribed information by changing a projection pattern, for example. Specifically, the light projecting part 210 may provide a notification of the prescribed information using a change in light color, a blinking pattern, and light intensity. The light projecting part 210 may further project optical signals indicating a start of rewriting and an end of the rewriting before and after the optical signal in accordance with the information to be rewritten is projected.

The rewriting circuit 220 can execute various functions for rewriting the prescribed information regarding the electric apparatus 6 stored in the information storage part 140 of the signal processing device 100. The rewriting circuit 220 can receive the superposed signal from the signal processing device 100 through the communication-device-side terminal 120 and inspect the superposed signal.

The information acquisition part 221 can acquire information to be rewritten from the input terminal 300. The information acquisition part 221 inputs the acquired information to the light projecting part 210.

The information inspection part 223 can extract the data signal from the superposed signal received from the signal processing device 100 and inspect whether or not the prescribed information regarding the electric apparatus 6 indicated by the data signal conforms to the content projected as the optical signal by the light projecting part 210. Specifically, the information inspection part 223 executes two operations, namely inspection regarding whether or not rewriting on the information storage part 140 has been performed by the signal processing device 100 and inspection regarding whether or not the rewritten prescribed information conforms to the projected content.

The input terminal 300 is communicably connected to the information rewriting device 200 and can input the prescribed information regarding the electric apparatus 6, which the information storage part 140 of the signal processing device 100 is caused to store, to the information rewriting device 200. The input terminal 300 may be, for example, a smartphone, and a user of the input terminal 300 may input prescribed information through a touch operation or the like. At this time, the information rewriting device 200 may be an adaptor that is connectable with the smartphone and is provided with a dedicated light source operating as the light projecting part 210. For example, the information rewriting device 200 may be connected to the smartphone via a Universal Serial Bus (USB). Alternatively, the input terminal 300 may be configured integrally with the information rewriting device 200. In a case in which the input terminal 300 is a smartphone, the smartphone may use a display or an illumination LED as the light projecting part 210.

Also, the prescribed information regarding the electric apparatus 6 may be input to the input terminal 300 by a method other than the manual operation. In a case in which ID information or the like of the electric apparatus 6 is provided as a two-dimensional code at a part of the casing of the electric apparatus 6, for example, the input terminal 300 may read and acquire the two-dimensional code using a camera or the like.

(Circuit Configurations of Signal Processing Device and Information Rewriting Device)

Figure 5:
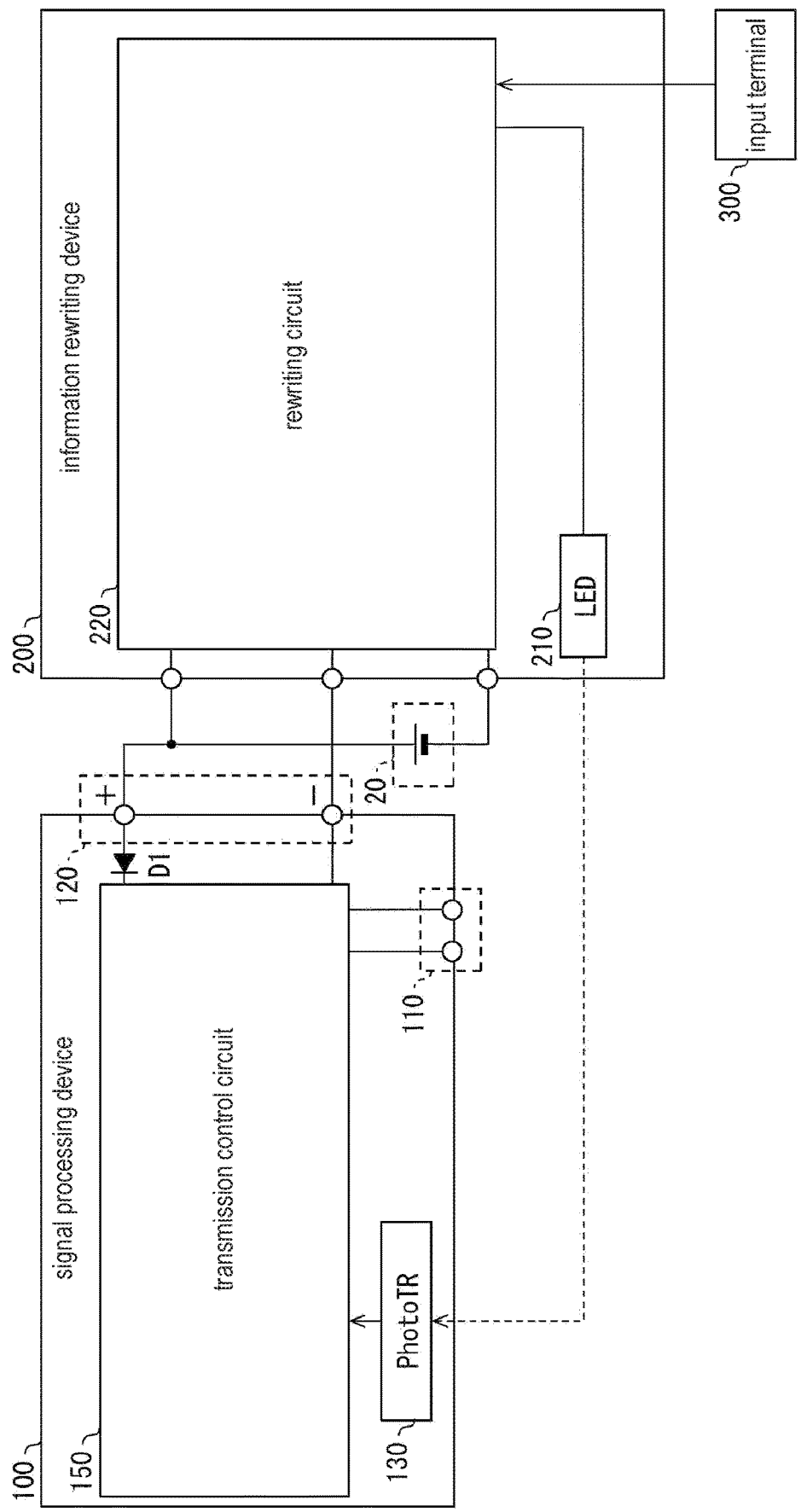
FIG. 5 is a circuit diagram illustrating configurations of the signal processing device and the information rewriting device.

FIG. 5 is a circuit diagram illustrating configurations of the signal processing device 100 and the information rewriting device 200 according to an aspect of the present disclosure. Although some blocks that have already been described using FIGS. 1 and 2 are omitted in FIG. 5, it is assumed that the blocks are also included in the signal processing device 100 or the information rewriting device 200 as illustrated in FIGS. 1 and 2.

In the signal processing device 100, each of the electric-apparatus-side terminal 110 and the communication-device-side terminal 120 includes two paths. A current supplied from the power source 20 is input to a + terminal side of the communication-device-side terminal 120, and the current is input to the transmission control circuit 150 through a diode D1. In other words, the signal processing device 100 drives the transmission control circuit 150 and the like using the current supplied from the power source 20.

The light receiving part 130 illustrated as "PhotoTR" in the drawing receives an optical signal in accordance with the path illustrated as a dashed line from the light projecting part 210 illustrated as an "LED" in the information rewriting device 200 and inputs an electrical signal obtained by converting the optical signal to the transmission control circuit 150.

The transmission control circuit 150 transmits and receives currents and signals using the electric-apparatus-side terminal 110 and the communication-device-side terminal 120. Specifically, the transmission control circuit 150 receives an output signal in accordance with the state of the operation element 13 of the electric apparatus 6 from the electric apparatus 6, which is not illustrated, through the electric-apparatus-side terminal 110, superposes the prescribed information stored in the information storage part 140 with the output signal, and thereby generates a superposed signal. Moreover, the transmission control circuit 150 transmits the generated superposed signal to the rewriting circuit 220 of the information rewriting device 200 through the communication-device-side terminal 120.

The transmission control circuit 150 can rewrite the prescribed information stored in the information storage part 140 with the content input from the light projecting part 210 by causing the light receiving part 130 and the light projecting part 210 to have the circuit configurations described above. Also, the transmission control circuit 150 can transmit, to the rewriting circuit 220, the superposed signal obtained by superposing various kinds of information stored in the information storage part 140 including the rewritten content and the like with the output signal. In this manner, the information rewriting device 200 can inspect whether or not the prescribed information included in the superposed signal received by the rewriting circuit 220 conforms to the content projected from the light projecting part 210.

(Specific Examples of Rewriting and Inspection of Information)

Figure 6:
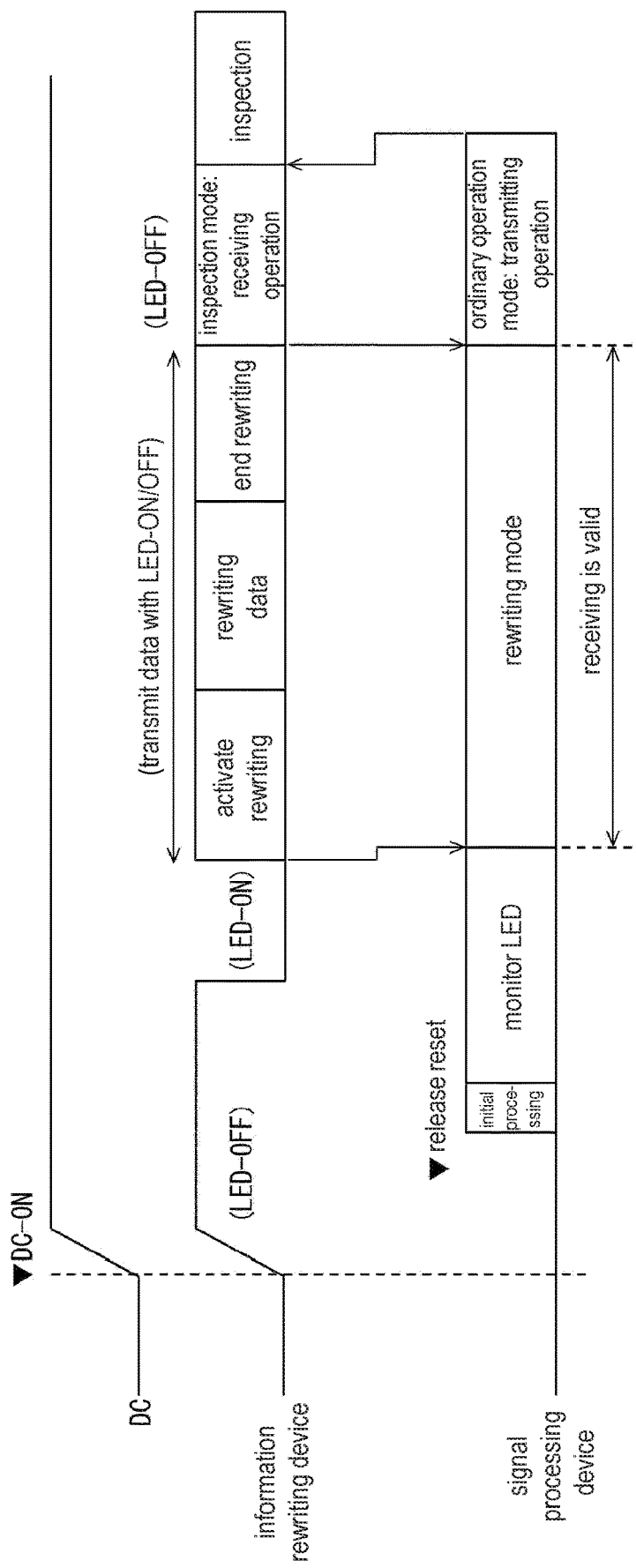
FIG. 6 is a diagram illustrating specific examples of rewriting and inspection of information using the signal processing device and the information rewriting device according to an aspect of the present disclosure.

FIG. 6 is a diagram illustrating specific examples of rewriting and inspection of information using the signal processing device 100 and the information rewriting device 200 according to an aspect of the present disclosure. In the following description, it is assumed that information to be rewritten using the input terminal 300 has been input to the information rewriting device 200 in advance.

In the illustrated example, "DC" represents a DC current supplied from the power source 20, and "DC-ON" represents a timing at which the power source 20 is activated. "(LED-ON)" and "(LED-OFF)" represent whether or not light has been projected by the light projecting part 210. "Activate rewriting," "rewriting data," and "end rewriting" correspond to "a projection pattern corresponding to a rewriting start instruction indicating a start of rewriting," "a projection pattern in accordance with rewriting data that is content to be rewritten," and "a projection pattern corresponding to a rewriting end instruction indicating an end of rewriting," respectively. Also, "inspection mode: receiving operation" is an operation mode for receiving a superposed signal transmitted from the signal processing device 100, and "inspection" is an operation mode for inspecting prescribed information indicated by the data signal included in the received superposed signal.

Each of "monitor LED," "rewriting mode," and "ordinary operation mode: transmitting operation" represents an operation mode of the signal processing device 100. "Monitor LED" indicates that the monitoring part 151 in the signal processing device 100 is monitoring reception of an optical signal by the light receiving part 130, and "rewriting mode" indicates that the information rewriting part 153 in the signal processing device 100 is in a state in which it can rewrite the content in the information storage part 140. "Ordinary operation mode: transmitting operation" indicates a state in which the signal processing device 100 is to generate a superposed signal by superposing a data signal indicating prescribed information with an output signal acquired from the electric apparatus 6 and transmit the superposed signal to the information rewriting device 200. In other words, in a case in which an optical signal is detected by the monitoring part 151, operation modes in which the superposed signal transmission part 155 does not transmit a superposed signal and the information rewriting part 153 rewrites the information stored in the information storage part 140 on the basis of the optical signal are "monitor LED" and "rewriting mode." Then, an operation mode in which the superposed signal transmission part 155 transmits a superposed signal after the rewriting processing is completed by the information rewriting part 153 is "ordinary operation mode: transmitting operation."

First, if the power source 20 is activated, then the transmission control circuit 150 of the signal processing device 100 releases its reset state, performs initial processing, and then starts to monitor light receiving performed by the light receiving part 130 of the monitoring part 151 in "monitor LED."

On the other hand, the information rewriting device 200 changes its state from "(LED-OFF)" to "(LED-ON)" asynchronously with the state of the signal processing device 100. The information rewriting device 200 then projects an optical signal in the order of "activate rewriting," "rewriting data," and "end rewriting" using the light projecting part 210. After a series of light projection is completed, the information rewriting device 200 causes the operation mode to be shifted to "ordinary operation mode: transmitting operation" and starts to receive a superposed signal.

The signal processing device 100 detects reception of the optical signal projected during the operation in "monitor LED" and then causes the operation mode to be shifted to "rewriting mode." The signal processing device 100 receives an optical signal with a projection pattern in accordance with "rewriting data" received after an optical signal with a projection pattern in accordance with "activate rewriting" is received during the operation in "rewriting mode" as information to be rewritten and rewrites the information storage part 140 using the information rewriting part 153. Thereafter, if an optical signal with a projection pattern in accordance with "end rewriting" is received, then "rewriting mode" is ended, and the operation mode is shifted to "ordinary operation mode: transmitting operation." The signal processing device 100 generates a data signal using rewritten prescribed information stored in the information storage part 140 and transmits a superposed signal including the data signal to the information rewriting device 200 using the superposed signal transmission part 155.

The information rewriting device 200 receives the superposed signal from the signal processing device 100 during the operation in "ordinary operation mode: transmitting operation," then causes its operation mode to be shifted to "inspection," and performs inspection on the prescribed information indicated by the data signal included in the superposed signal using the information inspection part 223.

In this manner, the prescribed information regarding the electric apparatus 6 stored in the signal processing device 100 is rewritten using the information rewriting device 200. Therefore, the user can rewrite the prescribed information even after the signal processing device 100 is manufactured or shipped. Therefore, the signal processing device 100 can transmit a superposed signal obtained by superposing the rewritten prescribed information with the output signal received from the electric apparatus 6 to the input unit 4. It is thus possible to realize transmission of the superposed signal by using the signal processing device 100 even in a case in which the electric apparatus 6 is not compatible with the transmission of superposed signals, for example.

Although the signal processing device 100 causes its operation mode to be shifted to "rewriting mode" on the basis of the optical signal including the rewriting activation instruction in the description of FIG. 6, the trigger to shift to "rewriting mode" is not limited thereto. The signal processing device 100 may be triggered by the light receiving part 130 receiving some light after the device is activated and shift to "rewriting mode" or may shift to "rewriting mode" on the basis of an input from an external apparatus, for example.

Although the signal processing device 100 is assumed to be a device that is different from the electric apparatus 6 in the description of FIG. 1, the signal processing device 100 may be configured integrally with the electric apparatus 6. For example, the configuration of the signal processing device 100 may be incorporated in the electric apparatus 6.

§ 3 Operation Example (Processing Flow)

Figure 7:
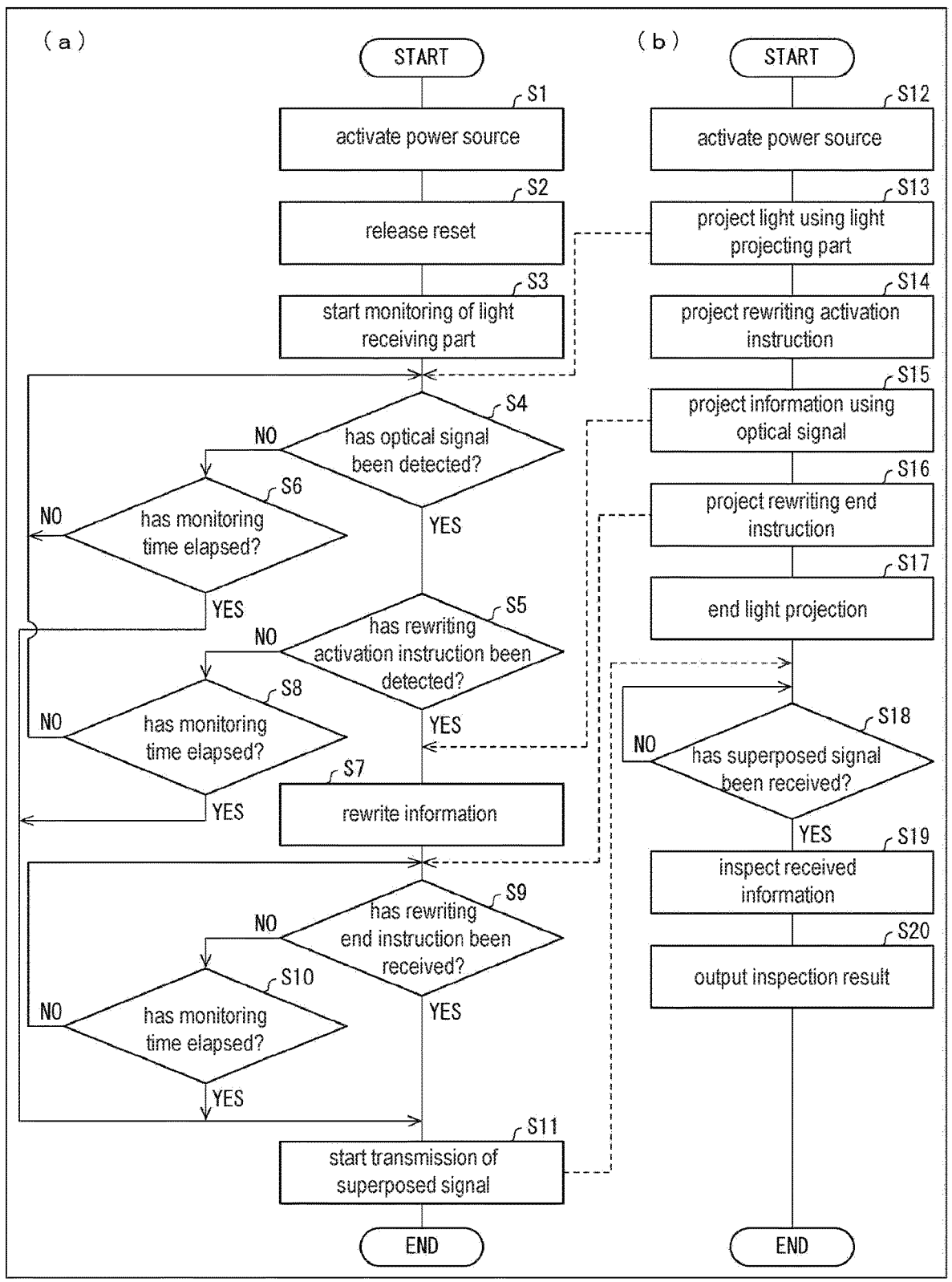
FIG. 7 is a flowchart illustrating an example of a processing flow executed by the signal processing device and the information rewriting device according to an aspect of the present disclosure, where (a) illustrates a flow of the signal processing device 100 and (b) illustrates a flow of the information rewriting device.

Each diagram in FIG. 7 is a flowchart illustrating an example of a processing flow executed by the signal processing device 100 and the information rewriting device 200 according to an aspect of the present disclosure. (a) of FIG. 7 illustrates a flow of the signal processing device 100, and (b) of FIG. 7 illustrates a flow of the information rewriting device 200. In the following description, it is assumed that the signal processing device 100 and the information rewriting device 200 are connected to the power source 20 similarly to FIG. 5 and information to be rewritten has already been input to the information rewriting device 200 in advance using the input terminal 300.

First, the flow of the signal processing device 100 will be described using (a) of FIG. 7. First, if the power source 20 is activated through a user's operation or the like, power supply to the signal processing device 100 is started (S1). If the power supply is started, then the signal processing device 100 releases its reset state after S1 (S2). After the reset state is released, the signal processing device 100 executes initialization processing, and after the initialization processing is completed, the monitoring part 151 starts to monitor light reception performed by the light receiving part 130 (S3).

After S3, the monitoring part 151 determines whether or not the light receiving part 130 has detected an optical signal projected from the light projecting part 210 (S4). If the optical signal is projected from the light projecting part 21 through processing in S12, which will be described later, then the light receiving part 130 receives the optical signal. In a case in which the monitoring part 151 determines that the projected optical signal has been detected (YES in S4), the monitoring part 151 further determines whether or not the light receiving part 130 has received a rewriting activation instruction as an optical signal (S5). On the other hand, in a case in which it is determined that the optical signal has not been detected in S4 (NO in S4), the monitoring part 151 determines whether or not a preset monitoring time has elapsed (S6).

In a case where it is determined that the rewriting activation instruction projected from the light projecting part 210 through processing in S14, which will be described later, has been received in S5 (YES in S5), the processing proceeds to S7. In S7, the information rewriting part 153 rewrites the prescribed information regarding the electric apparatus 6 stored in the information storage part 140 on the basis of the optical signal projected from the light projecting part 210 through processing in S15, which will be described later (S7). On the other hand, in a case in which it is determined that the rewriting activation instruction has not been received, the processing proceeds to S8.

In a case in which it is determined that the monitoring time has not elapsed in S6 (NO in S6), the processing proceeds to S4, and the processing in S4 to S6 is executed again. On the other hand, in a case in which it is determined that the monitoring time has elapsed (YES in S6), the processing proceeds to S11. In a case in which it is determined that the monitoring time has not elapsed in S8 (NO in S8), the processing proceeds to S4, and the processing in S4 to S8 is executed again similarly to S6. On the other hand, in a case in which it is determined that the monitoring time has elapsed (YES in S8), the processing proceeds to S11.

In S9, the monitoring part 151 determines whether or not an optical signal indicating a rewriting end instruction projected from the light projecting part 210 through processing in S16, which will be described later (S9). In a case in which it is determined that the optical signal has not been received (NO in S9), the monitoring part 151 determines whether or not a preset monitoring time has elapsed (S10). In a case in which it is determined that the monitoring time has not elapsed (NO in S10), the processing proceeds to S9, and the processing in S9 is executed again. On the other hand, in a case in which it is determined that the monitoring time has elapsed (YES in S10), the signal processing device 100 receives reception of the rewriting instruction regarding the prescribed information, and the processing proceeds to S11.

In S11, the signal processing device 100 starts to transmit a superposed signal using the superposed signal transmission part 155 (S11). The prescribed information indicated by the data signal included in the superposed signal transmitted in S11 is content before rewriting when the processing proceeds from S6 to S11, and the prescribed information is content after the rewriting in S7 when the processing proceeds from S9 or S10 to S11.

Through the above processing, the signal processing device 100 according to an aspect of the present disclosure can transmit the superposed signal obtained by superposing the prescribed information with the operation signal to the communication device. Also, it is possible to rewrite the prescribed information included in the content transmitted as the superposed signal on the basis of the optical signal. Therefore, the user can rewrite the prescribed information even after the signal processing device 100 is manufactured or shipped. Moreover, it is possible to realize the transmission of the superposed signal by using the signal processing device 100 even when the external electric apparatus 6 is a superposed-signal-communication-incompatible apparatus that is not compatible with transmission of superposed signals.

Next, the flow of the information rewriting device 200 will be described using (b) of FIG. 7. First, if the power source 20 is activated through a user's operation or the like, power supply to the information rewriting device 200 is started (S12). If the power source 20 has already been activated through the aforementioned processing in S1, the activation of the power source 20 is omitted in S12, and the power supply to the information rewriting device 200 has already been started. Thereafter, the information rewriting device 200 starts to project light using the light projecting part 210 (S13).

After S13, the information rewriting device 200 projects the rewriting activation instruction as an optical signal using the light projecting part 210 (S14). Thereafter, the information rewriting device 200 projects information that has been input from the input terminal 300 and has been acquired by the information acquisition part 221 as an optical signal using the light projecting part 210 (S15). If the light projecting part 210 ends the projection of the prescribed information as the optical signal, then the information rewriting device 200 projects an optical signal indicating the rewriting end instruction using the light projecting part 210 (S16), and the series of light projection is ended (S17).

After S17, the rewriting circuit 220 of the information rewriting device 200 determines whether or not the superposed signal transmitted by the signal processing device 100 through the aforementioned processing in S11 has been received (S18). In a case in which it is determined that the superposed signal has been received (YES in S18), the information inspection part 223 inspects whether or not the prescribed information indicated by the data signal extracted from the superposed signal conforms to the content projected by the light projecting part 210 as the optical signal in S14 (S19). The information rewriting device 200 outputs the inspection result in S19 to the display device or an external apparatus, which is not illustrated (S20).

Through the aforementioned processing, the information rewriting device 200 according to an aspect of the present disclosure can rewrite the information stored in the information storage part 140 in the signal processing device 100 with the optical signal. Then, the information rewriting device 200 can inspect whether or not the information has accurately been rewritten on the basis of the superposed signal received from the signal processing device 100.

§ 4 First Modification Example

In the aforementioned configuration example, the signal processing device 100 is configured to start to transmit the superposed signal after the information stored in the information storage part 140 is rewritten. However, the signal processing device 100 may be configured to rewrite the information during transmission of the superposed signal, for example.

(Configurations of Signal Processing Device and Information Rewriting Device)

The signal processing device 100 and the information rewriting device 200 according to an aspect of the present disclosure will be described using FIG. 1. The information rewriting device 200 is the same as the information rewriting device 200 in the aforementioned configuration example.

Although a basic configuration of the signal processing device 100 is the same as that in the aforementioned configuration example, a part of the configuration thereof is different. In the modification example, the superposed signal transmission part 155 is different in that the superposed signal transmission part 155 transmits a superposed signal even when the monitoring part 151 monitors the light reception performed by the light receiving part 130 and stops the transmission of the superposed signal at the timing when the light receiving part 130 detects an optical signal.

(Specific Examples of Rewriting and Inspection of Information)

Figure 8:
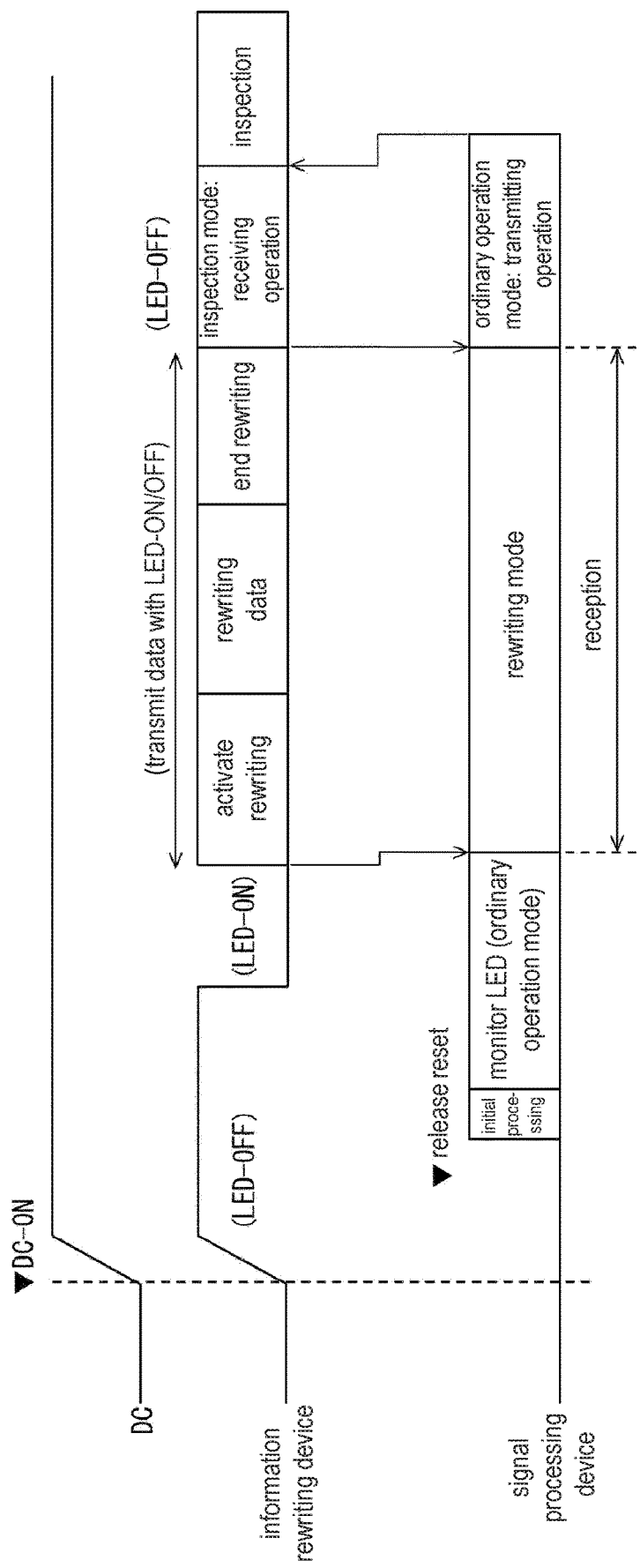
FIG. 8 is a diagram illustrating specific examples of rewriting and inspection of information using the signal processing device and the information rewriting device during transmission of a superposed signal.

FIG. 8 is a diagram illustrating specific examples of rewriting and inspection of information using the signal processing device 100 and the information rewriting device 200 during transmission of a superposed signal. In the following description, it is assumed that information to be rewritten has already been input to the information rewriting device 200 in advance using the input terminal 300, and description of items with the same names as those in FIG. 6 will be omitted. Also, since operations of the information rewriting device 200 are the same as those in FIG. 6, description thereof will be omitted.

First, if the power source 20 is activated, then the transmission control circuit 150 of the signal processing device 100 releases its reset state, performs initial processing, and then operates in "monitor LED (ordinary operation mode)." Here, "monitor LED (ordinary operation mode)" is an operation mode in which monitoring of light reception of the light receiving part 130 performed by the monitoring part 151 and transmission of the superposed signal performed by the superposed signal transmission part 155 are performed together.

If the signal processing device 100 detects light reception of the optical signal during the operation in "monitor LED (ordinary operation mode)," then the signal processing device 100 stops the transmission of the superposed signal and causes the operation mode to be shifted to "rewriting mode." The signal processing device 100 rewrites information on the basis of the optical signal received from the light projecting part 210 of the information rewriting device 200 as described above using FIG. 6, then ends "rewriting mode," and causes the operation mode to be shifted to "ordinary operation mode: transmitting operation." The operations of the signal processing device 100 in "ordinary operation mode: transmitting operation" are the same as the content described above using FIG. 6. In this manner, the signal processing device 100 can rewrite the information using the information rewriting device 200 even after the transmission of the superposed signal is started.

(Processing Flow)

Figure 9:
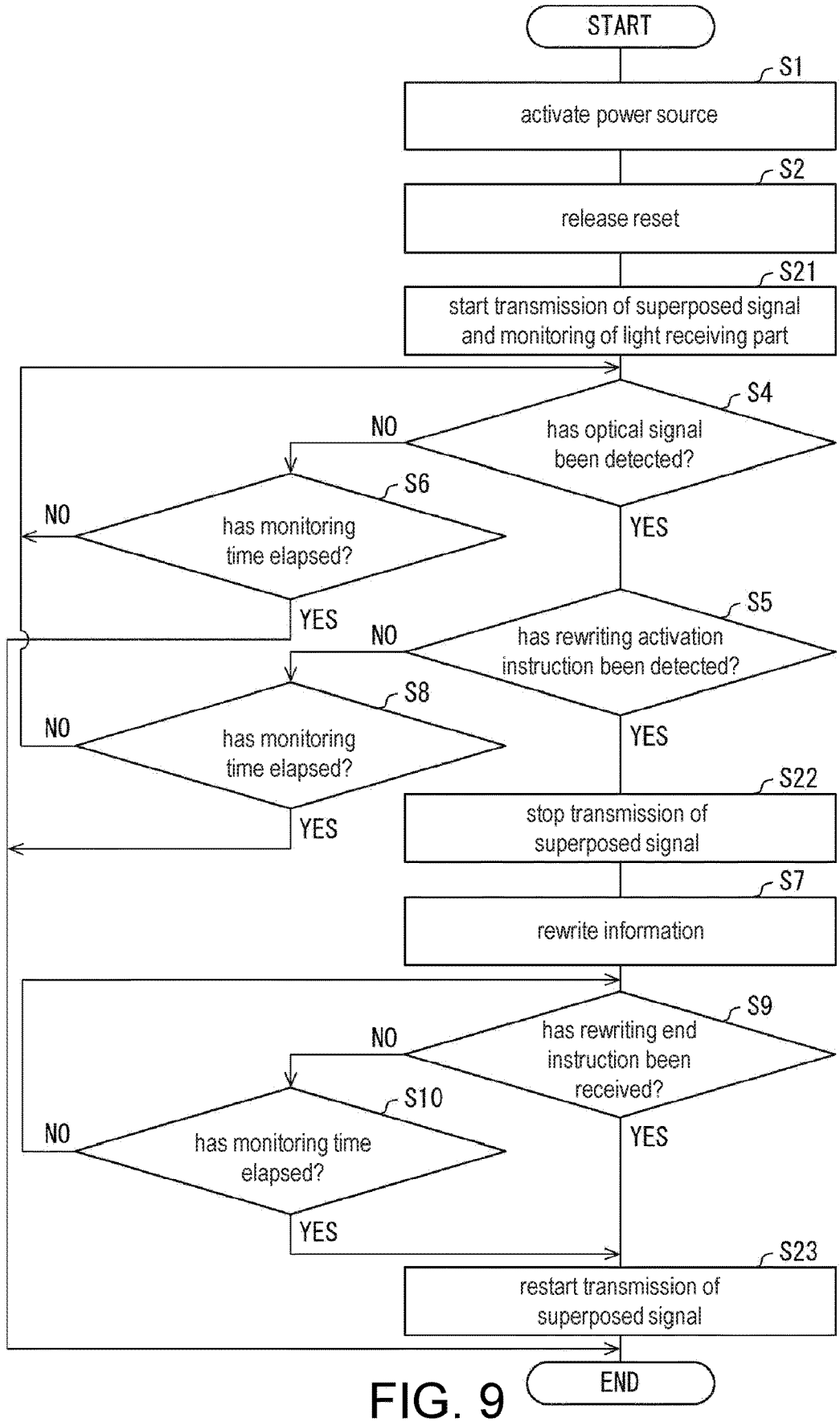
FIG. 9 is a flowchart illustrating an example of a processing flow executed by the signal processing device according to an aspect of the present disclosure.

FIG. 9 is a flowchart illustrating an example of a processing flow executed by the signal processing device 100 according to an aspect of the present disclosure. In the following description, description of the same processing as that in (a) of FIG. 7 will be omitted. Also, the flow of the information rewriting device 200 is completely the same as that in (b) of FIG. 7.

The signal processing device 100 starts to transmit the superposed signal using the superposed signal transmission part 155 and monitor the light receiving part 130 using the monitoring part 151 (S21) after the processing in S1 and S2 is executed. After S21, the signal processing device 100 executes the processing in S4 to S6 similarly to the operation example. The processing here is different from that in (a) of FIG. 7 in that the series of processing is ended in a case in which the monitoring part 151 determines that the preset monitoring time has elapsed in S6 (YES in S6) since the superposed signal transmission part 155 has already started the transmission of the superposed signal in S21.

In a case in which it is determined that the rewriting activation instruction has been determined in S5 (YES in S5), the superposed signal transmission part 155 stops the transmission of the superposed signal (S22). The processing then proceeds to S7. On the other hand, in a case in which it is determined that the rewriting activation instruction has not been received (NO in S5), the processing proceeds to S8, and whether or not the monitoring time in response to the rewriting activation instruction has elapsed is determined (S8). The processing here is different from that in (a) of FIG. 7 in that the series of processing is ended in a case in which the monitoring part 151 determines that the preset monitoring time has elapsed in S8 (YES in S8) since the superposed signal transmission part 155 has started the transmission of the superposed signal in S21.

After S7, the signal processing device 100 executes the processing in S9 and S10 similarly to the aforementioned operation example. Then, in a case in which it is determined that the rewriting end instruction has been received in S9 (YES in S9) or in a case in which it is determined that the monitoring time has elapsed in S10 (YES in S10), the superposed signal transmission part 155 restarts the transmission of the superposed signal (S23). Thereafter, the signal processing device 100 ends the series of processing.

Through the aforementioned processing, the signal processing device 100 can transmit the superposed signal generated by rewriting information on the basis of the optical signal and using the written information even after the transmission of the superposed signal is started.

§ 5 Second Modification Example

In the aforementioned configuration example and the first modification example, the information rewriting device 200 is configured to input information to be rewritten to the signal processing device 100 through light projection using the light projecting part 210. However, the information rewriting device 200 may be configured to be able to transmit the information to be rewritten to the signal processing device 100 through a path used to transmit and receive the superposed signal, for example.

(Configurations of Signal Processing Device and Information Rewriting Device)

Figure 10:
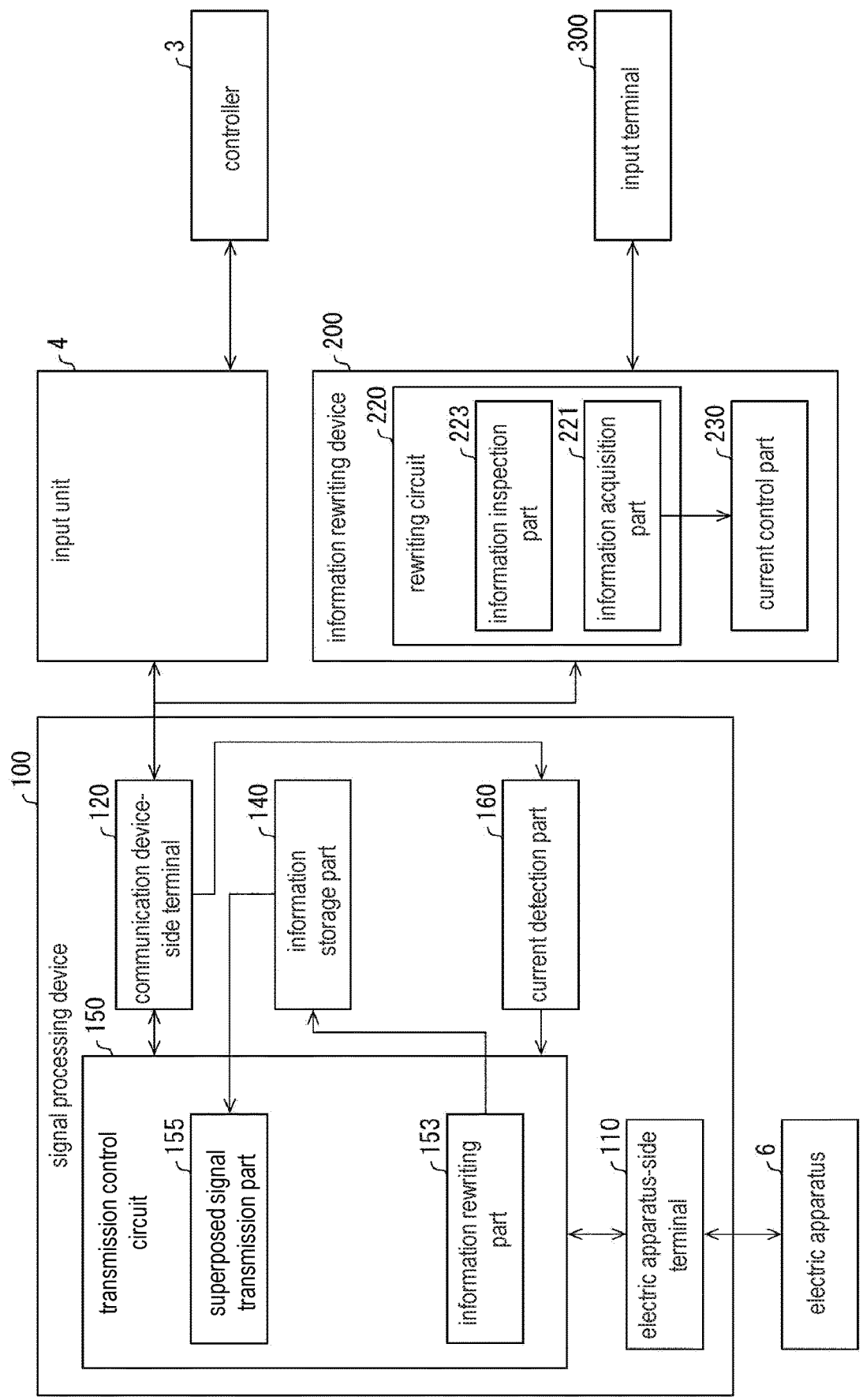
FIG. 10 is a block diagram illustrating configurations of the signal processing device and the information rewriting device according to an aspect of the present disclosure.

FIG. 10 is a block diagram illustrating configurations of the signal processing device 100 and the information rewriting device 200 according to an aspect of the present disclosure.

Although the basic configuration of the signal processing device 100 is the same as that in the aforementioned configuration example, a part of the configuration thereof is different. The signal processing device 100 includes a current detection part 160 instead of the light receiving part 130 and the monitoring part 151.

The current detection part 160 is connected to the input unit 4 or the information rewriting device 200 and can detect a current value of a current signal supplied from a signal line used to transmit and receive the superposed signal. Specifically, the current detection part 160 can detect a current value of a current signal input to the communication device-side terminal 120 and transmit the detection result to the transmission control circuit 150.

The transmission control circuit 150 can rewrite information using the information rewriting part 153 on the basis of the result of detecting the current value obtained by the current detection part 160. Specifically, in a case in which a variation pattern of the current value of the current signal received by the current detection part 160 of the signal processing device 100 from the input unit 4 or the information rewriting device 200 indicates an information rewriting instruction, the transmission control circuit 150 executes rewriting of the information based on the current signal. In the following description, the current signal indicated by the information to be rewritten on the basis of variations in current value will be referred to as a rewriting current signal. The information rewriting part 153 is different from that in the aforementioned configuration in that the information stored in the information storage part 140 is rewritten on the basis of the rewriting current signal.

It is only necessary for the current value of the rewriting current signal to be a value within a range in which the current value can be distinguished from other current signals. For example, if the output signal received from the electric apparatus 6 is an ON/OFF signal, for example, the information rewriting part 153 may recognize variations in current value, which is higher than a current value of an ON signal of the output signal, as the rewriting current signal in a case in which such a current value is detected by the current detection part 160.

Although the basic configuration of the information rewriting device 200 is the same as that in the aforementioned configuration example, a part of the configuration thereof is different. The information rewriting device 200 includes a current control part 230 instead of the light projecting part 210.

The current control part 230 can generate a rewriting current signal in accordance with the prescribed information input from the information acquisition part 221 and transmit the generated rewriting current signal to the signal processing device 100. The current control part 230 may generate the rewriting current signal using a current value that is higher than the current value of the ON signal of the output signal of the electric apparatus 6, for example.

(Circuit Configurations of Signal Processing Device and Information Rewriting Device)

Figure 11:
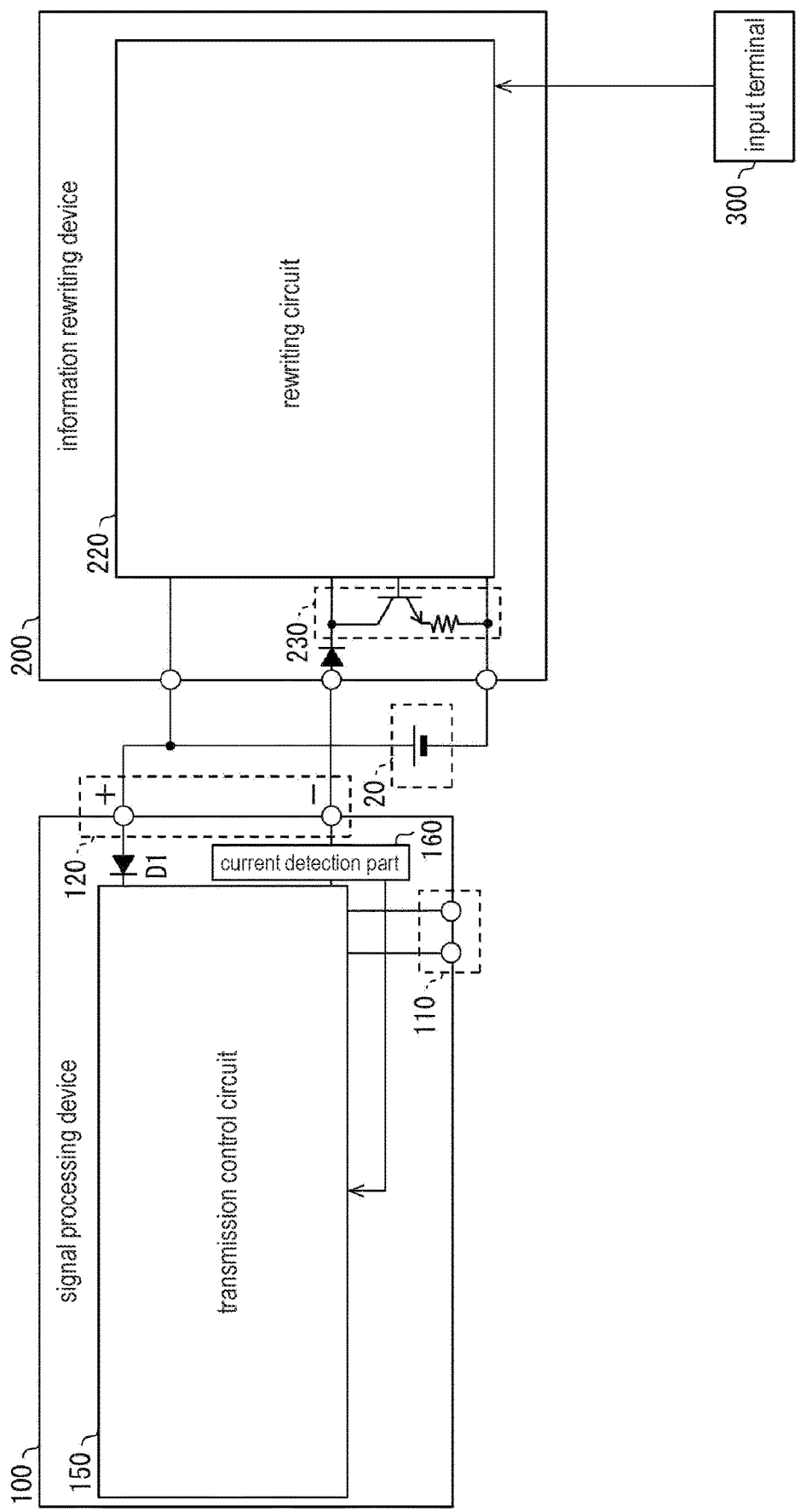
FIG. 11 is a circuit diagram illustrating configurations of the signal processing device and the information rewriting device according to an aspect of the present disclosure.

FIG. 11 is a circuit diagram illustrating configurations of the signal processing device 100 and the information rewriting device 200 according to an aspect of the present disclosure. In the following description, description of items that have already been described in FIG. 5 will be omitted.

The signal processing device 100 includes the current detection part 160 between the − side of the communication device-side terminal 120 and the transmission control circuit 150. The current detection part 160 is configured with a resistor or an operational amplifier, for example, and can output a signal indicating a current value of a current signal detected using the resistor to the transmission control circuit 150 after the operational amplifier performs amplification and output adjustment thereon.

In a case in which the current value of the current signal from the current detection part 160 is a current value that is higher than the current value of the ON signal of the output signal of the electric apparatus 6, for example, the transmission control circuit 150 determines that the current signal is the rewriting current signal. In a case in which the transmission control circuit 150 determines that the current signal is the rewriting current signal, the information rewriting part 153 rewrites the information stored in the information storage part 140 on the basis of the rewriting current signal.

In the information rewriting device 200, the current control part 230 can be realized by combining a transistor and a resistor as in the drawing. In the case in which the current control part 230 is configured as in the drawing, the current control part 230 can generate the rewriting current signal by switching ON/OFF of the transistor in accordance with the information received by the information acquisition part 221 of the rewriting circuit 220 from the input terminal 300, for example.

(Outline of Rewriting Current Signal)

Figure 12:
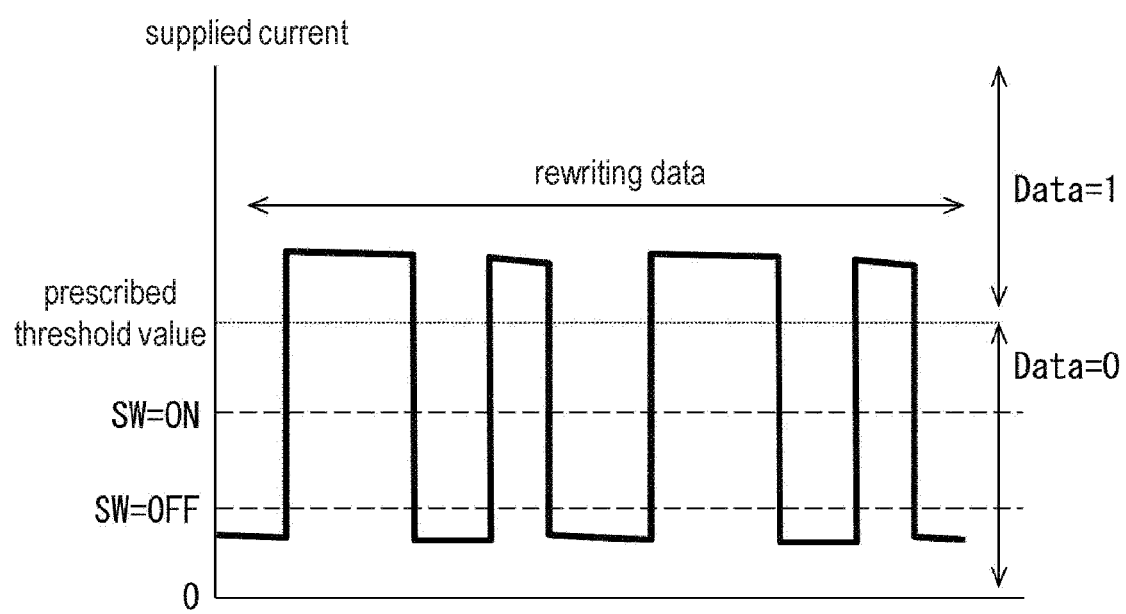
FIG. 12 is a schematic view illustrating an outline of a rewriting current signal.

FIG. 12 is a schematic view illustrating an outline of the rewriting current signal. In the illustrated example, "supply current" of the vertical axis represents a current value of the rewriting current signal supplied from the information rewriting device 200 to the signal processing device 100. Also, "SW=OFF" corresponds to the range of L of the superposed signal in FIG. 4, and "SW=ON" corresponds to the range of H of the superposed signal in FIG. 4. "Prescribed threshold value" is a value that is sufficiently large as compared with the range of H of the superposed signal.

In the drawing, "Data=0" and "Data=1" represent ranges of binary values that are converted by the current detection part 160 on the basis of the current value. In other words, in a case in which the current value of the rewriting current signal is between "0" to "prescribed threshold value," the current detection part 160 converts the current value to the binary value "0" and transmits the binary value to the transmission control circuit 150. On the other hand, in a case in which the current value of the rewriting current signal is greater than "prescribed threshold value," the current detection part 160 converts the current value into a binary value "1" and transmits the binary value to the transmission control circuit 150. In this manner, the information rewriting part 153 of the transmission control circuit 150 can rewrite the information stored in the information storage part 140 using the binary value obtained by converting the current value of the rewriting current signal.

Although "prescribed threshold value" is illustrated as a value that is sufficiently large as compared with the range of H of the superposed signal in FIG. 12, "prescribed threshold value" is not limited thereto. For example, "prescribed threshold value" may differ in accordance with the state of the switch of the electric apparatus 6 as long as the current detection part 160 can recognize the range of H and the range of L of the superposed signal, that is, which of ON and OFF the switch of the electric apparatus 6 is.

Specifically, the signal processing device 100 does not detect a current corresponding to the range of L as a superposed signal when the signal processing device 100 is transmitting or receiving an output signal that is an OFF signal for a reason that the switch of the electric apparatus 6 is OFF or the like. At this time, the current control part 230 may generate the rewriting current signal using a current value that is higher than a current value of an OFF signal of the output signal. In a case in which the current detection part 160 detects the current value that is higher than the current value of the OFF signal of the output signal, the information rewriting part 153 may recognize variations in the current value as the rewriting current signal. In other words, in a case in which the current detection part 160 recognizes that the switch of the electric apparatus 6 is OFF and the superposed signal is within the range of L, for example, a value that is sufficiently larger than the range of L and is also smaller than the range of H may be used as "prescribed threshold value." In this case, the current value of the rewriting current signal when the switch of the electric apparatus 6 is OFF can be set to be lower than the current value when the switch is ON.

(Specific Examples of Rewriting and Inspection of Information)

Figure 13:
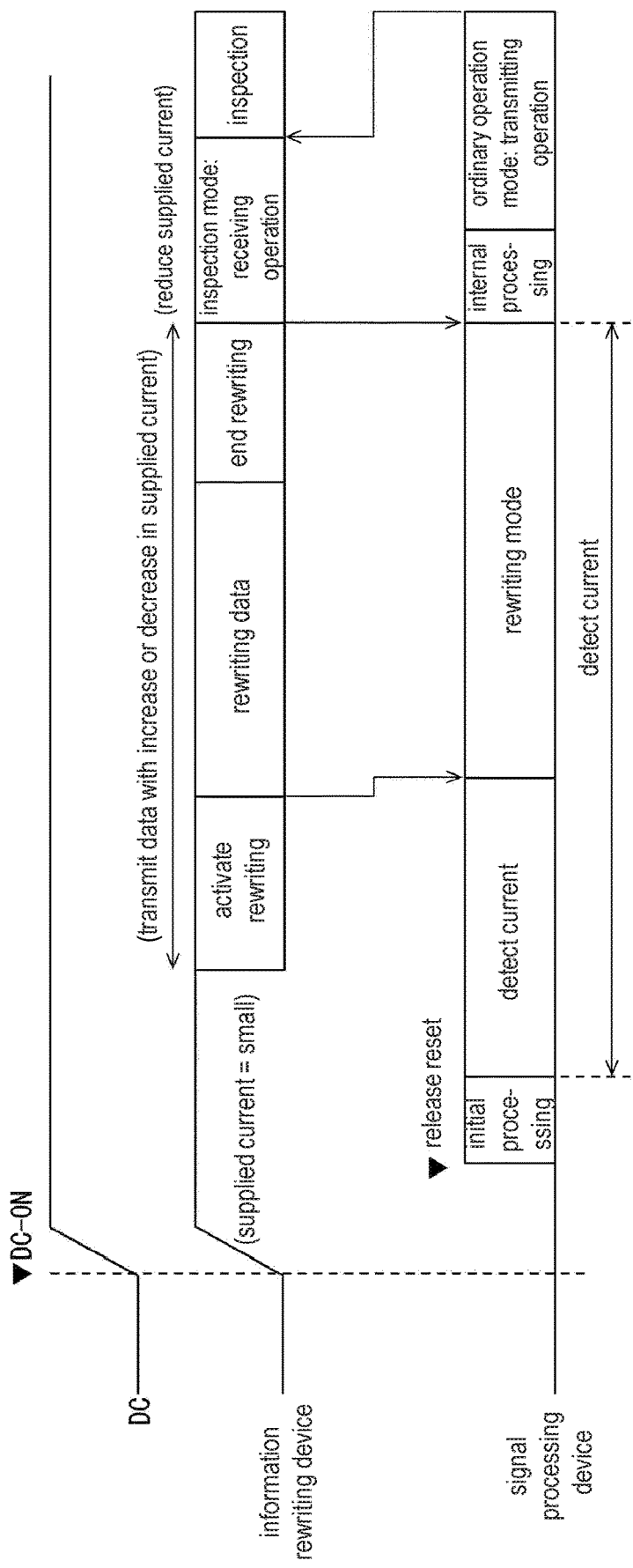
FIG. 13 is a diagram illustrating specific examples of rewriting and inspection of information using the signal processing device and the information rewriting device.

FIG. 13 is a diagram illustrating specific examples of rewriting and inspection of information using the signal processing device 100 and the information rewriting device 200. In the following description, it is assumed that information to be rewritten has already been input to the information rewriting device 200 using the input terminal 300 in advance, and description of items with the same names as those in FIG. 6 will be omitted.

First, if the power source 20 is activated, then the transmission control circuit 150 of the signal processing device 100 releases its reset state, performs initial processing, and then operates in "detect current." Here, "detect current" is an operation mode in which the current detection part 160 detects a power value of a current signal.

On the other hand, the information rewriting device 200 performs control using the current control part 230 such that the current value of the current signal to be supplied to the signal processing device 100 becomes small immediately after the power source 20 is activated. Thereafter, the information rewriting device 200 performs control such that the current value of the current signal to be supplied to the signal processing device 100 is equal to or greater than a prescribed threshold value using the current control part 230 and transits a current signal corresponding to the rewriting activation instruction to the signal processing device 100. After the current signal corresponding to the rewriting activation instruction is transmitted, the information rewriting device 200 transmits information to be rewritten in "rewriting data" as a rewriting current signal indicated by an increase or decrease in current value. After the rewriting current signal in accordance with the information to be rewritten is transmitted, the information rewriting device 200 transmits a current signal corresponding to the rewriting end instruction to the signal processing device 100 in "end rewriting."

If the current detection part 160 detects a current value that is equal to or greater than a prescribed threshold value during operation in "detect current," then the signal processing device 100 is shifted to "rewriting mode." Then, the information rewriting part 153 rewrites the information in the information storage part 140 on the basis of the rewriting current signal received from the information rewriting device 200 during the operation in "rewriting mode." Thereafter, if the rewriting end instruction is received, then the information rewriting device 200 ends "rewriting mode," performs prescribed processing in "internal processing," and causes its operation mode to be shifted to "ordinary operation mode: transmitting operation." Operations of the signal processing device 100 in "ordinary operation mode: transmitting operation" are the same as the content described above using FIG. 6. In this manner, the signal processing device 100 can rewrite the information on the basis of the rewriting current signal.

(Processing Flow)

Figure 14:
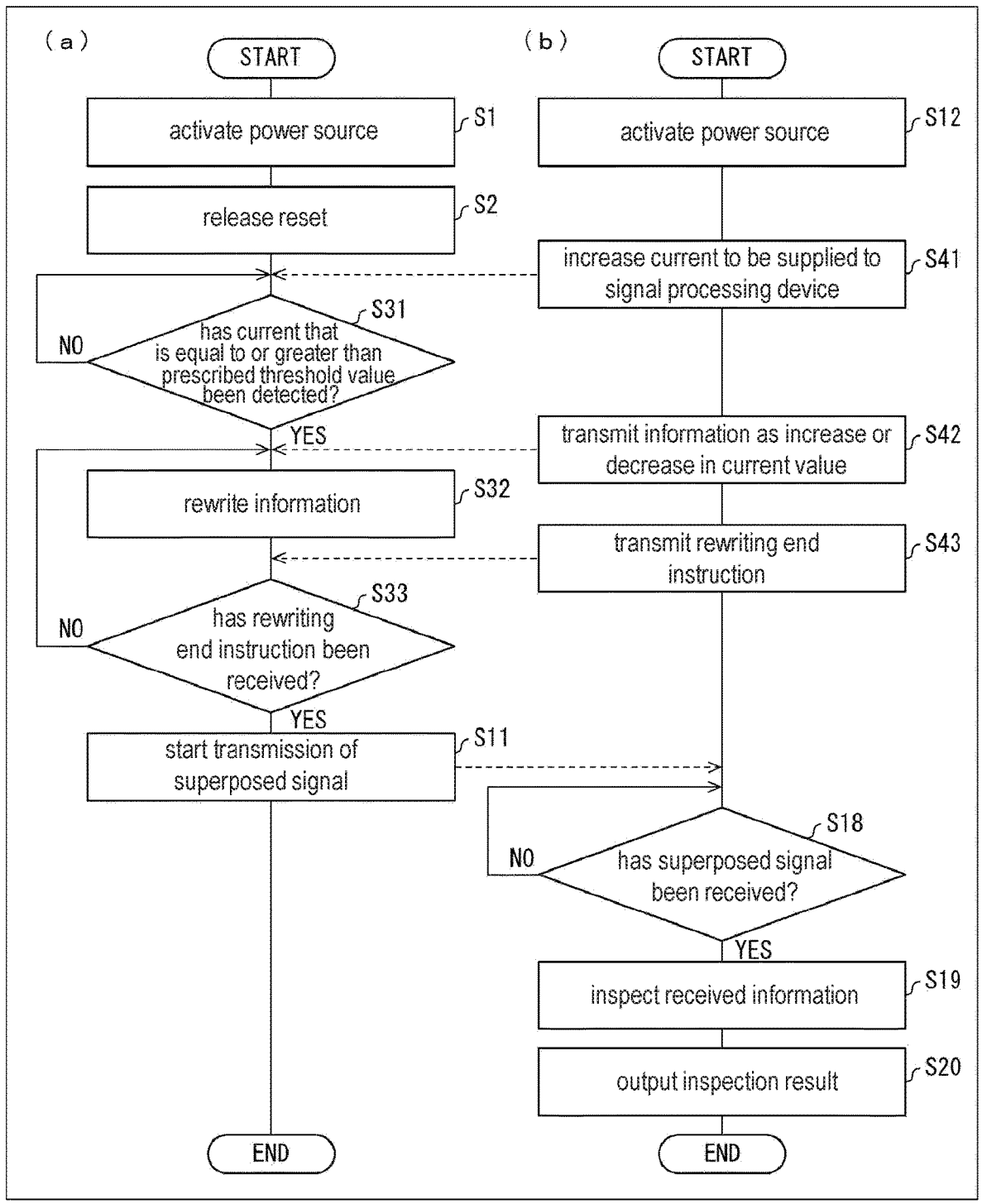
FIG. 14 is a flowchart illustrating an example of a processing flow executed by the signal processing device and the information rewriting device according to an aspect of the present disclosure, where (a) illustrates a flow of the signal processing device 100 and (b) illustrates a flow of the information rewriting device.

Each drawing in FIG. 14 is a flowchart illustrating an example of a processing flow executed by the signal processing device 100 and the information rewriting device 200 according to an aspect of the present disclosure. (a) of FIG. 14 illustrates a flow of the signal processing device 100, and (b) of FIG. 14 illustrates a flow of the information rewriting device 200. In the following description, description of the same processing as that in (a) and (b) of FIG. 7 will be omitted.

First, the flow of the signal processing device 100 will be described using (a) of FIG. 14. The signal processing device 100 executes the processing in S1 and S2, starts to detect a current value of a current signal using the current detection part 160, and determines whether or not a current that is equal to or greater than a prescribed threshold value has been detected (S31). If the current value of the current signal to be supplied to the signal processing device 100 increases through processing in S41, which will be described later, then the current detection part 160 detects the current that is equal to or greater than the prescribed threshold value (YES in S31).

After the current detection part 160 detects the current that is equal to or greater than the prescribed threshold value in S31, the information rewriting device 200 transmits information to be rewritten as an increase or a decrease in current value through processing in S42, which will be described later. The information rewriting part 153 of the transmission control circuit 150 rewrites the information in the information storage part 140 on the basis of the detection result of the current detection part 160 in regard to an increase or a decrease in current value (S32). Thereafter, the current detection part 160 determines whether or not a current signal corresponding to a rewriting end instruction has been received from the information rewriting device 200 (S33). In a case in which it is determined that the detection has been made, the transmission control circuit 150 ends the rewriting of the information and starts to transmit the superposed signal using the superposed signal transmission part 155 (S11).

Through the aforementioned processing, the signal processing device 100 can receive the information to be rewritten via the signal line connected to the input unit 4. Therefore, a special configuration for receiving the information to be rewritten is not needed. Also, since the current signal having the current value that is higher than the current value of the ON signal of the output signal of the electric apparatus 6 is selectively used as the rewriting current signal, it is possible to clearly distinguish the output signal from the rewriting current signal.

Next, the flow of the information rewriting device 200 will be described using (b) of FIG. 14. The information rewriting device 200 increases the current to be supplied to the signal processing device 100 using the current control part 230 after the processing in S12 is executed (S41). Thereafter, the current control part 230 creates a rewriting current signal having the information to be rewritten, which the information acquisition part 221 has already acquired, as an increase or a decrease in current value and transits the rewriting current signal (S42). If the transmission of the information to be rewritten is completed, then the current control part 230 generates a current signal indicating a rewriting end instruction as a rewriting end instruction and transits the current signal to the signal processing device 100 (S43). After S43, the information rewriting device 200 executes the processing in S18 to S20 and inspects the prescribed information indicated by the data signal included in the superposed signal transmitted from the signal processing device 100 through the processing in S11.

Through the aforementioned processing, the information rewriting device 200 can rewrite the information stored in the information storage part 140 using the rewriting current signal transmitted via a signal line included in the signal processing device 100. Also, since the current signal having a current value that is higher than the current value of the ON signal of the output signal of the electric apparatus 6 is selectively used as the rewriting current signal, the signal processing device 100 can clearly distinguish the output signal from the rewriting current signal.

§ 6 Third Modification Example

In the aforementioned second modification example, communication between the signal processing device 100 and the information rewriting device 200 is performed with a communication cable that is connected to the communication device-side terminal 120 and is able to transmit and receive superposed signals. Since the input unit 4 can be connected to the signal processing device 100 with the communication cable, the input unit 4, for example, may incorporate various functions included in the information rewriting device 200 in the aforementioned second modification example.

(Configurations of Signal Processing Device and Input Unit)

Figure 15:
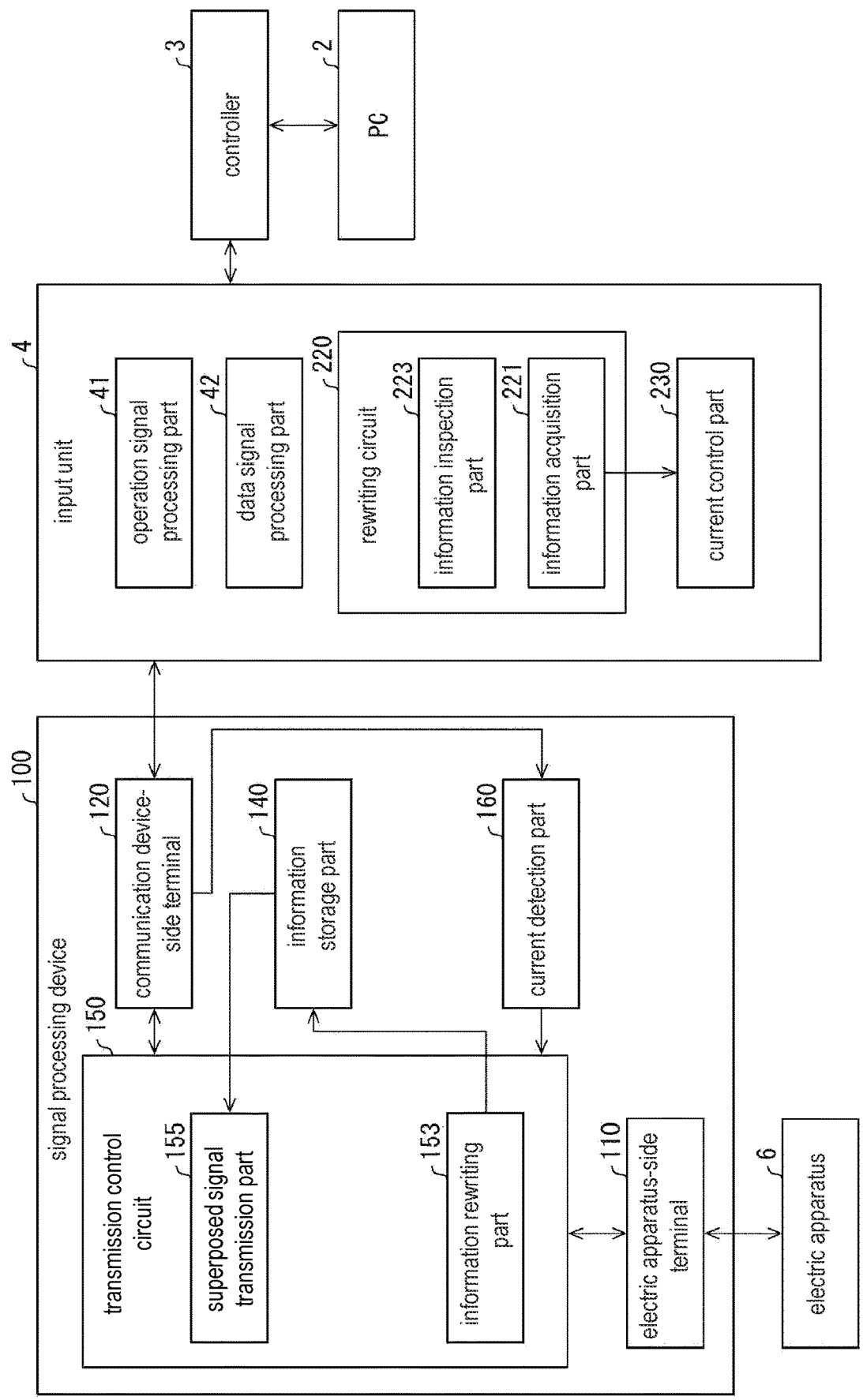
FIG. 15 is a block diagram illustrating configurations of the signal processing device and an input unit according to an aspect of the present disclosure.

FIG. 15 is a block diagram illustrating configurations of the signal processing device 100 and the input unit 4 according to an aspect of the present disclosure. Since the configuration of the signal processing device 100 is the same as the configuration illustrated in FIG. 10, description thereof will be omitted.

The input unit 4 further includes a series of configurations included in the information rewriting device 200 in the aforementioned second modification example in addition to the configuration described in the aforementioned configuration example. In other words, the input unit 4 includes the rewriting circuit 220 and the current control part 230, and the rewriting circuit 220 includes the information acquisition part 221 and the information inspection part 223. The information acquisition part 221 is different from that in the aforementioned second modification example in that the information acquisition part 221 acquires the prescribed information regarding the electric apparatus 6 from the PC 2 connected to the input unit 4 via the controller 3.

Also, the input unit 4 includes an operation signal processing part 41 and a data signal processing part 42. The operation signal processing part 41 can detect an output signal (operation signal) from a superposed signal. The operation signal processing part 41 corresponds to the input circuit 33 in FIG. 2 and transmits the detected output signal to a control circuit (corresponding to the unit control circuit 36 in FIG. 2), which is not illustrated.

The data signal processing part 42 can extract the data signal from the superposed signal. The data signal processing part 42 corresponds to the extraction circuit 34 in FIG. 2, performs error detection on the extracted data signal as needed, and transmits the data signal to the control circuit (corresponding to the unit control circuit 36 in FIG. 2), which is not illustrated.

(Circuit Configurations of Signal Processing Device and Input Unit)

Figure 16:
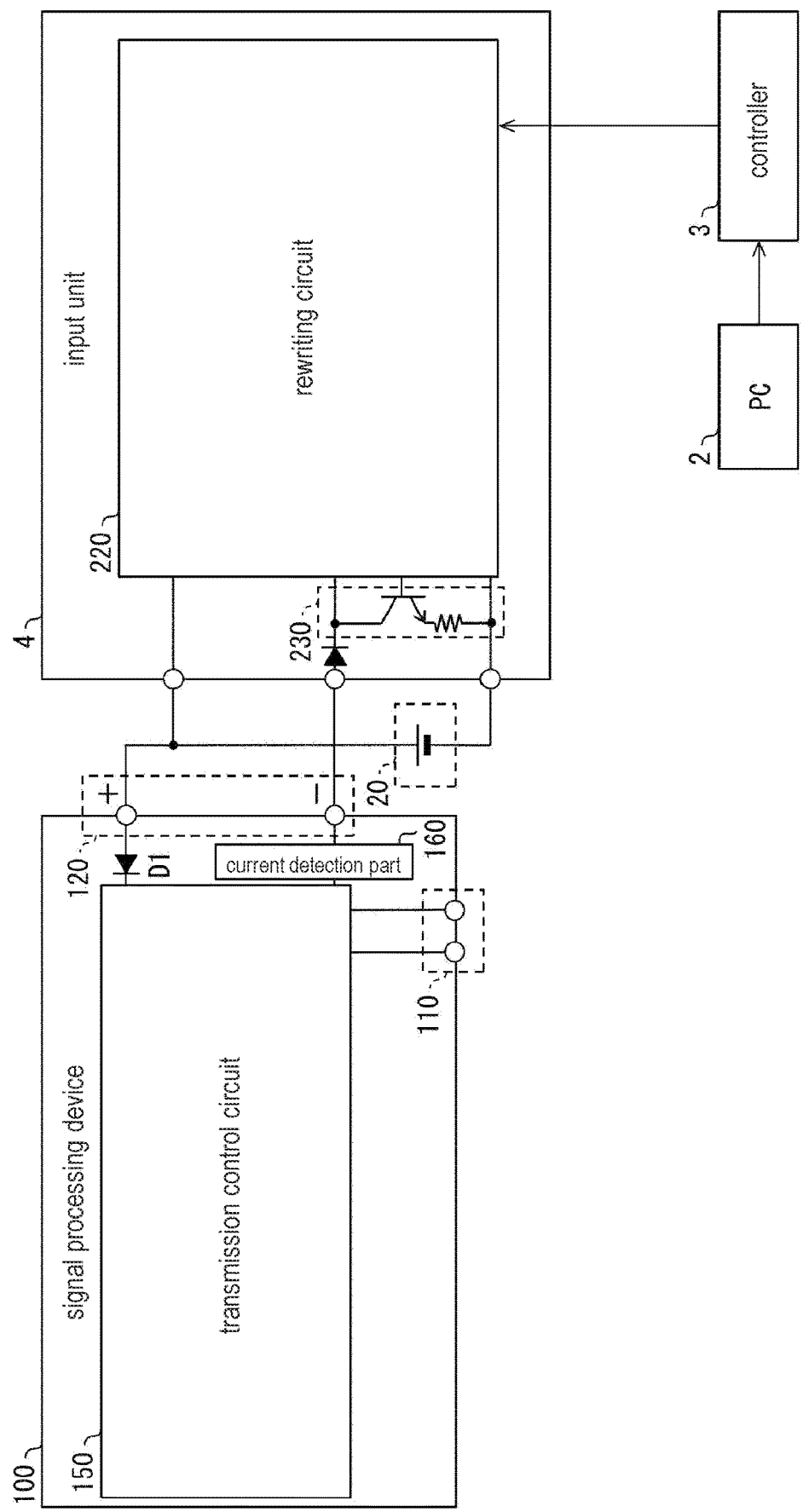
FIG. 16 is a circuit diagram illustrating configurations of the signal processing device and the input unit according to an aspect of the present disclosure.

FIG. 16 is a circuit diagram illustrating configurations of the signal processing device 100 and the input unit 4 according to an aspect of the present disclosure. The circuit configuration of the signal processing device 100 is the same as that in FIG. 11, and the circuit configuration of the input unit 4 is the same as that of the information rewriting device 200 in FIG. 11. The rewriting circuit 220 of the input unit 4 receives prescribed information input from the PC 2 via the controller 3.

(Processing Flow)

Since processing executed by the signal processing device 100 and the input unit 4 according to an aspect of the present disclosure is the same as content illustrated in (a) and (b) of FIG. 14 other than that the input unit 4 is used instead of the information rewriting device 200, the description thereof will be omitted.

In this manner, the communication device that performs detection of the output signal and extraction of the superposed signal can also function as an information rewriting device.

§ 7 Fourth Modification Example

As described above using FIG. 4, the superposed signal has a current value with expansion such as the range of H and the range of L. Therefore, in a case in which the input unit 4 that is not compatible with superposed signals is connected to the signal processing device 100, the input unit 4 receives a superposed signal as an output signal, and there is a concern that the input unit 4 cannot appropriately determine the range of H and the range of L and a detection error may occur.

As means for preventing error detection, determining whether or not the input unit 4 is compatible with communication using superposed signals on the basis of the current value of the current supplied from the input unit 4 by the signal processing device 100 is conceivable. If it is possible to detect whether or not the input unit 4 is compatible with communication using superposed signals, the signal processing device 100 can operate by switching between an operation mode in which a superposed signal is transmitted and an operation mode in which only an output signal is transmitted, for example.

However, since whether or not a signal is a rewriting current signal is determined on the basis of the current value in the aforementioned third modification example, it is necessary to perform two types of processing, namely processing of "determining whether or not there is compatibility with communication using superposed signals" and processing of "converting the signal into information to be rewritten if the signal is a rewriting current signal" for the current signal in order to realize both of them.

(Configurations of Signal Processing Device and Input Unit)

Figure 17:
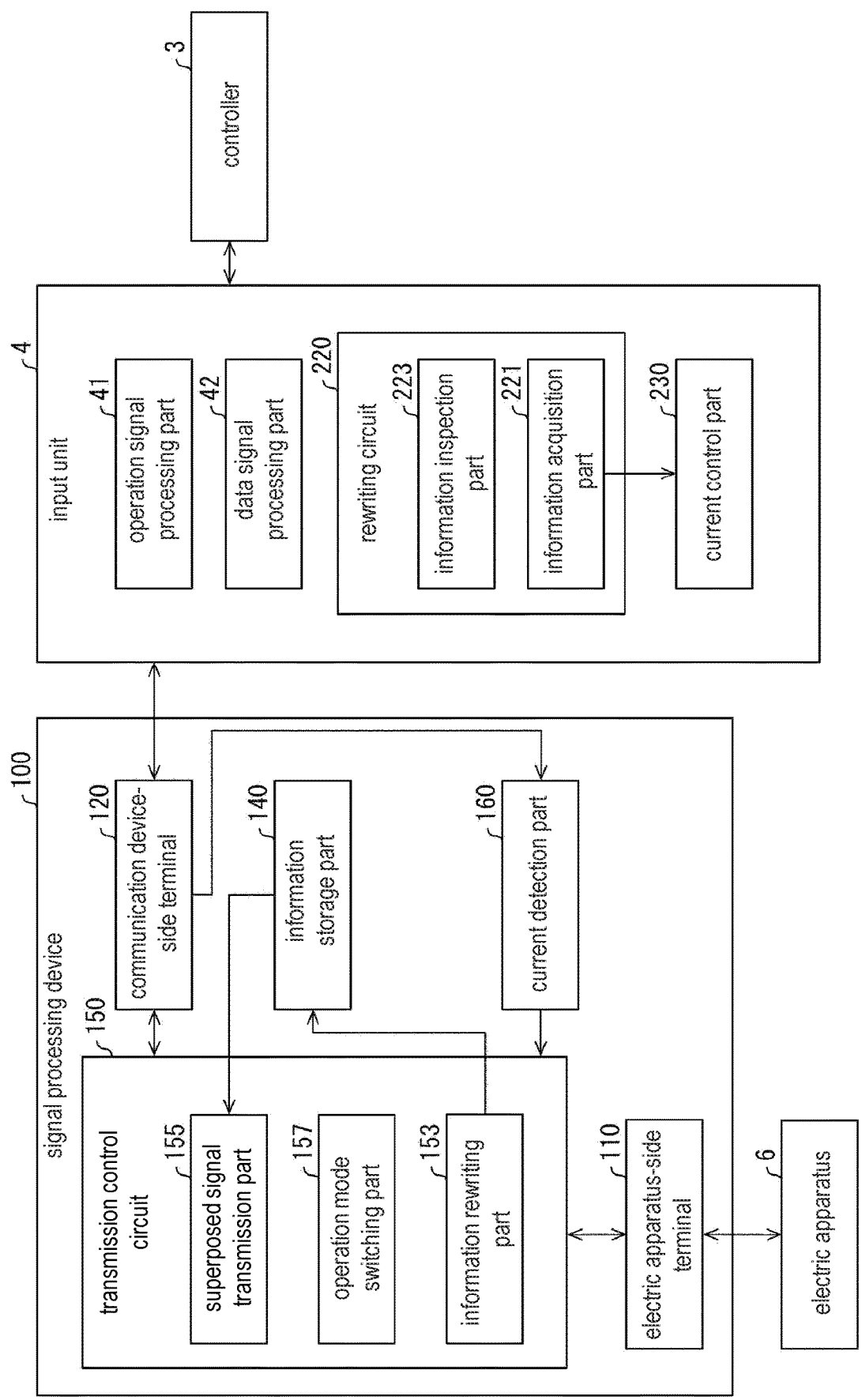
FIG. 17 is a block diagram illustrating configurations of the signal processing device and the input unit according to an aspect of the present disclosure.

FIG. 17 is a block diagram illustrating configurations of the signal processing device 100 and the input unit 4 according to an aspect of the present disclosure. Also, the configuration of the input unit 4 is the same as the configuration illustrated in FIG. 15.

The signal processing device 100 further includes the operation mode switching part 157 in addition to the configuration described in the third modification example. The signal processing device 100 can operate by switching between an ordinary operation mode in which the superposed signal transmission part 155 transmits a superposed signal and a low current consumption mode in which the superposed signal is not transmitted. The operation mode switching part 157 can switch the operation mode of the signal processing device 100 between the ordinary operation mode and the low current consumption mode on the basis of the detection result of the current detection part 160. In a case in which a pattern, such as a size or a variation, of the current value detected by the current detection part 160 is an instruction for switching to the ordinary operation mode, for example, the operation mode switching part 157 can switch the operation mode of the signal processing device 100 from the low current consumption mode to the ordinary operation mode.

Although the basic configuration of the input unit 4 is the same as that in the third modification example, a part of the configuration thereof is different. The current control part 230 of the input unit 4 can transmit an information to be rewritten as a rewriting current signal similarly to the third modification example and can transmit a current signal corresponding to a switching instruction for switching the operation mode of the signal processing device 100 between the ordinary operation mode and the low current consumption mode. The input unit 4 can notify the signal processing device 100 of the fact that the input unit 4 itself is compatible with superposed signals by transmitting a current signal corresponding to the switching instruction. Therefore, the signal processing device 100 can be caused to operate after being switched to the ordinary operation mode and then receive the superposed signal.

(Specific Examples of Rewriting Instruction and Switching Instruction)

Figure 18:
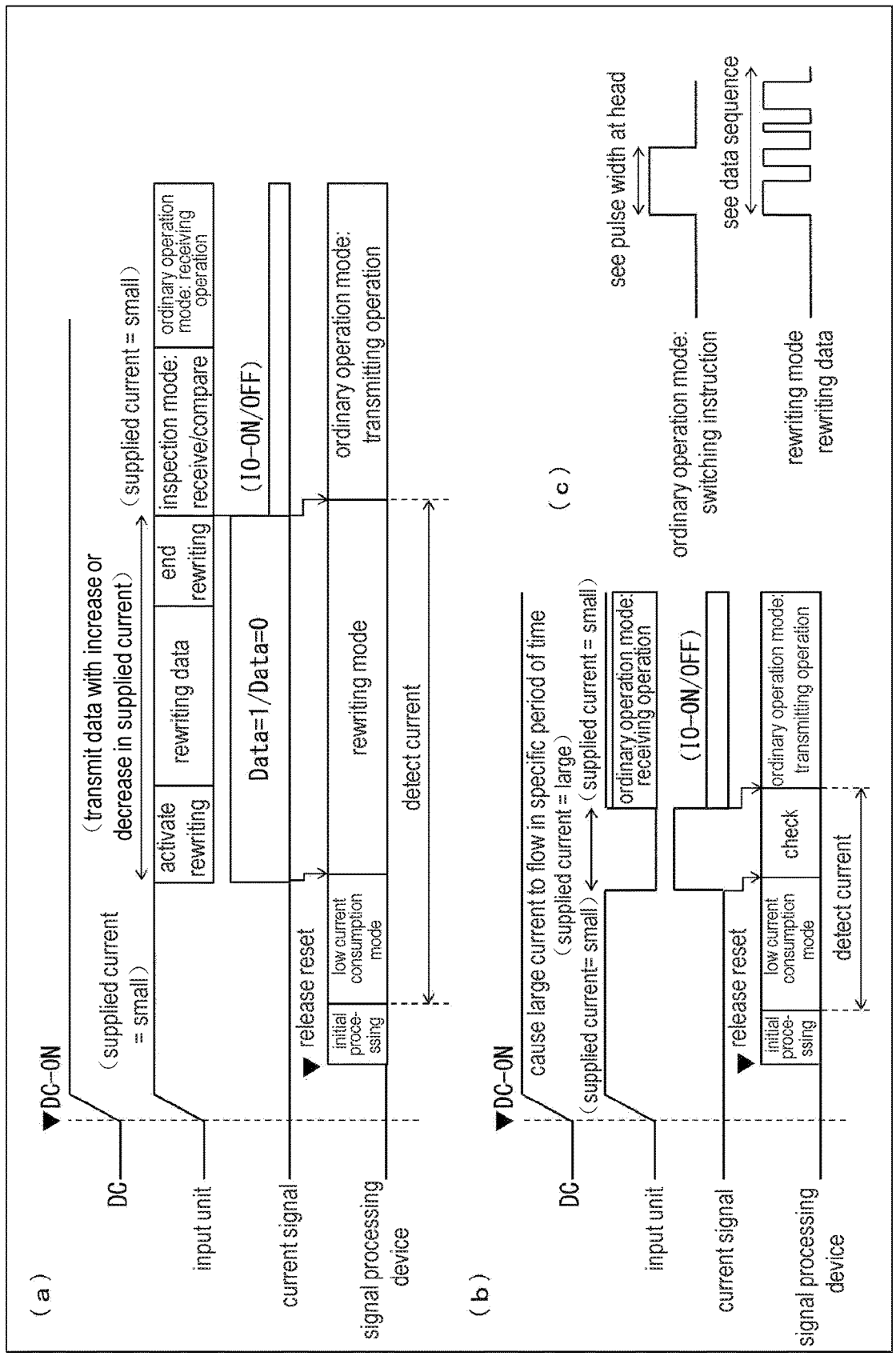
FIG. 18 is a diagram illustrating specific examples of rewriting of information and switching of an operation mode using the signal processing device and the input unit, where (a) illustrates the rewriting of information, (b) illustrates the switching of an operation mode, and (c) illustrates specific examples of a switching instruction and rewriting data.

Each diagram in FIG. 18 is a diagram illustrating a specific example of rewriting of information and switching of an operation mode using the signal processing device 100 and the input unit 4. (a) of FIG. 18 illustrates rewriting of information, and (b) of FIG. 18 illustrates switching of the operation mode. (c) of FIG. 18 illustrates specific examples of the switching instruction and the rewriting data.

(a) of FIG. 18 is basically the same as FIG. 13 other than that the input unit 4 is used instead of the information rewriting device 200. Also, "inspection mode: receive/compare" is an operation mode for the input unit 4 receiving and inspecting the superposed signal transmitted from the signal processing device 100, and "low current consumption mode" indicates the aforementioned low current consumption mode.

If the signal processing device 100 detects a current signal corresponding to a rewriting activation instruction using the current detection part 160 during the operation in "low current consumption mode" after performing initial processing, then the signal processing device 100 causes the operation mode to be switched to "rewriting mode." Since the superposed signal is not transmitted during the operation in "rewriting mode," "rewriting mode" is a type of low current consumption mode.

The signal processing device 100 rewrites the information storage part 140 using the information rewriting part 153 on the basis of the rewriting current signal detected during the operation in "rewriting mode," then ends "rewriting mode" on the basis of a rewriting end instruction, and causes the operation mode to be switched to "ordinary operation mode: transmitting operation." In other words, if the operation mode switching part 157 detects the rewriting end instruction, then the operation mode switching part 157 can switch the operation mode to the ordinary operation mode.

The signal processing device 100 generates a data signal using the prescribed information after the rewriting stored in the information storage part 140 and transmits a superposed signal including the data signal to the information rewriting device 200 using the superposed signal transmission part 155 in "ordinary operation mode: transmitting operation."

On the other hand, the input unit 4 receives and inspects the superposed signal in "inspection mode: receive/compare" after the rewriting activation instruction, the rewriting data, and the rewriting end instruction are transmitted as current signals, similarly to the information rewriting device 200 in FIG. 13. If there is no problem in the inspection result, the input unit 4 operates in "ordinary operation mode: receiving operation" and continues communication using the superposed signal.

In (b) of FIG. 18, the switching instruction from the low current consumption mode to the ordinary operation mode transmitted as a current signal from the input unit 4 to the signal processing device 100 corresponds to supply of a large current during a specific period of time. In other words, the input unit 4 supplies a large current as a switching instruction when the signal processing device 100 operates in the low current consumption mode for a specific period of time. The signal processing device 100 determines whether or not the current signal corresponds to the switching instruction in "check," and as a result of determining that the current signal corresponds to the switching instruction, the signal processing device 100 switches the operation mode to the ordinary operation mode using the operation mode switching part 157 and starts to transmit the superposed signal. After the large current corresponding to the switching instruction is supplied, the input unit 4 operates in "ordinary operation mode: receiving operation" and starts to receive the superposed signal.

(c) of FIG. 18 illustrates specific examples of a switching instruction from the low current consumption mode to the ordinary operation mode transmitted by the input unit 4 as a current signal and a rewriting current signal received by the signal processing device 100 as rewriting data during an operation in "rewriting mode." As described above using (b) of FIG. 18, the switching instruction is evaluated by, for example, a duration time of the current value. In other words, in a case in which the current detection part 160 detects that the pulse width of the head of the current signal is equal to or greater than a prescribed pulse width, the signal processing device 100 determines that the current signal is a switching instruction.

On the other hand, the rewriting data is evaluated on the basis of a data sequence obtained by combining variations in current value as a binary value as described above using FIG. 12. Specifically, in a case in which the rewriting current signal detected by the current detection part 160 of the signal processing device 100 during an operation in the low current consumption mode is a prescribed data sequence, the information rewriting part 153 may shift to the rewriting mode in which the information stored in the information storage part 140 is rewritten. Conversely, the information rewriting device 200 may supply a rewriting current signal that is a prescribed data sequence to the signal processing device 100 operating in the low current consumption mode and then supply a rewriting current signal in accordance with information to be rewritten.

If the switching instruction is evaluated in this manner, the signal processing device 100 can distinguish the current supply for switching the operation mode from the rewriting current signal.

(Processing Flow of Signal Processing Device)

Figure 19:
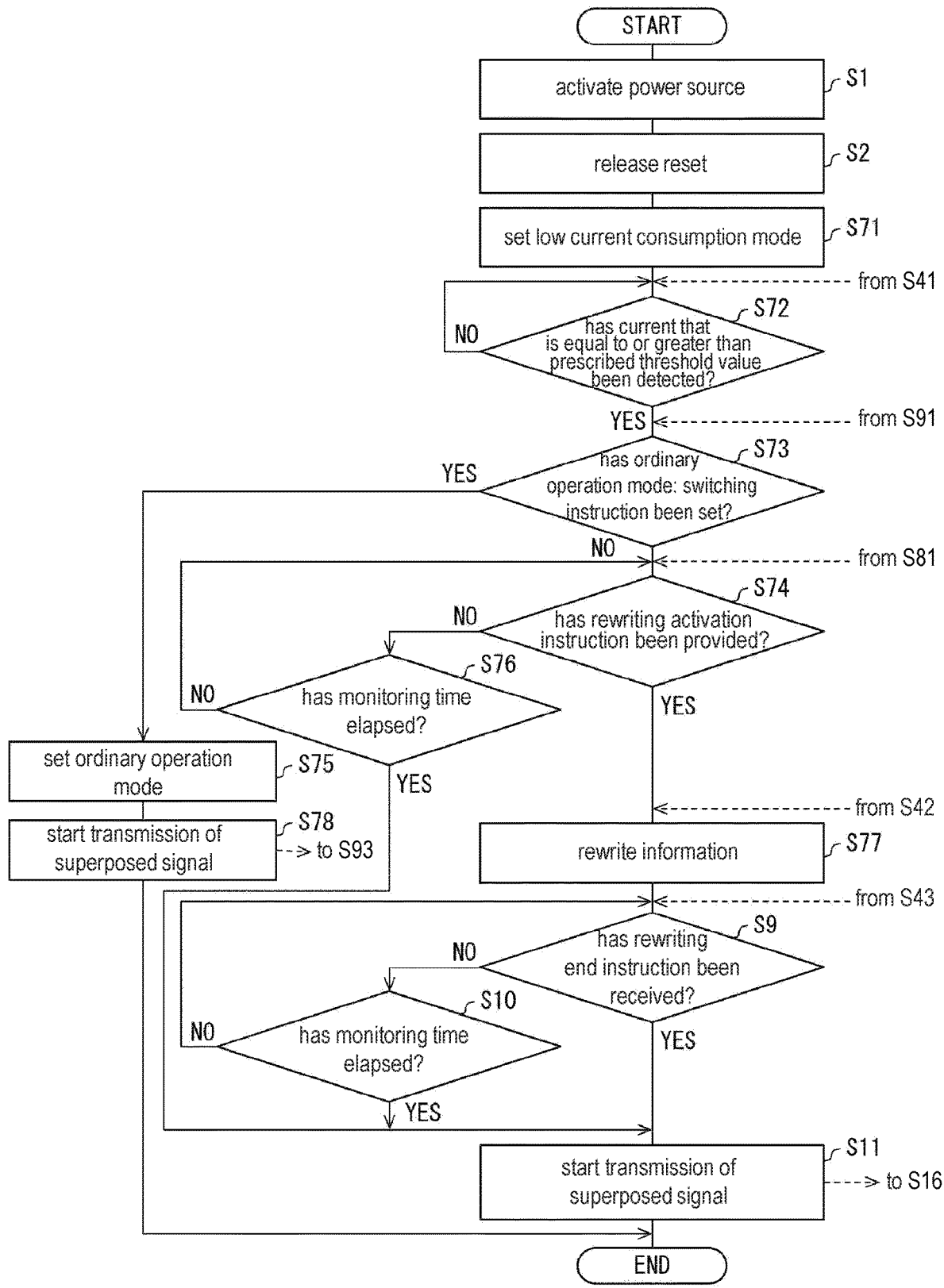
FIG. 19 is a flowchart illustrating an example of a processing flow executed by the signal processing device according to an aspect of the present disclosure.

FIG. 19 is a flowchart illustrating an example of a processing flow executed by the signal processing device 100 according to an aspect of the present disclosure. In the following description, description of the same processing as that in (a) of FIG. 7 will be omitted.

After the signal processing device 100 executes the processing in S1 and S2, the operation mode switching part 157 sets the operation mode of the signal processing device 100 to the low current consumption mode (S71). After S71, the current detection part 160 starts to detect that the current having a current value that is equal to or greater than the prescribed threshold value has been supplied from the input unit 4 (S72). If the current supplied from the input unit 4 increases through processing in S41, then the current detection part 160 detects that the current having the current value that is equal to or greater than the prescribed threshold value has been supplied from the input unit 4 (YES in S72), and the processing proceeds to S73.

In S73, the signal processing device 100 determines whether or not the current detection part 160 has detected an instruction for switching to the ordinary operation mode by checking whether or not the pulse width of the current signal is equal to or greater than a prescribed pulse width (S73). In a case in which it is determined that the switching instruction has not been detected (NO in S73), the processing proceeds to S74. On the other hand, in a case in which it is determined that the switching instruction has been detected (YES in S73), the operation mode switching part 157 sets the operation mode of the signal processing device 100 to the ordinary operation mode (S75), and the superposed signal transmission part 155 starts to transmit the superposed signal (S78). Thereafter, the series of processing is ended.

In S74, the signal processing device 100 further determines whether or not the current detection part 160 has received the rewriting activation instruction (S74). In a case in which it is determined that the rewriting activation instruction has not been received (NO in S74), the signal processing device 100 determines whether or not preset monitoring time has elapsed (S76). In a case in which it is determined that the monitoring time has not elapsed (NO in S76), the processing proceeds to S74, and the processing in S74 and S76 is executed again. On the other hand, in a case in which it is determined that the monitoring time has elapsed (YES in S76), the signal processing device 100 ends the reception of the rewriting instruction regarding the prescribed information, and the processing proceeds to S11.

If the rewriting activation instruction is transmitted from the input unit 4 using a current pulse through processing in S81, which will be described later, then the current detection part 160 detects the rewriting activation instruction, and the signal processing device 100 determines that the current detection part 160 has received the rewriting activation instruction (YES in S74). Then, the information rewriting part 153 rewrites the information in the information storage part 140 on the basis of the rewriting current signal, which has been transmitted from the input unit 4 through the processing in S42, in which the information to be rewritten is indicated as an increase or a decrease in current value (S77). Thereafter, the signal processing device 100 executes the processing in S9 to S11 and then ends the series of processing.

Through the aforementioned processing, the signal processing device 100 can switch to the ordinary operation mode if the current that is equal to or greater than the prescribed threshold value is detected with a pulse width that is equal to or greater than the prescribed pulse width during the operation in the low current consumption mode. Here, in a case in which the input unit 4 connected to the signal processing device 100 is an input unit that is compatible with reception of superposed signals, the input unit 4 can be configured to supply a current that is equal to or greater than the prescribed threshold value to the signal processing device 100. In this case, the signal processing device 100 can operate in different operation modes in a case in which the signal processing device 100 is connected to an input unit communication device that is compatible with superposed signals and in a case in which the signal processing device 100 is connected to an input unit that is not compatible with superposed signals. Therefore, it is possible to provide the signal processing device 100 with excellent convenience that operates in an operation mode switched in accordance with the type of the input unit at a connection destination. Also, since the operation mode is switched to the ordinary operation mode if a current that is equal to or greater than the prescribed threshold value is detected with a pulse width that is equal to or greater than the prescribed pulse width, it is possible to distinguish the rewriting current signal.

(Processing Flow of Input Unit for Transmitting Rewriting Data)

Figure 20:
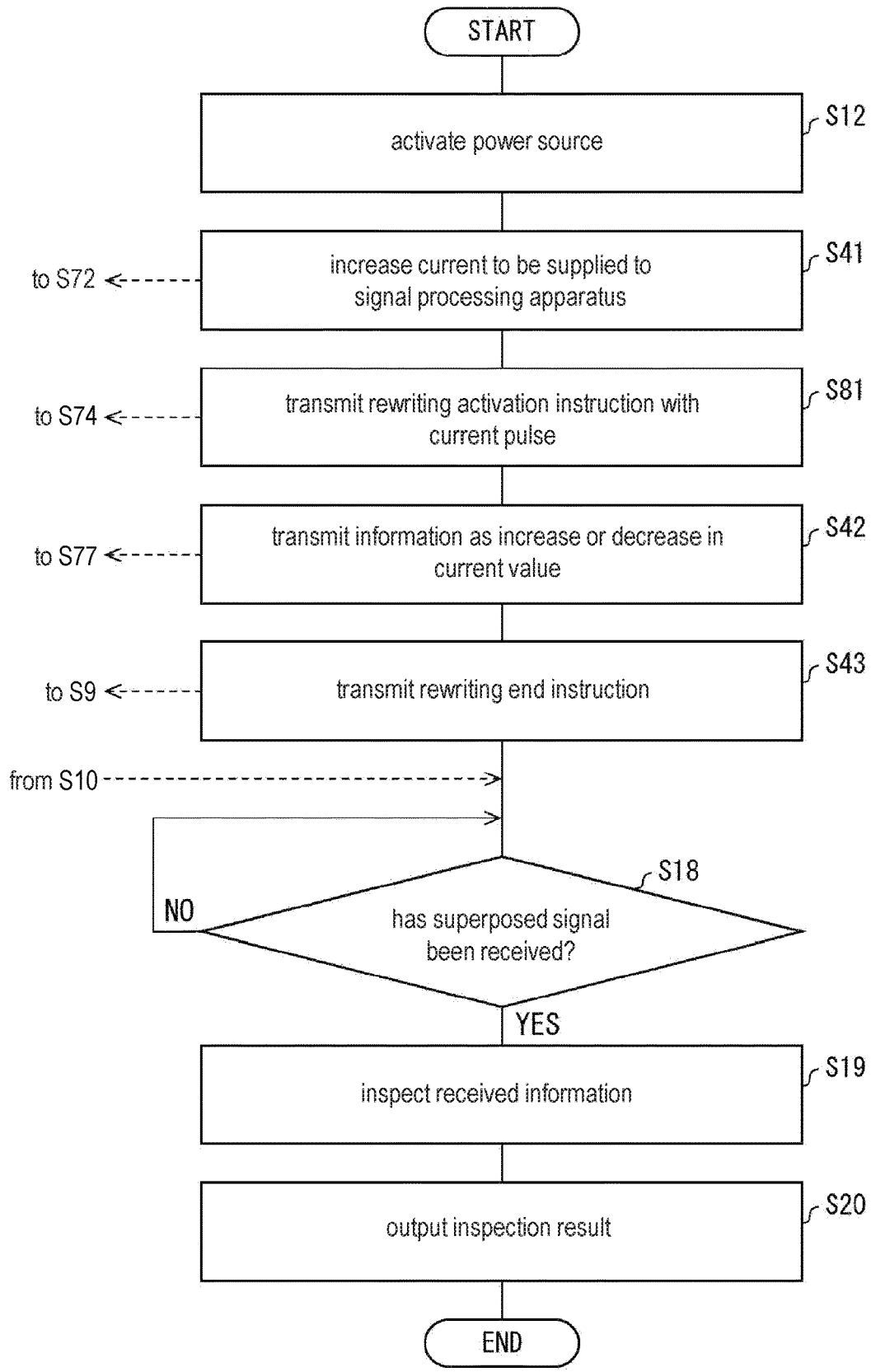
FIG. 20 is a flowchart illustrating an example of a processing flow executed by the input unit according to an aspect of the present disclosure.

FIG. 20 is a flowchart illustrating an example of a processing flow executed by the input unit 4 according to an aspect of the present disclosure. In the following description, description of the same processing as that in (b) of FIG. 14 will be omitted.

The input unit 4 transmits a current pulse corresponding to the rewriting activation instruction to the signal processing device 100 under control performed by the current control part 230 after the processing in S12 and S41 (S81). Thereafter, the processing in S42 and S43 and S18 to S20 is executed, and the series of processing is ended.

Through the aforementioned processing, the input unit 4 can rewrite the information stored in the information storage part 140 using the rewriting current signal transmitted via a signal line included in the signal processing device 100.

(Processing Flow of Input Unit for Transmitting Switching Instruction)

Figure 21:
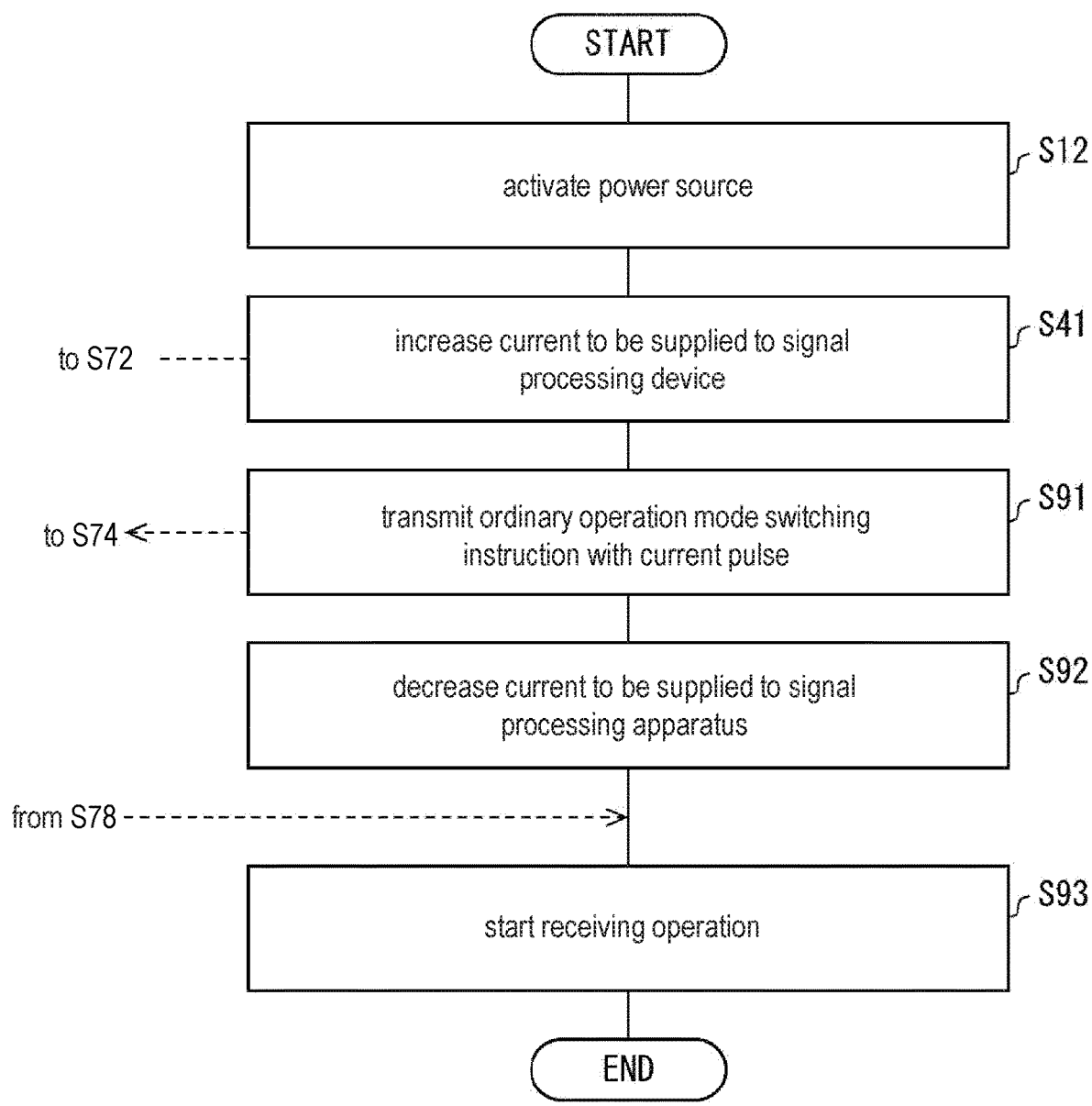
FIG. 21 is a flowchart illustrating an example of a processing flow executed by the input unit according to an aspect of the present disclosure.

FIG. 21 is a flowchart illustrating an example of a processing flow executed by the input unit 4 according to an aspect of the present disclosure. In the following description, description of the same processing as that in (b) of FIG. 14 will be omitted.

The input unit 4 transmits a current pulse corresponding to the instruction for switching to the ordinary operation mode to the signal processing device 100 under control performed by the current control part 230 after the processing in S12 and S41 (S91). Thereafter, the input unit 4 controls the current control part 230 to cause the current control part 230 to decrease the current to be supplied to the signal processing device 100 (S92) and then starts an operation of receiving the superposed signal transmitted from the signal processing device 100 (S93).

Through the aforementioned processing, the input unit 4 can notify the signal processing device 100 of the fact that the input unit 4 itself is an input unit that is compatible with superposed signals. Therefore, it is possible to cause the signal processing device 100 to operate in the ordinary operation mode and to receive the superposed signal. Also, since the signal processing device 100 switches to the ordinary operation mode if the current that is equal to or greater than the prescribed threshold value is detected with a pulse width that is equal to or greater than the prescribed pulse width, it is possible to cause the signal processing device 100 to distinguish the current supply for switching the mode from the rewriting current signal.

Second Embodiment

Another embodiment according to an aspect of the present disclosure will be described below. For convenience of explanation, the same reference signs will be applied to members having the same functions as those of the members described in the first embodiment, and the description thereof will not be repeated.

§ 1 Application Example

Figure 22:
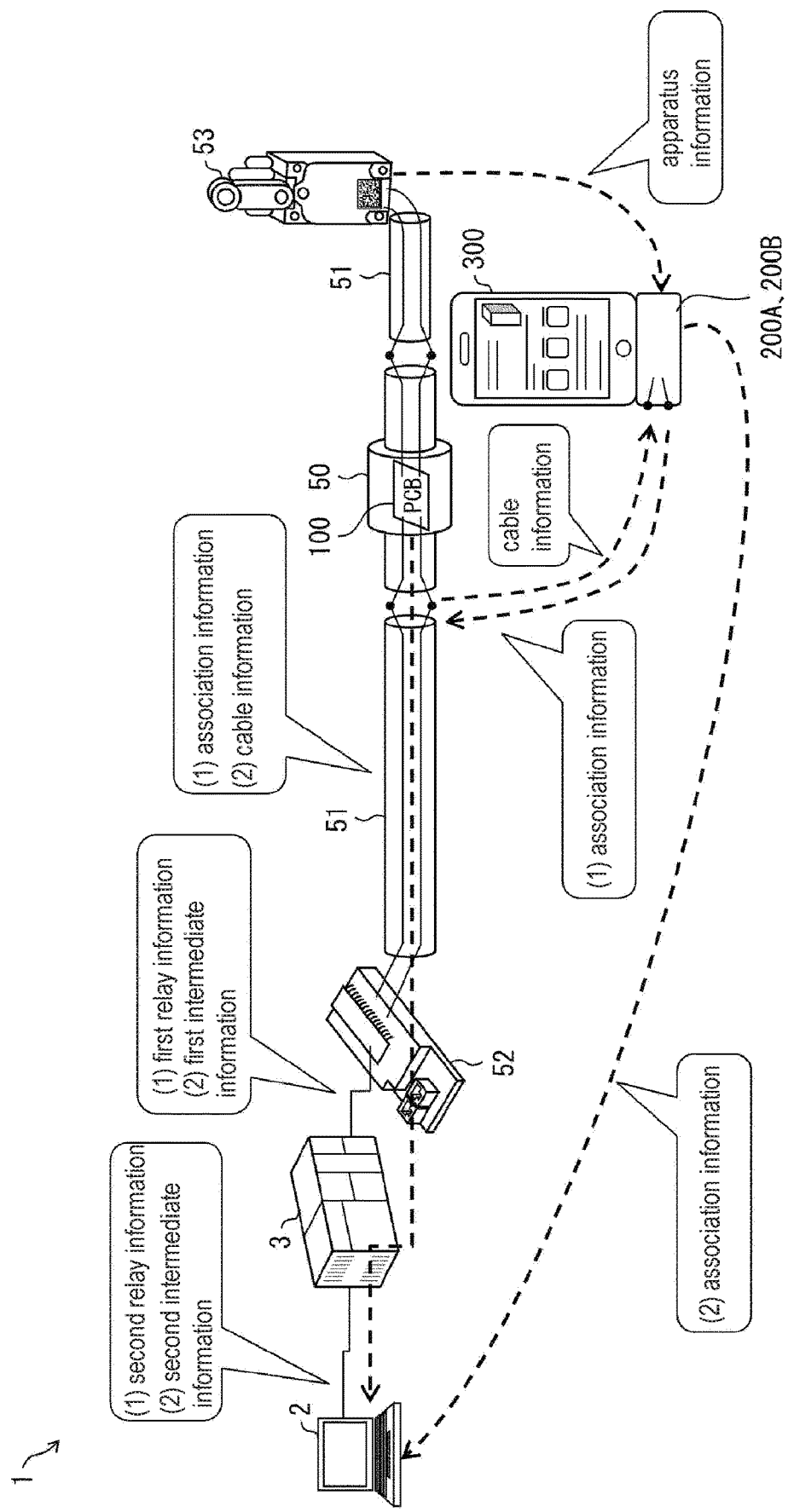
FIG. 22 is a diagram schematically exemplifying an example of an application situation of the signal processing device and the input terminal according to an aspect of the present disclosure.

FIG. 22 is an example schematically exemplifying an example of an application situation of a signal processing device 100 according to the present embodiment. A communication system 1 includes a personal computer 2 (a PC or an information processing device), a controller 3, an input unit 4, an output unit 5, and electric apparatuses 6 to 10 similarly to the first embodiment.

In the present embodiment, the input unit 4 and the output unit 5 will be collectively referred to as an input/output unit 52 as a component conceptually including them in a case in which it is not necessary to distinguish the input unit 4 from the output unit 5. The input/output unit 52 is compatible with superposed signal communication similarly to the input unit 4 and the output unit 5. Therefore, the input/output unit 52 includes the components in FIG. 2 that the input unit 4 and the output unit 5 include to be compatible with the superposed signal communication.

In the present embodiment, in a case in which it is not necessary to individually identify the electric apparatuses 6 to 10, the electric apparatuses 6 to 10 will be simply referred to as an electric apparatus 53. In the present embodiment, a superposed-signal-communication-incompatible apparatus is assumed as the electric apparatus 53.

In the present embodiment, the signal processing device 100 for processing superposed signals is provided between communication cables 51 connecting the input/output unit 52 to the electric apparatus 53. Therefore, the signal processing device 100 has a cable casing 50 (casing) with an outer shape like a communication cable that can be electrically connected to the communication cables 51.

For example, one end of the cable casing 50 can be attached to and detached from the communication cable 51 connected to the electric apparatus 53 that is a superposed-signal-communication-incompatible apparatus. The signal processing device 100 and the electric apparatus 53 are electrically connected by the communication cable 51 on the side of the electric apparatus 53 and the one end of the cable casing 50 being connected to each other, such that operation signals can be transmitted and received between the signal processing device 100 and the electric apparatus 53. The cable casing 50 incorporating the signal processing device 100 and the electric apparatus 53 are connected in a one-to-one relationship. In the present embodiment, the electric apparatus 53 is a superposed-signal-communication-incompatible apparatus, and it is thus assumed that superposed signals are not transmitted and received.

Also, the other end of the cable casing 50 can be connected to the input/output unit 52. Specifically, the other end of the cable casing 50 is configured to be able to be attached to and detached from the communication cable 51 connected to the input/output unit 52. When the communication cable 51 on the side of the input/output unit 52 and the other end of the cable casing 50 are connected, the input/output unit 52 and the signal processing device 100 are electrically connected, and superposed signals can be transmitted and received between the input/output unit 52 and the signal processing device 100. A superposed signal transmitted from the input/output unit 52 to the signal processing device 100 includes an operation signal for controlling an operation element of the electric apparatus 53 connected to the signal processing device 100, for example. Also, a superposed signal transmitted from the signal processing device 100 to the input/output unit 52 includes an operation signal in accordance with a state of the operation element of the electric apparatus 53 connected to the signal processing device 100 and a data signal indicating prescribed information regarding the electric apparatus 53 or the signal processing device 100, for example. For example, information unique to the electric apparatus 53, such as a serial number of the electric apparatus 53, is included as the data signal.

According to the aforementioned configuration, the electric apparatus 53 is connected to the signal processing device 100 that is compatible with superposed signal communication in a one-to-one relationship and is connected to the input/output unit 52 via the signal processing device 100. Therefore, the input/output unit 52 can superpose the data signal unique to the electric apparatus 53 with the operation signal and exchange the superposed signal with the signal processing device 100 even if the electric apparatus 53 is a superposed-signal-communication-incompatible apparatus. Therefore, it is possible to incorporate and use the superposed-signal-communication-incompatible apparatus similarly to the electric apparatus that is compatible with superposed signal communication in a communication system using superposed signals. As a result, a degree of freedom in system construction is enhanced, and convenience is improved.

Also, the one input/output unit 52 has a plurality of communication ports, is connected to signal processing devices 100 in a plurality of cable casings 50 through the communication ports, and transmits and receives superposed signals to and from each of the signal processing devices 100. The input/output unit 52 can thus monitor and control the plurality of electric apparatuses 53. In other words, the input/output unit 52 can constitute a master module for superposed signal communication using each signal processing device 100 as a sleeve.

Here, in order to manage the plurality of electric apparatuses 53 similarly to other electric apparatuses that are compatible with superposed signal communication in the communication system 1, it is necessary for various devices on the upstream side of the input/output unit 52 to recognize correspondences between the signal processing device 100 (or the cable casing 50) and the electric apparatuses 53. Specifically, the various devices on the upstream side indicate the controller 3, the PC 2, a server that is communicably connected to the PC 2, which is not illustrated, and the like.

Thus, the input terminal 300 (terminal device) is introduced into the communication system 1 in the present embodiment. The input terminal 300 is adapted to generate association information indicating correspondences between the signal processing device 100 (or the cable casing 50) and the electric apparatuses 53 and provide the association information to the various devices on the upstream side.

In one example, the cable casing 50 is configured to be connectable with the input terminal 300 at the aforementioned other end. Specifically, the other end of the cable casing 50 is configured to be able to be attached to and detached from an information transfer device 200A (200B) provided outside or incorporated in the input terminal 300. In a case in which the other end of the cable casing 50 is not connected to the input/output unit 52, the other end can be connected to the input terminal 300, more accurately, to the information transfer device 200A (200B). When the other end of the cable casing 50 and the input terminal 300 are connected via the information transfer device 200A (200B), the input terminal 300 and the signal processing device 100 are electrically connected, and the input terminal 300 can transmit and receive data to and from the signal processing device 100. Specifically, the input terminal 300 can read at least prescribed information from the signal processing device 100. The prescribed information read by the input terminal 300 from the signal processing device 100 is, for example, information unique to the signal processing device 100 (or the cable casing 50) (hereinafter, cable information). Also, the input terminal 300 can write the prescribed information in the signal processing device 100 as needed.

The information transfer device 200A (200B) communicably connects the signal processing device 100 to the input terminal 300 similarly to the information rewriting device 200. The information transfer device 200A (200B) includes at least a mechanism for reading the prescribed information stored in the information storage part 140 of the signal processing device 100 as will be described later. The information transfer device 200A (200B) may include a mechanism for writing the prescribed information in the information storage part 140 of the signal processing device 100, that is, the components included in the information rewriting device 200 as illustrated in FIG. 1 as needed.

In this manner, the association information indicating the correspondences between the signal processing device 100 (or the cable casing 50) and the electric apparatuses 53 is created by the input terminal 300 and is then provided to the various devices on the upstream side. Therefore, the PC 2 can monitor and control all the electric apparatuses 53 belonging to the communication system 1 regardless of whether or not the electric apparatuses 53 are compatible with the superposed signal communication, for example.

Hereinafter, two examples of a configuration to supply the association information to the PC 2 will be described as a configuration example (1) and a configuration example (2). Before description of each configuration example, a network configuration of the communication system 1 as the assumption that is common to the two configuration examples will be described with reference to FIG. 23 first.

However, the following description illustrates only an example of the configuration of the communication system 1 including the input/output unit 52 according to the present disclosure, and the present invention is not intended to be limited to a configuration in which the input/output unit 52 is connected to a network. In another example, the input/output unit 52 may be connected to the controller 3 without any network interposed therebetween. In other words, such an input/output unit 52 that is connected to a system bus of the controller 3 and has a superposed communication function is also included in the scope of the present invention.

(a) of FIG. 23 is a diagram for explaining an example of a network configuration constructed in the communication system 1 to which the signal processing device 100 is applied.

(b) of FIG. 23 is a diagram illustrating an example of a data structure of address information managed by the network of the communication system 1.

As illustrated in (a) of FIG. 23, the PC 2 is communicably connected to one or a plurality of controllers 3 in the communication system 1. In a case in which the PC 2 communicates with a plurality of controllers 3, the PC 2 identifies the controllers 3 that are counterparts of the communication on the basis of identification information (hereinafter, controller IDs) unique to the controllers 3.

The controllers 3 may be connected to one or a plurality of networks. Also, the controllers 3 are communicably connected to one or a plurality of input/output units 52 via one network. In a case in which the controllers 3 are connected to a plurality of networks, the controllers 3 identify the networks on the basis of identification information (hereinafter, network IDs) unique to the networks. In addition, in a case in which the controllers 3 communicate with a plurality of input/output units 52 via one network, the controllers 3 identify the input/output units 52 that are counterparts of the communication on the basis of identification information (hereinafter, node IDs) allocated to the input/output units 52 that are managed as nodes in the network. Specifically, the controllers 3 have grasped correspondences between the unit IDs for identifying the input/output units 52 and the node IDs. The controllers 3 can specify the node IDs on the basis of the unit IDs of the input/output units 52 that are counterparts of the communication and pass the node IDs as a part of the address information of the input/output units 52 in the network to apparatuses on the upstream side (the PC 2, for example).

The input/output units 52 are communicably connected to the plurality of electric apparatuses 53 via a plurality of communication ports that the input/output units 52 include and the plurality of cable casings 50. In a case in which the input/output units 52 are connected to the signal processing devices 100 (and thus the plurality of electric apparatuses 53) in the plurality of cable casings 50, the input/output units 52 identify the signal processing devices 100 that are counterparts of the communication on the basis of bit values individually allocated to the communication ports. Specifically, the input/output units 52 have grasped correspondences between cable information (first identification information) that is information unique to the cable casings 50 (signal processing devices 100) and the bit values. The input/output units 52 can specify bit values on the basis of the cable information of the cable casings 50 (signal processing devices 100) that are counterparts of the communication and pass the bit values as a part of the address information of the electric apparatuses 53 in the network to apparatuses on the upstream side (the controller 3, for example).

As illustrated in (b) of FIG. 23, the PC 2 can individually identify all the electric apparatuses 53 belonging to the communication system 1 managed by the PC 2 and specify where the electric apparatuses 53 are in the network, on the basis of the address information configured with the controller IDs of the controllers 3, the network IDs, and the node IDs and the bit values passed from the downstream side.

§ 2 Configuration Example (1)

In the configuration example (1), the information transfer device 200A connected to the input terminal 300 includes a mechanism for rewriting information in the signal processing device 100 in addition to the mechanism for reading information from the signal processing device 100 in the cable casing 50. The association information generated by the input terminal 300 is output to the signal processing device 100 and is then supplied from the signal processing device 100 to the input/output unit 52 and the PC 2 via the communication cable 51.

[Hardware Configuration]

FIG. 24 is a block diagram illustrating configurations of the signal processing device 100, the information transfer device 200A, and the input terminal 300 according to an aspect of the present disclosure. The input/output unit 52 illustrated in the drawing is assumed to be compatible with communication using superposed signals similarly to the input unit 4 and the output unit 5.

<Signal Processing Device 100>

The signal processing device 100 includes a configuration similar to that of the signal processing device 100 described in the first embodiment other than that the signal processing device 100 is incorporated in the cable casing 50.

In the present embodiment, the information storage part 140 can store prescribed information regarding the electric apparatus 53 and also store cable information that is information unique to the cable casing 50 (signal processing device 100).

The cable information is defined in advance when the cable casing 50 incorporating the signal processing device 100 is manufactured or shipped, for example, and is stored in the information storage part 140.

In one example, a region for storing the prescribed information regarding the electric apparatus 53 and a region for storing the cable information may be configured with different IC memories in the information storage part 140 in the present embodiment. Typically, the former region may be configured with a user programmable ROM such as an Electrically Erasable Programmable Read Only Memory (EEPROM) (registered trademark) in which data is rewritable by the input terminal 300, and the latter region may be configured with an EEPROM, which is an EEPROM different from that in the former region, in which writing is inhibited after setting at the time of shipping.

<Information Transfer Device 200A>

The information transfer device 200A includes a mechanism for reading information stored in the signal processing device 100 in addition to the mechanism for writing information in the signal processing device 100 included in the information rewriting device 200 described in the first embodiment.

The information transfer device 200A includes a transfer circuit 220A instead of the rewriting circuit 220 of the information rewriting device 200. The transfer circuit 220A is typically configured with hardware such as a micro processing unit (MPU), a field-programmable gate array (FPGA), and the like. The transfer circuit 220A is different from the rewriting circuit 220 in the first embodiment in that the transfer circuit 220A further includes a second information acquisition part 225. In the following description, the information acquisition part 221 in the first embodiment will be referred to as a first information acquisition part 221 in order to clearly distinguish it from the second information acquisition part 225. The first information acquisition part 221 indicates a component that is the same as the information acquisition part 221 in the first embodiment. The first information acquisition part 221, the information inspection part 223, and the second information acquisition part 225 of the transfer circuit 220A may be realized by a MPU using information stored in a memory, which is not illustrated, and executing commands of a program that is software for realizing each component, for example.

The second information acquisition part 225 is adapted to acquire cable information from the signal processing device 100 and transfer the cable information to the input terminal 300 in accordance with an instruction from the input terminal 300. Specifically, the second information acquisition part 225 receives a superposed signal transmitted from the superposed signal transmission part 155 of the signal processing device 100 via the second input terminal 32, controls the extraction circuit 34, and extracts a data signal indicating the cable information from the superposed signal. The second information acquisition part 225 controls the error detection circuit 35 and performs error detection on the extracted data signal. The second information acquisition part 225 controls the FPGA, for example, and transfers the data signal indicating the cable information and the error detection result to a memory, which can be read by the input terminal 300 and is not illustrated in the drawing.

In this manner, the input terminal 300 can read the cable information held by the signal processing device 100 in the cable casing 50 from the memory and process the cable information.

<Input Terminal 300>

The input terminal 300 is adapted to serve as a tool for managing the association information between the signal processing device 100 in the cable casing 50 and the electric apparatus 53 and provide an execution part (an application, for example) that executes management of the association information and a user interface required by the user to operate the execution part. The input terminal 300 is typically configured with a smartphone, a tablet, a node PC, a dedicated terminal, or the like.

The input terminal 300 includes a control part 310, an input part 311, a display part 312, and a peripheral device interface, which is not illustrated, in an example. In the configuration example, the input terminal 300 may include a communication part 313 as needed.

The control part 310 is adapted to collectively control each component in the input terminal 300. The control part 310 may be a processor that executes commands of a program, for example. As the processor, it is possible to use a central processing unit (CPU) or an MPU, for example. The control part 310 according to the example illustrated in FIG. 24 includes blocks of an apparatus information acquisition part 301, a cable information acquisition part 302, an information association part 303, and an association information output part 304. Each of the aforementioned components illustrated as blocks may be realized by the CPU or the MPU reading and executing a program stored in a storage device such as a read only memory (ROM) on a random access memory (RAM), for example. Moreover, in a case in which the input terminal 300 is a mobile terminal such as a smartphone, the control part 310 may include a block, which is not illustrated, for realizing basic tools (such as a phone application, an e-mail application, an address book management application, a camera application, and a two-dimensional code reader application) that a general mobile terminal provides.

The input part 311 is adapted to assist the user in inputting information to the input terminal 300. As the input part 311, a touch panel, a camera (imaging part), or a microphone, for example, is assumed. In a case in which the input part 311 is configured as a touch panel, the touch panel is formed integrally with a display part 312, which will be described later. The input part 311 that serves as a touch panel receives a user's input operation and outputs information corresponding to the input operation to the control part 310 of the input terminal 300.

The display part 312 is adapted to represent information processed by the control part 310 such that the user can visually recognize the information. For example, the display part 312 is configured with a liquid crystal display (LCD), an organic electro-luminescence (EL), display, or the like.

The communication part 313 is adapted to perform communication with an external apparatus such as a PC 2. The communication part 313 may communicate with the PC 2 through Internet communication realized by a wireless local area network (LAN), a wired LAN, or a mobile phone line network. Moreover, the communication part 313 may communicate with the PC 2 through a near-field wireless communication realized via a Bluetooth (registered trademark) or infrared rays or the like.

The peripheral device interface is adapted to communicably connect the input terminal 300 to an external device. The peripheral device interface may include, for example, an adaptor or the like for connection to the information transfer device 200A externally provided via a universal serial bus (USB) or may include an adaptor or the like for writing data in an information storage medium externally provided, such as a USB memory or an SD card and reading data from the information storage medium. Also, the input terminal 300 may be configured integrally with the information transfer device 200A.

[Functional Configuration]
<Input Terminal 300>

The apparatus information acquisition part 301 of the control part 310 acquires apparatus information (second identification information) unique to the electric apparatus 53. A method in which the apparatus information acquisition part 301 acquires the apparatus information is not particularly limited.

One example will be given. In a case in which the input part 311 is configured as a camera, the input part 311 acquires an image (two-dimensional code image) by imaging a two-dimensional code (print medium) attached to the electric apparatus 53 and then supplies the image to the apparatus information acquisition part 301. The apparatus information acquisition part 301 extracts apparatus information included in the two-dimensional code through image recognition processing. Alternatively, the input part 311 may acquire an image of a sticker (print medium), which is attached to the electric apparatus 53, on which information such as a model and a serial number is printed, and supply the image to the apparatus information acquisition part 301. The apparatus information acquisition part 301 may read a character string appearing in an image using an optical character recognition (OCR) and generate apparatus information on the basis of text data of the read character string.

In a case in which the input part 311 and the display part 312 are configured as a touch panel, the apparatus information acquisition part 301 causes the display part 312 to display an input assistance graphical user interface (hereinafter, a GUI) for the user to input apparatus information. The apparatus information acquisition part 301 may generate the apparatus information on the basis of information input in accordance with a touch operation performed on the input part 311 via the input assistance GUI.

In a case in which the input part 311 is configured as a microphone, the apparatus information acquisition part 301 may convert user's voice acquired by the input part 311 into text data through voice recognition processing and generate apparatus information on the basis of the text data.

The cable information acquisition part 302 acquires cable information unique to the signal processing device 100 in the cable casing 50. In the present embodiment, the cable information acquisition part 302 controls the second information acquisition part 225 of the information transfer device 200A such that cable information is transferred to a memory that can be read by the input terminal 300 from the information storage part 140 of the signal processing device 100 in one example.

The information association part 303 generates association information indicating an association relationship between the apparatus information acquired by the apparatus information acquisition part 301 and the cable information acquired by the cable information acquisition part 302 by associating the apparatus information with the cable information.

The association information output part 304 outputs the association information generated by the information association part 303 such that the association information is supplied to the PC 2. In the configuration example (1), the association information output part 304 provides an instruction to write the generated association information in the signal processing device 100 to the information transfer device 200A.

[Data Structure]
<Cable Information>

(a) of FIG. 25 is a diagram illustrating an example of a data structure of the cable information. The cable information is information including identification information unique to the signal processing device 100 in the cable casing 50. The cable information is configured with an item of a cable model and an item of a cable ID in one example. As the item of a cable model, information indicating a model of the signal processing device 100 as a product is stored. As the item of a cable ID, a serial number for uniquely identifying the signal processing device 100 of the model is stored. The signal processing device 100 is uniquely specified by the cable model and the cable ID. The illustrated cable information is stored in the information storage part 140 of the signal processing device 100 in advance at the time of fabrication and is read by the information transfer device 200A as needed.

In this manner, there is an advantage that the electric apparatus 53 connected to the cable casing 50 can be uniquely identified even in a case in which a serial number is not applied to the electric apparatus 53 by allocating the unique cable information to the cable casing 50 and the signal processing device 100.

Also, it is possible to manage the individual cable casings 50 (signal processing device 100) themselves using the cable information. For example, since the cable information is changed when the cable casing 50 is changed, each apparatus on the upstream side can recognize that the cable casing 50 has been replaced on the basis of the new cable information.

<Apparatus Information>

(b) of FIG. 25 is a diagram illustrating an example of a data structure of apparatus information. The apparatus information is information including identification information unique to the electric apparatus 53. The apparatus information is configured with items such as an apparatus model, an apparatus ID, and a maintenance date in one example. As the item of the apparatus model, information indicating a model of the electric apparatus 53 as a product is stored. As the item of the apparatus ID, a serial number for uniquely identifying the electric apparatus 53 of the model is stored. The electric apparatus 53 is uniquely specified by the apparatus model and the apparatus ID. For example, the apparatus information acquisition part 301 may read the apparatus model and the apparatus ID from an image obtained by imaging a two-dimensional code or a sticker attached to the electric apparatus 53. As the item of the maintenance date, the latest date when maintenance has been performed on the electric apparatus 53, for example, is stored. The maintenance date of the electric apparatus 53 may be input by the user via the input part 311 that is a touch panel, for example. The apparatus information acquisition part 301 may generate the apparatus information by associating the apparatus model and the apparatus ID read through image recognition processing with the maintenance date input by the user.

<Association Information>

(c) of FIG. 25 is a diagram illustrating an example of a data structure of association information. The association information is information indicating a connection relationship between the cable casing 50 (signal processing device 100) and the electric apparatus 53 and is generated by the information association part 303 in accordance with a user's input operation. Specifically, the association information is configured with an item in which the cable information is stored and an item in which the apparatus information is stored.

The information association part 303 causes the display part 312 to display a GUI for assisting the association between the cable casing 50 and the electric apparatus 53 and receives, from the user, designation of the cable information and the apparatus information to be associated, for example. The information association part 303 generates the illustrated association information by associating the cable information and the apparatus information designated by the user via the GUI.

In the configuration example, the association information generated by the information association part 303 is written in the information storage part 140 of the signal processing device 100 via the information transfer device 200A. In this manner, if the cable casing 50 and the input/output unit 52 are connected via the communication cable 51, then the association information illustrated in (c) of FIG. 25 is included in the superposed signal and is transmitted from the signal processing device 100 to the input/output unit 52 via the communication cable 51.

<First Relay Information>

(d) of FIG. 25 is a diagram illustrating an example of a data structure of first relay information. The first relay information is information generated when the input/output unit 52 that has received the association information from the signal processing device 100 transfers the association information to the controller 3. The first relay information has a structure in which a unit ID and a bit value are added to the association information illustrated in (c) in the drawing, for example. The input/output unit 52 receives the association information from the signal processing device 100 via a communication port and then generates the first relay information by adding the bit value allocated to the communication port that has received the association information and the unit ID of the input/output unit 52 itself to the association information. The input/output unit 52 transfers the generated first relay information to the controller 3.

<Second Relay Information>

(e) of FIG. 25 is a diagram illustrating an example of a data structure of second relay information. The second relay information is information generated when the controller 3 that has received the first relay information from the input/output unit 52 transfers the first relay information to the PC 2. The second relay information has a configuration in which the address information illustrated in (b) of FIG. 23 is added to the association information illustrated in (c) of FIG. 25, for example. The controller 3 receives the first relay information from the input/output unit 52 and then specifies the network ID of the network to which the input/output unit 52 as a transmission source belongs and the node ID allocated to the input/output unit 52 on the basis of the unit ID included in the first relay information. The controller 3 generates the second relay information by adding the address information including the controller ID of the controller 3 itself, the specified network ID, the node ID, and the bit value included in the first relay information to the association information. The controller 3 transfers the generated second relay information to the PC 2.

<Configuration Table>

FIG. 26 is a diagram illustrating an example of a data structure of a configuration table. The configuration table is a database of accumulated pieces of second relay information transmitted from each controller 3, and in one example, the configuration table is generated and managed by the PC 2.

The configuration table is configured with an item in which the address information is stored and an item in which the association information is stored, for example. The association information is configured by associating the item in which the cable information is stored with the item in which the apparatus information is stored as described above.

The PC 2 receives the second relay information from the controller 3 and then registers a record corresponding to the received second relay information in the configuration table. For example, the PC 2 receives the second relay information illustrated in (e) of FIG. 25 from the controller 3 and then registers the second relay information as the hatched record in FIG. 26 in the configuration table. The PC 2 can grasp what kind of electric apparatus 53 is connected and which location in the network the electric apparatus 53 is connected, by generating the configuration table.

Moreover, the PC 2 can acquire the association information including the apparatus information of the electric apparatuses 53 that are superposed-signal-communication-incompatible apparatuses from the signal processing devices 100 in all the cable casings 50 in the communication system 1 via the input/output units 52 and the controllers 3. As a result, it is possible to manage information unique to the superposed-signal-communication-incompatible apparatuses belonging to the communication system 1 in the communication system 1 that is compatible with superposed communication. In a case in which the maintenance date is included as the apparatus information, for example, it is also possible to manage the latest maintenance execution date of each electric apparatus 53 belonging to the communication system 1.

§ 3 Operation Example in Configuration Example
(1)

[When Apparatus is Installed]

FIG. 27 is a flowchart illustrating a processing flow of each device belonging to the communication system 1. FIG. 27 also illustrates operation steps (HS1 to HS4) performed by the user for reference in addition to processing steps (S101 to S121) executed by each device. The flowchart illustrated in FIG. 27 illustrates a series of processing flow in a case in which the electric apparatus 53 is newly installed in the communication system 1 as one example. The processing procedure described below is just an example, and the processing may be changed as long as it is possible. Also, omission, replacement, and addition of steps can be appropriately made for the processing procedure described below in accordance with embodiments.

First, in HS 1, the user installs the new electric apparatus 53 at a prescribed location in the communication system 1. Then, the user connects one end of the cable casing 50 that incorporates the signal processing device 100 to the electric apparatus 53.

In HS 2, the user connects the other end of the cable casing 50 to the input terminal 300. For example, the input terminal 300 and the cable casing 50 are connected via the information transfer device 200A by connecting the information transfer device 200A externally attached to the input terminal 300 to the other end of the cable casing 50. Alternatively, the input terminal 300 including the mechanism of the information transfer device 200A may be connected directly to the cable casing 50.

In S101, the control part 310 of the input terminal 300 activates a tool (an information management application, for example) for associating the cable information with the apparatus information in accordance with a user's input operation or in accordance with connection of the input terminal 300 to the cable casing 50. Each of the apparatus information acquisition part 301, the cable information acquisition part 302, the information association part 303, and the association information output part 304 included in the control part 310 may be a part of the information management application.

In S102 (first identification information acquisition step), the cable information acquisition part 302 controls the information transfer device 200A and acquires the cable information from the signal processing device 100. Specifically, the cable information acquisition part 302 provides an instruction for reading the cable information to the information transfer device 200A.

In S103, the second information acquisition part 225 of the information transfer device 200A performs superposed communication with the signal processing device 100 and requests the cable information from the signal processing device 100.

In S104, the superposed signal transmission part 155 of the signal processing device 100 includes the cable information stored in the information storage part 140 in the superposed signal and transmits the superposed signal to the information transfer device 200A in response to the request.

The second information acquisition part 225 transfers the cable information extracted from the received superposed signal to a memory that is accessible by the input terminal 300. The apparatus information acquisition part 301 reads and acquires the transferred cable information from the memory.

In S105 (second identification information acquisition step), the apparatus information acquisition part 301 acquires the apparatus information of the electric apparatus 53. The apparatus information acquisition part 301 may extract the apparatus information from an image obtained by imaging a two-dimensional code attached to the electric apparatus 53 or a sticker on which information at the time of fabrication has been printed using a camera or may acquire the apparatus information input by the user via the GUI.

In S106 (generation step), the information association part 303 generates the association information by associating the cable information acquired in S102 with the apparatus information acquired in S105. For example, the information association part 303 associates the designated cable information with the apparatus information in response to reception of designation of the cable information and the apparatus information via the GUI.

In S107 (output step), the association information output part 304 outputs the generated association information such that the PC 2 can receive the association information. Specifically, the association information output part 304 provides an instruction for writing the association information to the information transfer device 200A.

In S108, the first information acquisition part 221 reads the association information, the transfer of which has been indicated by the instruction, from the memory that is accessible by the input terminal 300 and transfers the association information to the signal processing device 100 via the light projecting part 210 as described in the first embodiment, for example.

In S109 (writing step), the information rewriting part 153 writes the association information indicated by an optical signal received from the information transfer device 200A in the information storage part 140.

In S110, the information rewriting part 153 makes determination regarding completion of the writing. If the writing is completed, the processing proceeds from YES in S110 to S111.

In S111, the superposed signal transmission part 155 replies a superposed signal for inspection of the written data to the information transfer device 200A.

In S112, the information inspection part 223 inspects whether or not the writing has successfully been performed as described in the first embodiment.

In S113, the information inspection part 223 replies the inspection result to the input terminal 300.

In S114, the association information output part 304 determines whether or not the writing has successfully been performed on the basis of the inspection result. If the writing has failed, the association information output part 304 may return from NO in S114 to S107 and provide an instruction for writing the association information to the information transfer device 200A again. If the writing has successfully been performed, the processing proceeds from YES in S114 to S115.

In S115, the association information output part 304 may notify the user of the fact that the association information generated in response to the user's instruction has been written in the signal processing device 100 in the cable casing 50 with no accidents. For example, the display part 312 of the input terminal 300 is caused to display a message indicating that the writing has successfully been performed.

In HS 3, the user confirms that the association information has been written in the signal processing device 100 with no accidents and detaches the information transfer device 200A from the cable casing 50.

In HS 4, the user connects the other end of the detached cable casing 50 to the communication cable 51 that is connected to the input/output unit 52. In this manner, the connection between the signal processing device 100 and the input terminal 300 is released, and the signal processing device 100 is electrically communicably connected to the input/output unit 52 via the other end of the cable casing 50. The user connects the cable casing 50 to the input/output unit 52 and then turns on the power sources of the controller 3 and the input/output unit 52.

In S116, the input/output unit 52 acquires the association information ((c) of FIG. 25, for example) from the signal processing device 100. Specifically, the input/output unit 52 requests the association information from the signal processing device 100 inside the cable casing 50 newly connected.

In S117 (association information transmission step), the superposed signal transmission part 155 includes the requested association information in a superposed signal and transmits the superposed signal to the input/output unit 52 via the communication cable 51.

In S118, the input/output unit 52 generates the first relay information ((d) of FIG. 25, for example) by adding the bit value allocated to the communication port that has received the association information and the unit ID of the input/output unit 52 itself to the aforementioned acquired association information. The input/output unit 52 transmits the generated first relay information to the controller 3.

In S119, the controller 3 specifies the address of the input/output unit 52 in the network, that is, the network ID and the node ID, on the basis of the unit ID of the input/output unit 52 that is a transmission source of the first relay information. The controller 3 generates the second relay information ((e) of FIG. 25, for example) by adding the address information including the controller ID of the controller 3 itself, the specified network ID and the node ID, and the bit value included in the first relay information to the aforementioned association information included in the first relay information.

In S120, the controller 3 transmits the generated second relay information to the PC 2.

In S121, the PC 2 registers the second relay information received from each controller 3 as a record in the configuration table (FIG. 26, for example).

According to the aforementioned method, it is also possible to incorporate the electric apparatus 53 in the communication system 1 even if the electric apparatus 53 is a superposed-signal-communication-incompatible apparatus, and the PC 2 can manage information unique to the electric apparatus 53 and control the electric apparatus 53 in superposed communication via the cable casing 50.

[When Apparatus is Replaced]

The communication system 1 according to the present embodiment can also address a situation in which a failure occurs in the electric apparatus 53 and the electric apparatus 53 is replaced with a new one.

If a failure occurs in one electric apparatus 53, then the signal processing device 100 connected to the electric apparatus 53 includes status information of the failure, for example, as prescribed information regarding the electric apparatus 53 in the superposed signal and transmits the superposed signal to the input/output unit 52. The status information of the failure is transmitted to the PC 2 via the input/output unit 52 and the controller 3. When the PC 2 receives the status information of the failure, the address information is added similarly to the case where the association information is transferred, and the PC 2 can thus know the location of the electric apparatus 53 where the failure has occurred.

The user can specify the electric apparatus 53 in which the failure has occurred and starts an operation of replacing the electric apparatus 53 on the basis of a notification regarding the failure output by the PC 2.

First, the user turns off the power sources of the controller 3 and the input/output unit 52 and detaches the communication cable 51 on the side of the input/output unit 52 from the other end of the cable casing 50. Then, the user connects the other end of the cable casing 50 to the information transfer device 200A of the input terminal 300.

If the input terminal 300 and the signal processing device 100 are connected in this manner, then the cable information acquisition part 302 acquires the cable information from the signal processing device 100 similarly to S102 to S104. The cable information acquisition part 302 may cause the display part 312 to display the acquired cable information. In this manner, the user can match the notification output by the PC 2 with the displayed cable information and confirm that the electric apparatus 53 to be connected to the detached cable casing 50 is surely the electric apparatus 53 as a target of replacement where a failure has occurred.

The user removes the electric apparatus 53 in which the failure has occurred by detaching the communication cable 51 on the side of the electric apparatus 53 from the one end of the cable casing 50. Instead, the user connects the new electric apparatus 53 to the cable casing 50 via the communication cable 51 and achieves the installation.

If the new electric apparatus 53 is installed in this manner, the apparatus information acquisition part 301 acquires apparatus information of the newly installed electric apparatus 53 similarly to S105. For example, the apparatus information acquisition part 301 may acquire the apparatus model and the apparatus ID in the apparatus information from the two-dimensional code. The apparatus information acquisition part 301 may acquire the data on which the replacement has been performed from a storage part of the input terminal 300, which is not illustrated, or may acquire the data input by the user, as the maintenance date.

If the apparatus information regarding the new electric apparatus 53 is acquired in this manner, then the information association part 303 generates the association information again by associating previously acquired cable information with the apparatus information of the new electric apparatus 53 similarly to S106.

Thereafter, the generated association information is supplied to the PC 2 and is managed by the PC 2 similarly to S107 to S121.

[When Communication Cable is Replaced]

The communication system 1 according to the present embodiment can also address a situation in which disconnection occurs in the communication cable 51 connecting the input/output unit 52 to the cable casing 50 and the communication cable 51 is replaced with a new one.

If disconnection occurs in one of the communication cables 51, the input/output unit 52 cannot perform communication with the signal processing device 100 that has been connected via the communication cable 51 in which the disconnection has occurred. The input/output unit 52 transmits a bit value specified on the basis of the communication port with which communication has stopped, status information of the disconnection, and the unit ID of the input/output unit 52 itself to the controller 3. The status information of the disconnection is transmitted to the PC 2 via the controller 3. Since the address information is added when the status information of the disconnection is received by the PC 2 similarly to the case when the association information is transferred, the PC 2 can know between which of the cable casings 50 and the input/output unit 52 the disconnection has occurred in the communication cable 51.

The user can specify between which of the cable casings 50 and the input/output unit 52 the disconnection has occurred on the basis of a notification regarding the disconnection output by the PC 2 and start an operation of replacing the communication cable 51 between the input/output unit 52 and the cable casing 50.

First, the user turns off the power sources of the controller 3 and the input/output unit 52 and detaches the communication cable 51 on the side of the input/output unit 52 from the other end of the cable casing 50. Then, the user connects the other end of the cable casing 50 to the information transfer device 200A of the input terminal 300.

If the input terminal 300 and the signal processing device 100 are connected in this manner, then the cable information acquisition part 302 acquires the cable information from the signal processing device 100 similarly to S102 to S104. The cable information acquisition part 302 may cause the display part 312 to display the acquired cable information. In this manner, the user can match the notification output by the PC 2 with the displayed cable information and confirm that the communication cable 51 that has been connected on the side of the input/output unit 52 to the cable casing 50 that has been detached is surely the communication cable 51 as a target of replacement in which the disconnection has occurred.

The user detaches the communication cable 51 in which the disconnection has occurred from the input/output unit 52 and replaces the communication cable 51 with a new communication cable 51.

If the replacement of the communication cable 51 is completed, then the apparatus information acquisition part 301 updates the maintenance data in the apparatus information. For the new maintenance date, the apparatus information acquisition part 301 may acquire the data when the replacement has been performed from the storage part of the input terminal 300, which is not illustrated, or may acquire the data input by the user. In another example, the maintenance date of the electric apparatus 53 and the replacement date of the communication cable 51 may be handled as different items in the apparatus information. In this case, the apparatus information acquisition part 301 may update the replacement date of the communication cable 51 in the apparatus information of the electric apparatus 53.

If the apparatus information is updated on the basis of the replacement of the communication cable 51, the information association part 303 generates the association information again by associating the previously acquired cable information with the updated apparatus information similarly to S106.

Thereafter, the generated association information is supplied to the PC 2 and is managed by the PC 2 similarly to S107 to S121.

§ 4 Configuration Example (2)

In the configuration example (2), the information transfer device 200B connected to the input terminal 300 includes a mechanism for reading information from the signal processing device 100 in the cable casing 50 and may not include a mechanism for writing information in the signal processing device 100. The association information generated by the input terminal 300 is transmitted directly to the PC 2 from the input terminal 300.

[Hardware Configuration]
<Information Transfer Device 200B>

The information transfer device 200B according to the present configuration example is different from the information transfer device 200A illustrated in FIG. 24 in that the information transfer device 200B does not include a mechanism for writing in the signal processing device 100, which the information transfer device 200A includes. In other words, the information transfer device 200B includes a transfer circuit (hereinafter, referred to as a transfer circuit 220B for convenience), which is not illustrated in FIG. 24, instead of the transfer circuit 220A. The transfer circuit 220B includes the information inspection part 223 and the second information acquisition part 225 and may not include the first information acquisition part 221. Also, the information transfer device 200B may not include the light projecting part 210.

[Functional Configuration]
<Input Terminal 300>

The input terminal 300 according to the present configuration example includes a control part 310, an input part 311, a display part 312, a communication part 313, and a peripheral device interface, which is not illustrated, as illustrated in FIG. 24.

In the present configuration example, the control part 310 includes each of an apparatus information acquisition part 301, a cable information acquisition part 302, an information association part 303, and an association information output part 304 as an information management application similarly to the configuration example (1).

In the present configuration example, the association information output part 304 is different from the association information output part 304 in the configuration example (1) in that the association information output part 304 outputs the generated association information to the outside such that the PC 2 can receive the association information via various transmission means such as a communication part 313 without writing the association information in the signal processing device 100.

For example, the association information output part 304 may transmit the association information to the PC 2 via the communication part 313 through Internet communication realized via a wireless LAN, a wired LAN, or a mobile phone line network. The association information output part 304 may transmit the association information to the PC 2 via the communication part 313 through near-field wireless communication realized by a Bluetooth (registered trademark) or infrared rays. The association information output part 304 may transmit the association information to the PC 2 through wired communication realized by a USB, the Ethernet (registered trademark), or the like. Alternatively, the association information output part 304 may write the association information in an externally provided information storage medium such as a USB memory, an SD card, or the like connected to the input terminal 300. The information storage medium with the association information written therein can be connected to the PC 2 such that the association information can be read by the PC 2, and the association information may be supplied from the association information output part 304 to the PC 2 in this manner.

[Data Structure]

The cable information acquisition part 302 acquires the cable information from the signal processing device 100 in the cable casing 50 connected to the electric apparatus 53 similarly to the configuration example (1). A data structure of the cable information is illustrated in (a) of FIG. 25, for example. The cable information is transmitted through superposed communication from the signal processing device 100 to the input/output unit 52 via the communication cable 51 in response to a request from the input/output unit 52.

The apparatus information acquisition part 301 acquires the aforementioned apparatus information of the electric apparatus 53 similarly to the configuration example (1). A data structure of the apparatus information is illustrated in (b) of FIG. 25, for example.

The information association part 303 generates association information by associating the acquired cable information with the apparatus information similarly to the configuration example (1). A data structure of the association information is illustrated in (c) of FIG. 25, for example. The generated association information is supplied to the PC 2 by the association information output part 304.

<First Intermediate Information>

(a) of FIG. 28 is a diagram illustrating an example of a data structure of first intermediate information. The first intermediate information is information generated when the input/output unit 52 that has received the cable information from the signal processing device 100 transfers the cable information to the controller 3. The first intermediate information has a configuration in which a unit ID and a bit value are added to the cable information, for example. The bit value is a bit value allocated to the communication port that has received the cable information.

<Second Intermediate Information>

(b) of FIG. 28 is a diagram illustrating an example of a data structure of second intermediate information. The second intermediate information is information generated when the controller 3 that has received the first intermediate information from the input/output unit 52 transfers the first intermediate information to the PC 2. The second intermediate information has a configuration in which the address information illustrated in (b) of FIG. 23 is added to the cable information included in the first intermediate information, for example. For example, the address information is configured with a controller ID of the controller 3, a network ID and a node ID specified on the basis of the input/output unit 52 that is a transmission source of the first intermediate information, and a bit value included in the first intermediate information.

The PC 2 receives the association information illustrated in (c) of FIG. 25, for example, from the input terminal 300 and receives the second intermediate information illustrated in (b) of FIG. 28, for example, from the controller 3.

The PC 2 generates a record in which the cable information, the apparatus information in the association information, and the address information in the second intermediate information are connected on the basis of the fact that the cable information in the association information conforms to the cable information in the second intermediate information. The generated record is illustrated as a hatched record in the configuration table illustrated in FIG. 26, for example. As illustrated in FIG. 26, the PC 2 registers the generated record in the configuration table.

According to the aforementioned method, the PC 2 can know what kind of electric apparatus 53 is connected and where the electric apparatus is connected in the network, by generating the configuration table.

Moreover, the input terminal 300 acquires apparatus information from all the electric apparatuses 53 in the communication system 1 and supplies association information indicating correspondences thereof with the cable information to the PC 2. Therefore, the PC 2 can grasp the correspondences between all the electric apparatuses 53 in the communication system 1 and the cable casings 50.

As a result, it is possible to manage information unique to superposed-signal-communication-incompatible apparatuses belonging to the communication system 1 in the communication system 1 that is compatible with superposed communication. For example, in a case in which the apparatus information includes a maintenance date, it is also possible to manage the latest maintenance execution date of each electric apparatus 53 belonging to the communication system 1.

§ 5 Operation Example in Configuration Example (2)

[When Apparatus is Installed]

FIG. 29 is a flowchart illustrating a processing flow of each device belonging to the communication system 1. FIG. 29 also illustrates operation steps (HS 1 to HS 4) performed by the user for reference in addition to processing steps (S201 to S215) executed by each device. The flowchart illustrated in FIG. 28 illustrates a flow of a series of processing in a case in which the electric apparatus 53 is newly installed in the communication system 1 as an example. The processing procedure described below is just an example, and the processing may be changed as long as it is possible. Also, omission, replacement, and addition of steps can be appropriately made for the processing procedure described below in accordance with embodiments.

HS 1 is performed by the user similarly to that in the configuration example (1). HS 2 is performed by the user similarly to the configuration example (1) other than that the signal processing device 100 and the input terminal 300 are connected using the information transfer device 200B instead of the information transfer device 200A.

S201 to S206 (generation step) are executed by the input terminal 300, the information transfer device 200B, and the signal processing device 100, respectively, similarly to those in the configuration example (1).

In S207, the information association part 303 may notify the user of the fact that the association information has been generated with no accidents in a case in which the association information can be generated with no problems in S206. For example, the display part 312 of the input terminal 300 is caused to display a message indicating that the generation has successfully been performed.

In S208 (output step), the association information output part 304 outputs the association information generated in S206 such that the PC 2 can receive the association information. Specifically, the association information output part 304 transmits the association information to the PC 2 via the communication part 313. The transmission of the association information in S208 can be executed at an arbitrary timing until the PC 2 executes S214.

In HS 3, the user confirms that the association information has been generated by the signal processing device 100 with no accidents and detaches the information transfer device 200B from the cable casing 50. HS 4 is performed by the user similarly to that in the configuration example (1).

In S209, the input/output unit 52 acquires cable information ((a) of FIG. 25, for example) from the signal processing device 100. Specifically, the input/output unit 52 requests the cable information from the signal processing device 100 in the newly connected cable casing 50.

In S210 (first identification information transmission step), the superposed signal transmission part 155 includes the requested cable information in a superposed signal and transmits the superposed signal to the input/output unit 52 via the communication cable 51.

In S211, the input/output unit 52 generates first intermediate information ((a) of FIG. 28, for example) by adding a bit value allocated to the communication port that has received the cable information and the unit ID of the input/output unit 52 itself to the acquired aforementioned cable information. The input/output unit 52 transmits the generated first intermediate information to the controller 3.

In S212, the controller 3 specifies the address of the input/output unit 52 in the network, that is, the network ID and the node ID on the basis of the unit ID of the input/ output unit 52 that is a transmission source of the first intermediate information. The controller 3 generates second intermediate information ((b) of FIG. 28, for example) by adding the address information including the controller ID of the controller 3 itself, the specified network ID and the node ID, and the bit value included in the first intermediate information to the aforementioned cable information included in the first intermediate information.

In S213, the controller 3 transmits the generated second intermediate information to the PC 2.

In S214, the PC 2 generates a record in which the cable information, the apparatus information in the association information, and the address information in the second intermediate information are connected on the basis of the fact that the cable information in the association information transmitted in S208 conforms to the cable information in the second intermediate information transmitted in S213.

In S215, the PC 2 registers the generated record in the configuration table (FIG. 26, for example).

According to the aforementioned method, it is possible to incorporate the electric apparatus 53 in the communication system 1 even if the electric apparatus 53 is a superposed-signal-communication-incompatible apparatus, and the PC 2 can manage the information unique to the electric apparatus 53 and control the electric apparatus 53 in the superposed communication via the cable casing 50, similarly to the operation example in the configuration example (1).

[When Apparatus is Replaced]

The communication system 1 according to the present embodiment can also address a situation in which a failure occurs in the electric apparatus 53 and the electric apparatus 53 is replaced with a new one.

If a failure occurs in one of the electric apparatuses 53, the signal processing device 100 connected to the electric apparatus 53 includes status information of the failure, for example, as prescribed information regarding the electric apparatus 53 in a superposed signal and transmits the superposed signal to the input/output unit 52. The status information of the failure is transmitted to the PC 2 via the input/output unit 52 and the controller 3. Since the address information is added when the status information of the failure is received by the PC 2 similarly to the case when the association information is transferred, the PC 2 can know the location of the electric apparatus 53 where the failure has occurred.

The user can specify the electric apparatus 53 in which the failure has occurred and starts an operation of replacing the electric apparatus 53 on the basis of a notification regarding the failure output by the PC 2.

First, the user turns off the power sources of the controller 3 and the input/output unit 52 and detaches the communication cable 51 on the side of the input/output unit 52 from the other end of the cable casing 50. Then, the user connects the other end of the cable casing 50 to the information transfer device 200B of the input terminal 300.

If the input terminal 300 and the signal processing device 100 are connected in this manner, then the cable information acquisition part 302 acquires cable information from the signal processing device 100 similarly to S202 (first identification information acquisition step) to S204. The cable information acquisition part 302 may cause the display part 312 to display the acquired cable information. In this manner, the user can match the notification output by the PC 2 with the displayed cable information and confirm that the electric apparatus 53 connected to the detached cable casing 50 is surely the electric apparatus 53 as a target of replacement in which the failure has occurred.

The user detaches the communication cable 51 on the side of the electric apparatus 53 from the one end of the cable casing 50 and removes the electric apparatus 53 in which the failure has occurred. Instead, the user connects the new electric apparatus 53 to the cable casing 50 via the communication cable 51 and achieves the installation.

If the new electric apparatus 53 is installed in this manner, the apparatus information acquisition part 301 acquires apparatus information of the newly installed electric apparatus 53 similarly to S205 (second identification information acquisition step). For example, the apparatus information acquisition part 301 may acquire an apparatus model and an apparatus ID in the apparatus information from the two-dimensional code. The apparatus information acquisition part 301 may acquire the date on which the replacement has been performed from a storage part of the input terminal 300, which is not illustrated, or may acquire the data input by the user, as a maintenance date.

If the apparatus information regarding the new electric apparatus 53 is acquired in this manner, then the information association part 303 generates the association information again by associating the previously acquired cable information with the apparatus information of the new electric apparatus 53 similarly to S206.

Thereafter, the generated association information is supplied to the PC 2 and is managed by the PC 2 similarly to S207 to S215.

[When Communication Cable is Replaced]

The communication system 1 according to the present embodiment can also address a situation in which disconnection occurs in the communication cable 51 connecting the input/output unit 52 to the cable casing 50 and the communication cable 51 is replaced with a new one.

If disconnection occurs in one of the communication cables 51, the input/output unit 52 cannot perform communication with the signal processing device 100 that has been connected via the communication cable 51 in which the disconnection has occurred. The input/output unit 52 transmits the bit value specified on the basis of the communication port, the communication with which has stopped, status information of the disconnection, and the unit ID of the input/output unit 52 itself to the controller 3. The status information of the disconnection is transmitted to the PC 2 via the controller 3. Since the address information is added when the status information of the disconnection is received by the PC 2 similarly to the case when the association information is transferred, the PC 2 can know between which of the cable casings 50 and the input/output unit 52 the disconnection has occurred in the communication cable 51.

The user can specify between which of the cable casing 50 and the input/output unit 52 the disconnection has occurred and start the operation of replacing the communication cable 51 between the input/output unit 52 and the cable casing 50 on the basis of a notification regarding the disconnection output by the PC 2.

First, the user turns off the power sources of the controller 3 and the input/output unit 52 and detaches the communication cable 51 on the side of the input/output unit 52 from the other end of the cable casing 50. Then, the user connects the other end of the cable casing 50 to the information transfer device 200B of the input terminal 300.

If the input terminal 300 and the signal processing device 100 are connected in this manner, the cable information acquisition part 302 acquires cable information from the signal processing device 100 similarly to S202 to S204. The cable information acquisition part 302 may cause the display part 312 to display the acquired cable information. In this manner, the user can match the notification output by the PC 2 with the displayed cable information and confirm that the communication cable 51 that has been connected on the side of the input/output unit 52 to the cable casing 50 that has been detached is surely the communication cable 51 that is a target of the replacement in which the disconnection has occurred.

The user detaches the communication cable 51 in which the disconnection has occurred from the input/output unit 52 and replaces the communication cable 51 with a new communication cable 51.

If the replacement of the communication cable 51 is completed in this manner, the apparatus information acquisition part 301 updates the maintenance date in the apparatus information. For the new maintenance date, the apparatus information acquisition part 301 may acquire the data on which the replacement has been performed from a storage part of the input terminal 300, which is not illustrated, or may acquire the data input by the user. In another example, the maintenance date of the electric apparatus 53 and the replacement date of the communication cable 51 may be handled as different items in the apparatus information. In this case, the apparatus information acquisition part 301 may update the replacement date of the communication cable 51 in the apparatus information of the electric apparatus 53.

If the apparatus information is updated on the basis of the replacement of the communication cable 51 in this manner, then the information association part 303 generates the association information again by associating the previously acquired cable information and the updated apparatus information similarly to S206.

Thereafter, the generated association information is supplied to the PC 2 and is managed by the PC 2 similarly to S207 to S215.

§ 6 Modification Examples

In the configuration example (1), the writing means mounted on the information transfer device 200A is not limited to optical communication and may be realized by an electric means described in the first embodiment. In this case, the information transfer device 200A includes a current control part 230 illustrated in FIG. 10 instead of the light projecting part 210. In this case, the signal processing device 100 accommodated I the cable casing 50 includes the configuration of the signal processing device 100 illustrated in FIG. 10 instead of the configuration illustrated in FIG. 24. Specifically, the signal processing device 100 may include a current detection part 160 instead of the light receiving part 130, and the transmission control circuit 150 may not include the monitoring part 151. In this manner, the first information acquisition part 221 of the information transfer device 200A can control the current control part 230 and electrically write the association information in the signal processing device 100.

In the configuration example (1), the management of the cable information may be omitted in the apparatuses on the upstream side of the input/output unit 52 in a case in which serial numbers are applied to the electric apparatuses 53.

As various kinds of data such as apparatus information to be read from the electrical apparatus 53, cable information to be read from the signal processing device 100, and association information to be written in the signal processing device 100, a standard character string code for exchanging information such as an American Standard Code for Information Interchange (ASCII) code may be employed. In this manner, the various devices on the upstream side, such as a controller 3 or the PC 2, and the input terminal 300 can handle the received data without any special conversion.

In order to reduce the memory capacity in the information storage part 140 of the signal processing device 100, data compression processing may be performed on the cable information or the association information.

Also, data may be encrypted when the association information is written in the signal processing device 100 by the input terminal 300. It is thus possible to curb manufacturing of counterfeit products of the cable casing 50 that accommodates the signal processing device 100.

(Implementation Example Using Software)

Control blocks of the signal processing device 100, the information rewriting device 200, and the input unit 4 may be realized using a logic circuit (hardware) formed by an integrated circuit (IC chip) or may be realized by software.

In the latter case, the signal processing device 100, the information rewriting device 200, and the input unit 4 include a computer that executes commands of a program that is software for realizing each function. The computer includes one or more processors, for example, and a computer readable recording medium with the program stored therein. Then, the objective of the present invention is achieved by the processor reading and executing the program from the recording medium in the computer. As the processor, it is possible to use a central processing unit (CPU), for example. As the recording medium, it is possible to use a "non-transitory tangible medium" such as a tape, a disc, a card, a semiconductor memory, a programmable logic circuit, or the like as well as a read only memory (ROM). Also, a random access memory (RAM) or the like for developing the program may further be included. Also, the program may be supplied to the computer via an arbitrary transmission medium (such as a communication network or broadcasting waves) that can transmit the program. In addition, an aspect of the present invention can also be realized in the form of data signals embedded in transmission carriers in which the program is implemented by electronic transmission.

The present invention employs the following configuration in order to solve the aforementioned problem as an example of the present disclosure.

In other words, a control program according to an aspect of the present disclosure is a control program, which is for a terminal device connectable to a signal processing device through a communication cable, the signal processing device including a superposed signal transmission part that transmits an operation signal in accordance with a state of an operation element to a different device or that receives an operation signal for controlling the operation element from the different device and transmits, to the different device, a superposed signal obtained by superposing a data signal indicating prescribed information with the operation signal, and an information storage part that stores the prescribed information, the control program causing the terminal device to execute: a first identification information acquisition step for acquiring, from the signal processing device via the communication cable, first identification information for identifying the signal processing device as the prescribed information; a second identification information acquisition step for acquiring, through an input part of the terminal device operated by a user, second identification information for identifying an electric apparatus that is electrically connected to the signal processing device and operates the operation element by transmitting and receiving the operation signal to and from the signal processing device; a generation step for generating association information for associating the first identification information with the second identification information; and an output step for outputting the association information so that the association information is received by an information processing device that controls or monitors a plurality of the electric apparatuses through the signal processing device.

With this configuration, the information processing device can acquire the association information indicating the correspondence between the first identification information that is unique to the signal processing device and the second identification information that is unique to the electric apparatus. In this manner, the information processing device in a system using superposed signals can control or manage the electric apparatus and the like that are not compatible with communication using superposed signals. As a result, there is an advantage that it is possible to introduce an electric apparatus that is not compatible with communication using superposed signals into the communication system using superposed signals.

In the control program according to the aspect, the signal processing device may further include an information rewriting part that rewrites information stored in the information storage part on the basis of an input of an instruction from the different device, and in the output step, an instruction for writing the association information in the information storage part so that the superposed signal including the association information as the prescribed information is transmitted to the information processing device through the superposed signal transmission part may be provided to the information rewriting part.

With this configuration, it is possible to cause the information processing device to acquire the association information indicating the correspondence between the first identification information that is unique to the signal processing device and the second identification information that is unique to the electric apparatus via the signal processing device. As a result, there is an advantage that it is possible to introduce the electric apparatus that is not compatible with communication using superposed signals into the communication system using superposed signals.

In the control program according to the aspect, in the output step, the association information may be transmitted to the information processing device, and the superposed signal transmission part may transmit the superposed signal including the first identification information as the prescribed information to the information processing device.

With this configuration, it is possible to cause the information processing device to acquire the association information indicating the correspondence between the first identification information that is unique to the signal processing device and the second identification information that is unique to the electric apparatus via the terminal device. On the other hand, it is possible to cause the information processing device to acquire the first identification information via the signal processing device. In this manner, the information processing device can specify the electric apparatus that is a communication counterpart of superposed signal communication and corresponds to the signal processing device on the basis of the association information acquired from the terminal device using the first identification information as a clue. As a result, there is an advantage that the information processing device in the system using superposed signals can control or manage electric apparatuses that are not compatible with communication using superposed signals and the electric apparatuses and the like can be introduced into the communication system using superposed signals.

In the control program according to an aspect, a casing of the signal processing device may have an outer shape like a communication cable that is electrically connectable with a communication cable connecting the information processing device to the electric apparatus, one end of the casing may be electrically connectable to the electric apparatus that is not compatible with transmission and reception of the superposed signal, and the other end of the casing may be electrically connectable to the information processing device or the terminal device, and in the first identification information acquisition step, the first identification information may be acquired when the other end of the casing is connected to the terminal device.

With this configuration, it is possible to easily dispose the signal processing device between the electric apparatus and the information processing device and to easily perform attachment and detachment of the signal processing device and the terminal device. Also, since there is no need to separately provide communication connection terminals for the information processing device and the terminal device in the signal processing device, it is possible to simplify the configuration of the signal processing device.

In the control program according to the aspect, in the second identification information acquisition step, the second identification information of the electric apparatus may be acquired from an image on a printed medium, on which information regarding the electric apparatus is printed, which is imaged by an imaging part that serves as the input part.

With this configuration, the terminal device can reliably acquire the second identification information of the electric apparatus with no need of user's manual inputs.

For example, the print medium may be a two-dimensional code including information regarding the electric apparatus, and in the second identification information acquisition step, the second identification information of the electric apparatus may be acquired from a two-dimensional code image in which the two-dimensional code is imaged. Alternatively, the print medium may include information regarding the electric apparatus printed as characters or symbols, for example. In this case, in the second identification information acquisition step, a character string appearing in an image obtained by imaging the print medium, such as a sticker attached to the electric apparatus, may be read from the image using an optical character recognition (OCR), and the second identification information may be acquired on the basis of text data of the read character string.

A method according to an aspect of the present disclosure is method of managing information regarding a signal processing device and an electric apparatus using a terminal device that is connectable with the signal processing device through a communication cable, the signal processing device including a superposed signal transmission part that transmits an operation signal in accordance with a state of an operation element to a different device or that receives an operation signal for controlling the operation element from the different device and transmits a superposed signal obtained by superposing a data signal indicating prescribed information with the operation signal to the different device, and an information storage part that stores the prescribed information, the electric apparatus being electrically connected to the signal processing device and operating the operation element by transmitting and receiving the operation signal to and from the signal processing device, the method including: a first identification information acquisition step in which the terminal device acquires, from the signal processing device via the communication cable, first identification information for identifying the signal processing device as the prescribed information; a second identification information acquisition step in which the terminal device is electrically connected to the signal processing device and acquires, through an input part of the terminal device operated by a user, second identification information for identifying the electric apparatus; a generation step in which the terminal device generates association information for associating the first identification information with the second identification information; and an output step in which the terminal device outputs the association information so that the association information is received by an information processing device that controls or monitors a plurality of the electric apparatuses through the signal processing device.

According to the method, the information processing device can acquire the association information indicating the correspondence between the first identification information that is unique to the signal processing device and the second identification information that is unique to the electric apparatus. In this manner, the information processing device in the system using superposed signals can control or manage the electric apparatuses and the like that are not compatible with communication using superposed signals. As a result, there is an advantage that the electric apparatuses that are not compatible with communication using superposed signals can be introduced into the communication system using superposed signals.

In the method according to the aspect, in the output step, an instruction for writing the association information as the prescribed information in the information storage part may be provided to the signal processing device, and the method may further include: a writing step in which the signal processing device writes the association information output from the terminal device in the information storage part; and a transmission step in which the signal processing device transmits the superposed signal including the association information written in the information storage part to the information processing device.

According to the method, it is possible to cause the information processing device to acquire the association information indicating the correspondence between the first identification information that is unique to the signal processing device and the second identification information that is unique to the electric apparatus via the signal processing device. As a result, there is an advantage that the electric apparatuses that are not compatible with communication using superposed signals can be introduced into the communication system using superposed signals.

In the method according to the aspect, in the output step, the association information may be transmitted to the information processing device, and the method may further include a transmission step in which the signal processing device transmits the superposed signal including the first identification information as the prescribed information to the information processing device.

According to the method, it is possible to cause the information processing device to acquire the association information indicating the correspondence between the first identification information that is unique to the signal processing device and the second identification information that is unique to the electric apparatus via the terminal device. On the other hand, it is possible to cause the information processing device to acquire the first identification information via the signal processing device. In this manner, the information processing device can specify the electric apparatus that is a communication counterpart of the superposed signal communication and corresponds to the signal processing device on the basis of the association information acquired from the terminal device using the first identification information as a clue. As a result, there is an advantage that the information processing device in the system using superposed signals can control or manage the electric apparatuses and the like that are not compatible with communication using superposed signals and the electric apparatuses and the like can be introduced into the communication system using superposed signals.

The present invention is not limited to the aforementioned embodiments, various modifications can also be made within the scope described in the claims, and embodiments obtained by appropriately combining technical means disclosed in different embodiments are also included within the technical scope of the present invention.

The invention claimed is:

1. A non-transitory computer-readable recording medium, recording a control program, which is for a terminal device connectable to a signal processing device through a communication cable,
    the signal processing device including
        a superposed signal transmission part that transmits an operation signal in accordance with a state of an operation element to a different device or that receives an operation signal for controlling the operation element from the different device and transmits, to the different device, a superposed signal obtained by superposing a data signal indicating prescribed information with the operation signal, and
        an information storage part that stores the prescribed information,
    the control program causing the terminal device to execute:
        a first identification information acquisition step for acquiring, from the signal processing device via the communication cable, first identification information for identifying the signal processing device as the prescribed information;
        a second identification information acquisition step for acquiring, through an input part of the terminal device operated by a user, second identification information for identifying an electric apparatus that is electrically connected to the signal processing device and operates the operation element by transmitting and receiving the operation signal to and from the signal processing device;
        a generation step for generating association information for associating the first identification information with the second identification information; and
        an output step for outputting the association information so that the association information is received by an information processing device that controls or monitors a plurality of the electric apparatuses through the signal processing device.

2. The non-transitory computer-readable recording medium according to claim 1,
    wherein the signal processing device further includes an information rewriting part that rewrites information stored in the information storage part based on an input of an instruction from the different device, and
    in the output step, an instruction for writing the association information in the information storage part so that the superposed signal including the association information as the prescribed information is transmitted to the information processing device through the superposed signal transmission part is provided to the information rewriting part.

3. The non-transitory computer-readable recording medium according to claim 2,
wherein a casing of the signal processing device has an outer shape like a communication cable that is electrically connectable with a communication cable connecting the information processing device to the electric apparatus, one end of the casing is electrically connectable to the electric apparatus that is not compatible with transmission and reception of the superposed signal, and the other end of the casing is electrically connectable to the information processing device or the terminal device, and
in the first identification information acquisition step, the first identification information is acquired when the other end of the casing is connected to the terminal device.

4. The non-transitory computer-readable recording medium according to claim 2, wherein in the second identification information acquisition step, the second identification information of the electric apparatus is acquired from an image on a printed medium, on which information regarding the electric apparatus is printed, which is imaged by an imaging part that serves as the input part.

5. The non-transitory computer-readable recording medium according to claim 1,
wherein in the output step, the association information is transmitted to the information processing device, and
the superposed signal transmission part transmits the superposed signal including the first identification information as the prescribed information to the information processing device.

6. The non-transitory computer-readable recording medium according to claim 5,
wherein a casing of the signal processing device has an outer shape like a communication cable that is electrically connectable with a communication cable connecting the information processing device to the electric apparatus, one end of the casing is electrically connectable to the electric apparatus that is not compatible with transmission and reception of the superposed signal, and the other end of the casing is electrically connectable to the information processing device or the terminal device, and
in the first identification information acquisition step, the first identification information is acquired when the other end of the casing is connected to the terminal device.

7. The non-transitory computer-readable recording medium according to claim 5, wherein in the second identification information acquisition step, the second identification information of the electric apparatus is acquired from an image on a printed medium, on which information regarding the electric apparatus is printed, which is imaged by an imaging part that serves as the input part.

8. The non-transitory computer-readable recording medium according to claim 1,
wherein a casing of the signal processing device has an outer shape like a communication cable that is electrically connectable with a communication cable connecting the information processing device to the electric apparatus, one end of the casing is electrically connectable to the electric apparatus that is not compatible with transmission and reception of the superposed signal, and the other end of the casing is electrically connectable to the information processing device or the terminal device, and
in the first identification information acquisition step, the first identification information is acquired when the other end of the casing is connected to the terminal device.

9. The non-transitory computer-readable recording medium according to claim 8, wherein in the second identification information acquisition step, the second identification information of the electric apparatus is acquired from an image on a printed medium, on which information regarding the electric apparatus is printed, which is imaged by an imaging part that serves as the input part.

10. The non-transitory computer-readable recording medium according to claim 1, wherein in the second identification information acquisition step, the second identification information of the electric apparatus is acquired from an image on a printed medium, on which information regarding the electric apparatus is printed, which is imaged by an imaging part that serves as the input part.

11. A method of managing information regarding a signal processing device and an electric apparatus using a terminal device that is connectable with the signal processing device through a communication cable,
the signal processing device including
a superposed signal transmission part that transmits an operation signal in accordance with a state of an operation element to a different device or that receives an operation signal for controlling the operation element from the different device and transmits a superposed signal obtained by superposing a data signal indicating prescribed information with the operation signal to the different device, and
an information storage part that stores the prescribed information,
the electric apparatus being electrically connected to the signal processing device and operating the operation element by transmitting and receiving the operation signal to and from the signal processing device,
the method comprising:
a first identification information acquisition step in which the terminal device acquires, from the signal processing device via the communication cable, first identification information for identifying the signal processing device as the prescribed information;
a second identification information acquisition step in which the terminal device is electrically connected to the signal processing device and acquires, through an input part of the terminal device operated by a user, second identification information for identifying the electric apparatus;
a generation step in which the terminal device generates association info illation for associating the first identification information with the second identification information; and
an output step in which the terminal device outputs the association information so that the association information is received by an information processing device that controls or monitors a plurality of the electric apparatuses through the signal processing device.

12. The method according to claim 11,
wherein in the output step, an instruction for writing the association information as the prescribed information in the information storage part is provided to the signal processing device, and the method further comprises:
- a writing step in which the signal processing device writes the association information output from the terminal device in the information storage part; and
- a transmission step in which the signal processing device transmits the superposed signal including the association information written in the information storage part to the information processing device.

13. The method according to claim 11, wherein in the output step, the association information is transmitted to the information processing device, and the method further comprises:
- a transmission step in which the signal processing device transmits the superposed signal including the first identification information as the prescribed information to the information processing device.

* * * * *